United States Patent [19]

Matsubara et al.

[11] Patent Number: 5,943,049
[45] Date of Patent: Aug. 24, 1999

[54] IMAGE PROCESSOR FOR DISPLAYED MESSAGE, BALLOON, AND CHARACTER'S FACE

[75] Inventors: Kunihiro Matsubara, Tokyo; Tetsuichi Nakae, Ome; Hirohisa Koyama, Kunitachi; Atsushi Inoshita, Fussa; Kazuhisa Nakamura, Akiruno; Koji Toriyama, Tokyo, all of Japan

[73] Assignee: Casio Computer Co., Ltd., Tokyo, Japan

[21] Appl. No.: 08/636,774

[22] Filed: Apr. 23, 1996

[30] Foreign Application Priority Data

| Apr. 27, 1995 | [JP] | Japan | 7-125580 |
|---|---|---|---|
| May 1, 1995 | [JP] | Japan | 7-128775 |
| May 10, 1995 | [JP] | Japan | 7-136009 |
| May 10, 1995 | [JP] | Japan | 7-136153 |

[51] Int. Cl.⁶ ........................................ G06F 3/00
[52] U.S. Cl. ........................................ 345/338
[58] Field of Search ........................ 345/326–358

[56] References Cited

U.S. PATENT DOCUMENTS

| 4,333,152 | 6/1982 | Best | 345/327 |
|---|---|---|---|
| 4,445,187 | 4/1984 | Best | 345/327 X |
| 4,569,026 | 2/1986 | Best | 345/327 |
| 4,791,581 | 12/1988 | Ohba | 345/139 X |
| 4,885,702 | 12/1989 | Ohba | 345/139 X |
| 5,111,409 | 5/1992 | Gasper et al. | 345/302 |
| 5,247,610 | 9/1993 | Oshima et al. | 345/435 |
| 5,287,448 | 2/1994 | Nicol et al. | 345/336 X |
| 5,347,306 | 9/1994 | Nitta | 345/329 X |
| 5,388,993 | 2/1995 | McKiel et al. | 345/336 X |
| 5,393,073 | 2/1995 | Best | 345/326 X |
| 5,428,733 | 6/1995 | Carr | 345/336 X |
| 5,491,743 | 2/1996 | Shiio et al. | 345/329 X |
| 5,544,305 | 8/1996 | Ohmaye et al. | 345/326 X |
| 5,611,037 | 3/1997 | Hayashi | 345/326 X |
| 5,649,086 | 7/1997 | Belfer et al. | 345/441 |
| 5,657,462 | 8/1997 | Brouwer et al. | 345/336 |
| 5,682,469 | 10/1997 | Linnett et al. | 345/336 X |
| 5,727,174 | 3/1998 | Aparicio, IV et al. | 345/348 |
| 5,745,710 | 4/1998 | Clanton, III et al. | 345/327 X |

FOREIGN PATENT DOCUMENTS

WO 94/15276   7/1994   WIPO ............................. G06F 3/33

OTHER PUBLICATIONS

IBM Technical Disclosure Bulletin, vol. 36, No. 6B, Jun. 1, 1993, pp. 549–551, XP000377479 "Interactive Mousie For Child PC–Users".
IBM Technical Disclosure Bulletin, vol. 32, No. 6B, Nov. 1, 1989, pp. 173–174, XP000073702 "Mail–Waiting Icon For PC–Based Office System".
IBM Technical Disclosure Bulletin, vol. 33, No. 5, Oct. 1, 1990, pp. 323–325, XP000107546 "Icon Variations Represent Properties Of An Object".

*Primary Examiner*—John E. Breene
*Attorney, Agent, or Firm*—Frishauf, Holtz, Goodman, Langer & Chick

[57] ABSTRACT

A plurality of images each indicative of a file to be processed or its items to be processed is displayed on a display. When message information is displayed which is to be transmitted to the user with respect to each of the images, a surrounding image which surrounds the message information is displayed to emphasize and display the message information. When a face image is displayed on the display screen, the message information is displayed in the form of a balloon used frequently in a cartoon or animation as if the message information were uttered from the face image. The displayed shape of the balloon is changed in accordance with attributes of the face image displayed on the display screen so as to harmonize with the face image.

13 Claims, 60 Drawing Sheets

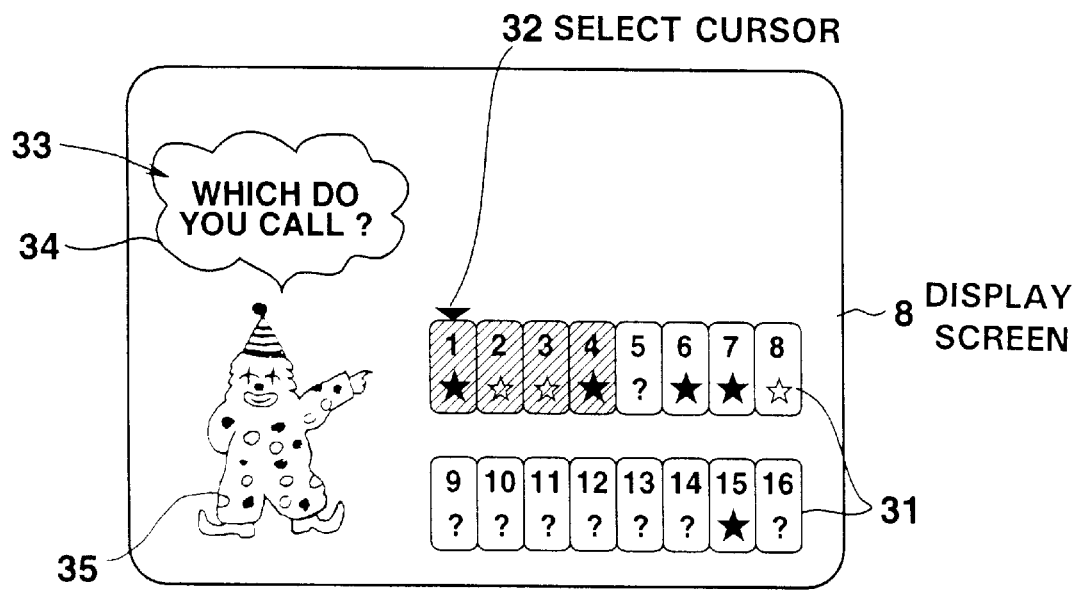
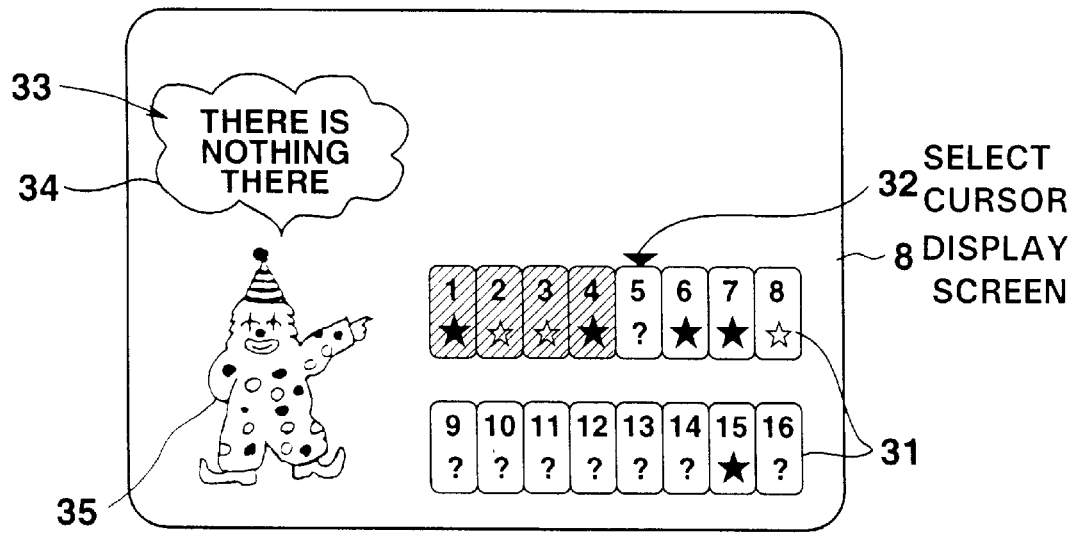

FIG.8A

| No.1 | "WHICH DO YOU CALL ?" |
|---|---|
| No.2 | "THERE IS NOTHING THERE." |
| No.3 | "IS THIS PERSON OK WITH YOU ?" |
| No.4 | "IS THIS OK WITH YOU ?" |
| No.5 | "WHERE DO YOU RECORD IT ?" |
| No.6 | "HERE, OK ?" |
| No.7 | "YOU CAN'T RECORD IT THERE." |
| No.8 | "YOU RECORDED IT WELL." |

FIG.8B

| No.1 | "I WILL RECORD ○○." |
|---|---|
| No.2 | "○○ WILL DISAPPEAR." |
| No.3 | (DISPLAY OFF) |

FIG.8C

| No.1 | BALLOON DATA |
|---|---|
| No.2 | SHAPE DATA |
| | ⋮ |

FIG. 28

| BALLOON | | | | |
|---|---|---|---|---|
| 1) MEDIUM | 2) LOUDY | 3) A LITTLE CHEERFUL | 4) WEAKLY | 5) THINKING MENTALLY |
| 6) MECHANICAL VOICE | 7) VERY HAPPY | 8) UPSET | 9) VOICE HEARD OVER THE TELEPHONE | |

FIG.29A
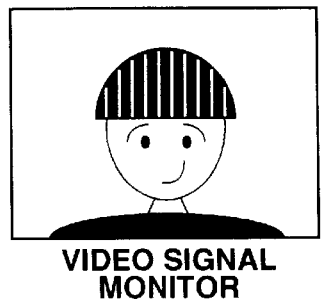
VIDEO SIGNAL MONITOR
FIG.29B
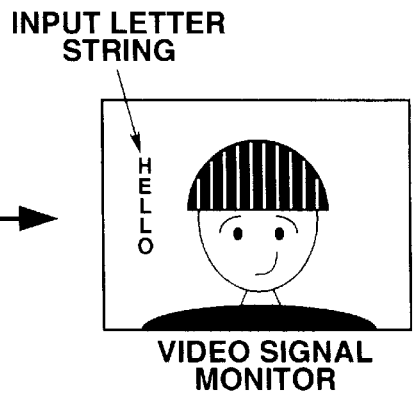
VIDEO SIGNAL MONITOR
→ LETTER STRING INPUT
FIG.30A
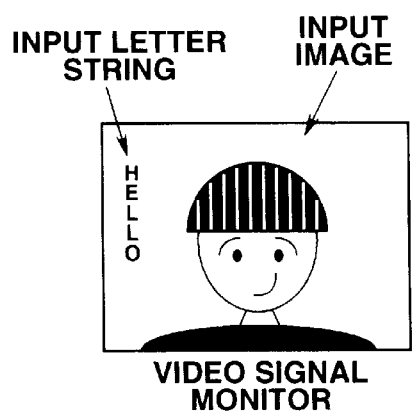
VIDEO SIGNAL MONITOR
→ "A" BUTTON
FIG.30B
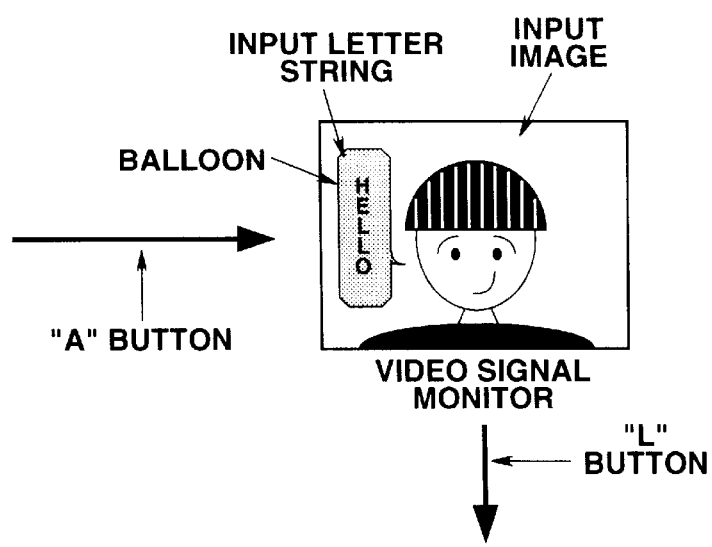
VIDEO SIGNAL MONITOR
↓ "L" BUTTON
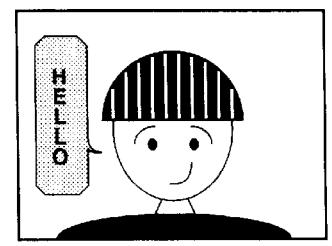
PRINT
INPUT IMAGE DATA
+ LETTER STRING DATA
+ BALLOON DATA
FIG.30C

INPUT LETTER STRING
INPUT IMAGE
VIDEO SIGNAL MONITOR

INPUT LETTER STRING
INPUT IMAGE
BALLOON
A BUTTON
VIDEO SIGNAL MONITOR

"L" BUTTON

PRINT
INPUT IMAGE DATA
+ LETTER STRING DATA
+ BALLOON DATA

FIG.32
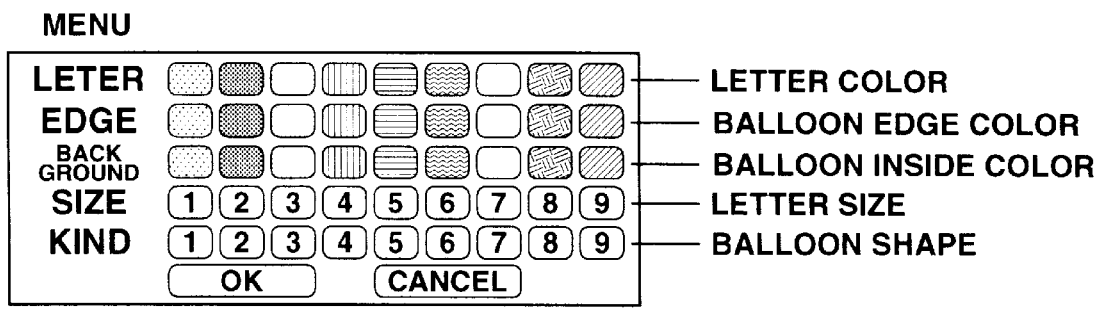
- LETTER COLOR
- BALLOON EDGE COLOR
- BALLOON INSIDE COLOR
- LETTER SIZE
- BALLOON SHAPE
FIG.33A            FIG.33B
ON MONITOR
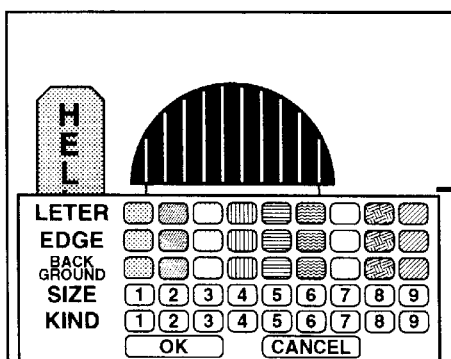
MENU DISPLAY
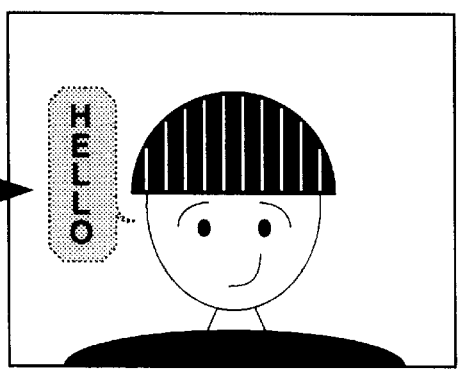
CHANGED BALLOON "EDGE" COLOR
ON MONITOR
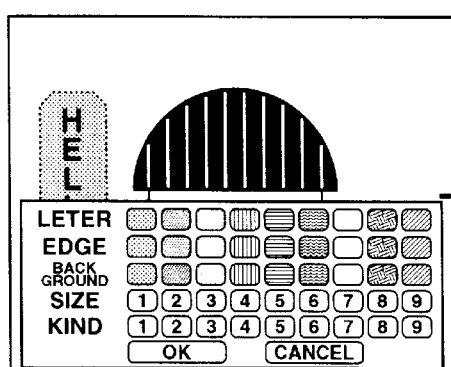
MENU DISPLAY
CHANGED BALLOON "BACKGROUND" COLOR
FIG.34A            FIG.34B

FIG.35A
ON MONITOR
FIG.35C
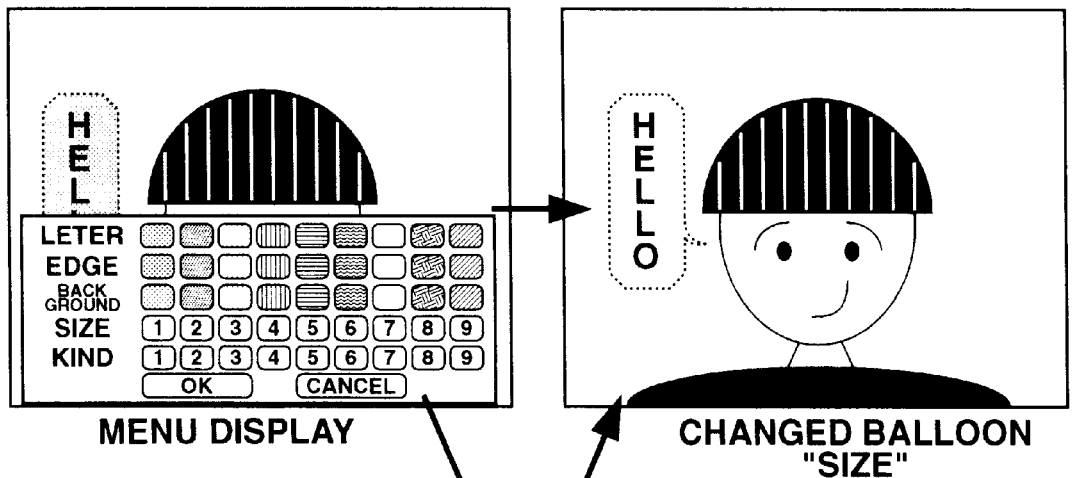
MENU DISPLAY
CHANGED BALLOON "SIZE"
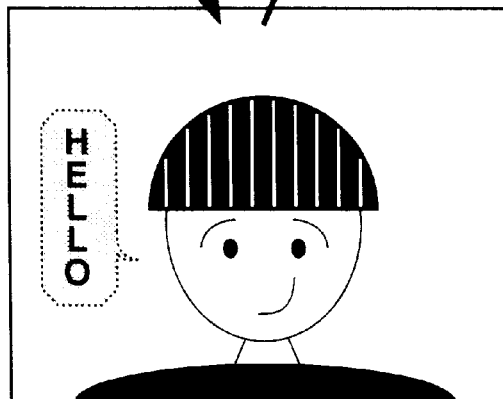
CHANGED LETTER STRING "SIZE"
(THIS IS AN INTERMEDIATE PROCESS STAGE
AND NOT ACTUALLY DISPLAYED ON THE
DISPLAY SCREEN)
FIG.35B

FIG.36
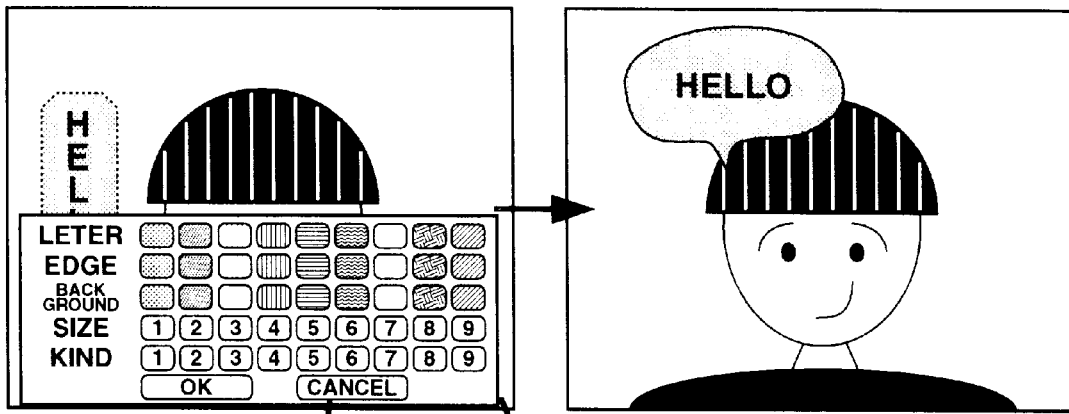
ON MONITOR
MENU DISPLAY
CHANGED BALLOON "KIND"
(THIS IMAGE LOOKS
MUTTERING MENTALLY)
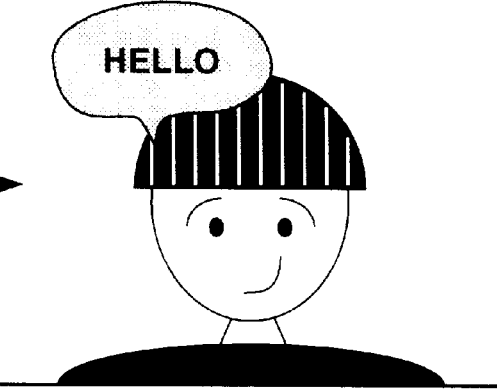
CHANGED BALLOON "KIND"
(THIS IMAGE GIVES
ORDINARY IMPRESSION)
CHANGED BALLOON "KIND"
(THIS IMAGE LOOKS
VIGOROUS)

MOVING CURSOR

INPUT LETTER LINK AND BALLOON ARE GROUND

OPERATING ELEMENT ("D"BUTTON)

UP,DOWN RIGHT,LEFT OR BUTTON

"HAND" MOVES INPUT LETTER STRING AND BALLOON

"A" BUTTON

LETTER STRING AND BALLOON STOP AND CURSOR DISAPPEARS

FIG.39
CONVERSION TABLE
| CONDITION | EXSAMPLE | BALLOON |
|---|---|---|
| THE END OF A LETTER STRING IS "!". | YOU SWINE ! DON'T BE A FOOL ! | 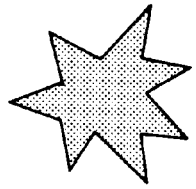 |
| THE END OF A LETTER STRING IS "␣". | HOW DO YOU DO ? THANK YOU. SO LONG. | 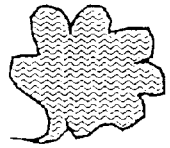 |
| THE END OF A LETTER STRING IS "?". | RIGHT ? REALLY ? | 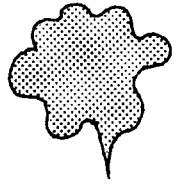 |
| OTHERS | |  |

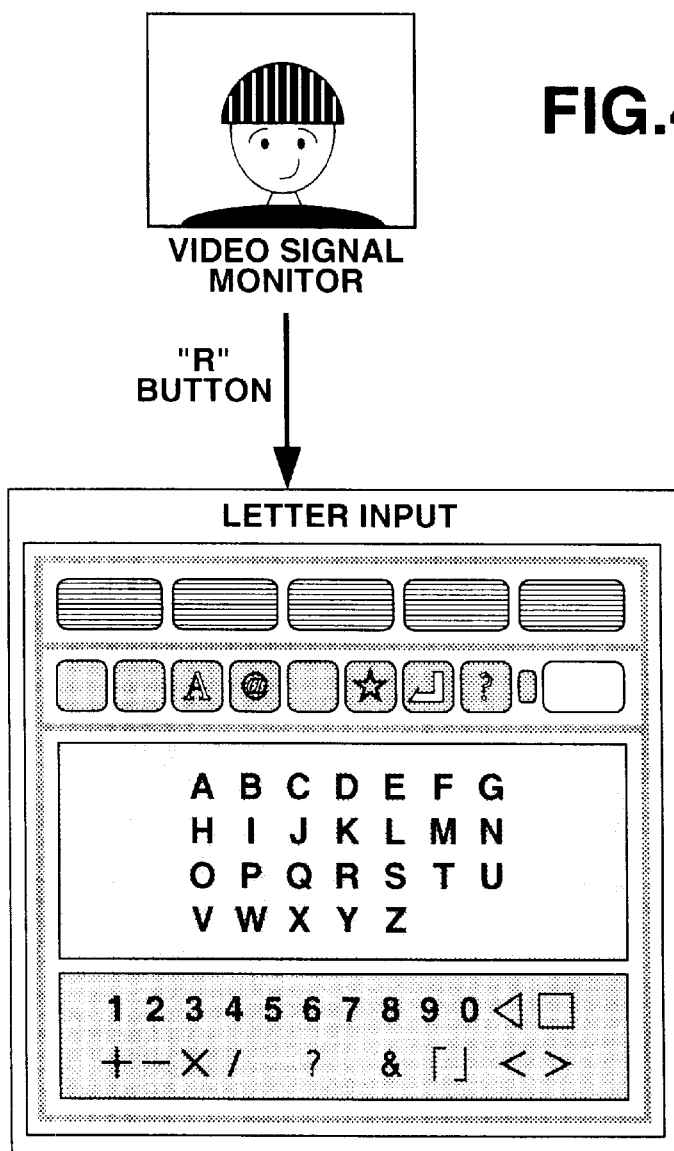
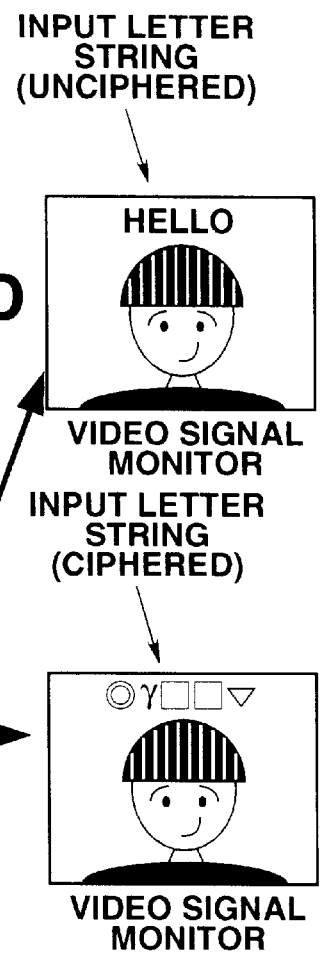
FIG.40A
FIG.40B
FIG.40C
FIG.40D

FIG.41

| A ♡ | B I | C ∫ | D ¥ | E γ |
|---|---|---|---|---|
| F ~ | G IX | H ◎ | I × | J ♂ |
| K △ | L □ | M ♤ | N VII | O ▽ |
| P ◇ | Q ✻ | R ⊃ | S @ | T X |
| U ♀ | V II | W No. | X % | Y ÷ |
| Z ♥ | | | | |

CIPHERING TABLE

FIG.50

| | | |
|---|---|---|
| FILE No. (HAIR) | ~NUM | |
| FILE NAME | ~FN | MODE SELECT DISPLAY SCREEN ~MSD |
| PART No. (BACK-GROUND) | ~PN0 | |
| PART No. (HAIR) | ~PN1 | QUESTIONNAIRE DISPLAY SCREEN ~AMD |
| PART No. (OUTLINE) | ~PN2 | |
| PART No. (EYES) | ~PN3 | SEX SELECT DISPLAY SCREEN ~SSD |
| PART No. (NOSE) | ~PN4 | AGE SELECT DISPLAY SCREEN ~OSD |
| PART No. (MOUTH) | ~PN5 | |
| SEX | ~ATT1 | BODY SHAPE SELECT DISPLAY SCREEN ~BSD |
| AGE | ~ATT2 | PERSONALITY SELECT DISPLAY SCREEN ~CSD |
| BODY SHAPE | ~ATT3 | |
| PERSONALITY | ~ATT4 | FILE SELECT DISPLAY SCREEN ~FSD |
| BALLOON LETTER STRING | ~ME2N | FRAME SELECT DISPLAY SCREEN ~WSD |

FILE A includes rows from FILE No. through BALLOON LETTER STRING.

FILE B, FILE C, FILE D follow.

Additional display screens:
- LETTER STRING SELECT DISPLAY SCREEN ~MOSD
- BALLOON FRAME SELECT DISPLAY SCREEN ~FWSD

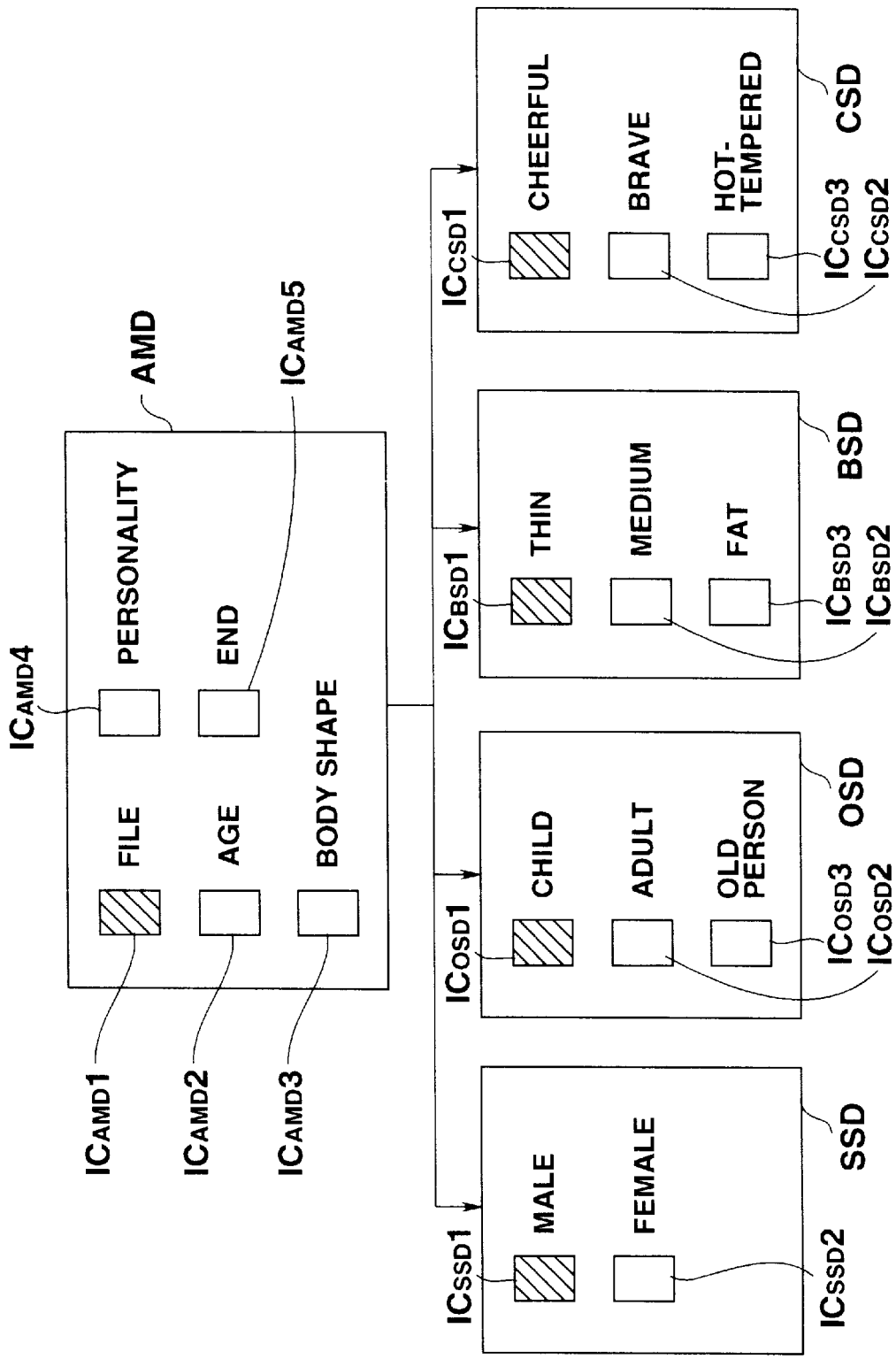

FIG.68A

| W1 | W2 | W3 | W3 | W4 | W5 |
|----|----|----|----|----|----|
| W6 | L | e | t | ' | W7 |
| W8 |  | s |  | p | l | W9 |
| W8 | a | y | ! |  | W9 |
| W10 |  |  |  |  |  |
|  | W11 | W12 | W12 | W13 | W14 |

FIG.68B

| W1 | W2 | W3 | W3 | W3 | W3 | W3 | W3 | W3 | W3 | W3 | W4 | W5 |
|----|----|----|----|----|----|----|----|----|----|----|----|----|
| W6 | L | e | t | ' | s |  | p | l | a | y | ! | W7 |
| W10A | W12 | W12 | W12 | W12 | W12 | W12 | W12 | W10B | W11 | W12 | W13 | W14 |

IMAGE PROCESSOR FOR DISPLAYED MESSAGE, BALLOON, AND CHARACTER'S FACE

BACKGROUND OF THE INVENTION

1. Field of the Invention

The present invention relates to image processors which process images of faces of characters and images representing letters or symbols.

2. Description of the Related Art

In a conventional image processor such as an electronic notebook or a word processor, the contents of a file composed of image data indicative of a letter or a picture are edited on the display screen or stored in a predetermined storage area of a memory such as a RAM or printed by a printer, or the contents of a file stored in the memory are called out.

In order to facilitate the file processing operation in the conventional processors, a mark called an icon corresponding to a respective one of the files is displayed on a menu display screen. By employing such method, the file processing operation is performed by manipulating the display screen without inputting the title of a file composed of letters, etc., so that operability is facilitated.

For example, when a file is to be called from the memory, one of a plurality of icons on a menu screen is selected by a select cursor which moves in the display screen in accordance with a user executed manipulation. A file in the storage area corresponding to the selected icon is recalled and displayed on the screen, and edition and/or printing can then be performed.

However, in the conventional image processor, the state of the storage area can not be determined; that is, it cannot be determined whether files are stored in storage areas corresponding to the respective icons displayed on the menu screen or whether a file can be stored in a storage area. Thus, the user would often select a wrong icon by which the user tries to recall a file from a storage area where no files have been stored or to store a file in a storage area where no files can be stored. Thus, each time the user performs a wrong operation, she is required to again select an icon by selecting a menu screen, that is, she is compelled to perform a complicated operation. By selection of a wrong icon, trouble may arise in that a file may be stored in a storage area where an important file is already stored to thereby erase the important file.

Also, when the contents of a file recalled from the memory are processed on the display screen, a plurality of items to be processed are displayed as a menu display on the screen. Any desired item may then be selected by the user's inputting operation and the processing operation depending on the selected item is performed.

Also, in this case, a cursor which moves in the display screen in correspondence to the user's inputting operation is displayed and moved to a position where an item to be selected is displayed. Thus, the user recognizes the item to be selected depending on the position of the cursor and performs the subsequent operations to fix whether the item should be selected or not.

However, when the respective items displayed on the menu screen have a complicated menu structure, for example, which includes a plurality of options, the user can not understand the contents of the respective options only depending on the cursor indication. Thus, the user is bewildered about the following operation to be performed and may then commit a mistake in the operation. In the case of a beginner, she may not be able to perform the following operation at all.

Image processors such as electronic notebooks, word processors or pagers have the functions of electronically creating and displaying a portrait in the form of an illustration to provide a display screen toward which the user can feel friendly.

Those processors employ a system in which a video signal obtained by picking up the image of an actual face is received as digital image data or a system in which data on various kinds of part images which delineate the respective parts of a face such as "eyes", "nose", "mouth" or "outline" are stored beforehand in a memory and data on the images of the respective parts is selected and read from among data on those part images stored in the memory and a face image having desired looks is formed.

However, only by displaying a face image on the display screen, the image itself has no meaning. If this face image is used to inform the user of the method of operating the processor or to transmit a message which informs the user of the content of a recalled file, the message can give the user a conspicuous impression. For example, with respect to a pager, it has been proposed to display a caller's desired message in addition to a face image created as a portrait.

Only by displaying the face image and the message on the same display screen, however, a sufficient effect of rendering the message conspicuous can not be expected.

As described above, conventionally, although it has been proposed to display a message as being supplemental to the face image, it has been never considered to display a message in harmony with the displayed face image.

In addition, a message displayed usually as accompanying a face image is required to be changed depending on the sex, age, body shape, personality and expression of the character having the face image. For example, even messages having the same meaning may differ in wording depending on the sex thereof or a face image having an angry expression is required to express a message in a balloon of an angry type.

SUMMARY OF THE INVENTION

It is therefore an object of the present invention to provide an image processor which enables secure recognition of information in a storage area of a memory in which a file to be processed on the display screen is stored, and whereby when this processing is performed while viewing the menu screen, the processing can be performed easily even if the menu structure is complicated.

In order to achieve the above object, according to one aspect of the present invention, there is provided an image processor comprising:

first display signal outputting means for outputting a first display signal to display a predetermined image;

second display signal outputting means for outputting a second display signal to display information corresponding to the predetermined image based on the first display signal; and third display signal outputting means for outputting a third display signal to display an emphasized image which emphasizes the display of information corresponding to the second display signal.

According to this structure, when the second display signal displays information on the storage area, the image which emphasizes the information on the storage area is simultaneously displayed by the third display signal. Thus, the user's attention to the information is strongly called to thereby cause the user to recognize the information securely, compared to the conventional uniform display. Thus, a possible trouble which would otherwise arise from a mistake in the operation can be prevented.

When the second display signal displays information on the respective ones of a plurality of items displayed on the menu screen, the image which indicates this information is displayed by the third display signal. Thus, when the data inputting operation is performed while viewing the menu screen on the display, the processing step to be next performed can easily and securely recognized, and hence the processor can be operated easily even when it has a complicated menu structure.

It is another object of the present invention to call the user's attention to a message by displaying the message so as to further harmonize with the face image when the face image and the message are displayed on the display screen to thereby further improve the power of expression of the face image.

In order to achieve the just-mentioned object of the present invention, according to one aspect of the present invention, there is provided an image processor comprising:

first display signal outputting means for outputting a first display signal to display a face image;

second display signal outputting means for outputting a second display signal to display an image which indicates message information to be displayed as accompanying the face image on the basis of the first display signal; and third display signal outputting means for outputting a third display output signal to display the image of a figure which surrounds a display area for an image indicating the message information based on the second display output signal.

According to this structure, the message information can be expressed in a balloon type expression which is often used in a cartoon or animation and in which the message information is surrounded by a surrounding figure so as to harmonize with the face image. Thus, the message appears as if it were issued from the face image to thereby further improve the power of expression of the face image.

BRIEF DESCRIPTION OF THE DRAWINGS

The other objects and features of the present invention will be described easily by those skilled in the art from the description of the preferred embodiments of the present invention when taken in conjunction with the accompanying drawings.

In the drawings:

FIG. 7 illustrates one example of a menu display screen in the file select process;

FIGS. 8A to 8C show one example of data recorded in the ROM; i.e., FIG. 8A shows one example of an explanatory text; FIG. 8B shows one example of a warning text; and FIG. 8C shows one example of a balloon; FIG. 9 shows one example of a menu display screen used in the file select process;

FIG. 9 illustrates one example of a menu display screen in the file select process;

FIG. 28 shows a surrounding figure, data on which the apparatus of FIG. 27 has;

FIGS. 29A and 29B illustrate an image processing function of the apparatus;

FIGS. 30A to 30C illustrate an image processing function of the apparatus;

FIG. 32 shows a menu display screen, data on which the image control apparatus has;

FIGS. 33A and 33B illustrate an image processing function of the apparatus;

FIGS. 34A and 34B illustrate an image processing function of the apparatus;

FIGS. 35A to 35C illustrate an image processing function of the apparatus;

FIG. 36 illustrates an image processing function of the apparatus;

FIG. 39 shows a conversion table, data on which the apparatus has;

FIGS. 40A to 40D illustrate an image processing function of the apparatus;

FIG. 41 shows a cipher conversion table, data on which the apparatus has;

FIG. 50 shows a memory map indicative of the memory structure of ROM 12 in the fourth embodiment;

FIG. 52 illustrates the structure of an questionnaire display screen AMD, sex select display screen SSD, age selection display screen OSD, body shape select display screen BSD, and personality select display screen CSD and the relation among them in the fourth embodiment;

FIGS. 68A and 68B illustrate one example of the balloon frame changing process.

DESCRIPTION OF THE PREFERRED EMBODIMENTS

First Embodiment

An image processor as a first embodiment of this invention will be described next with reference to FIGS. 1–18.

Figure 1:
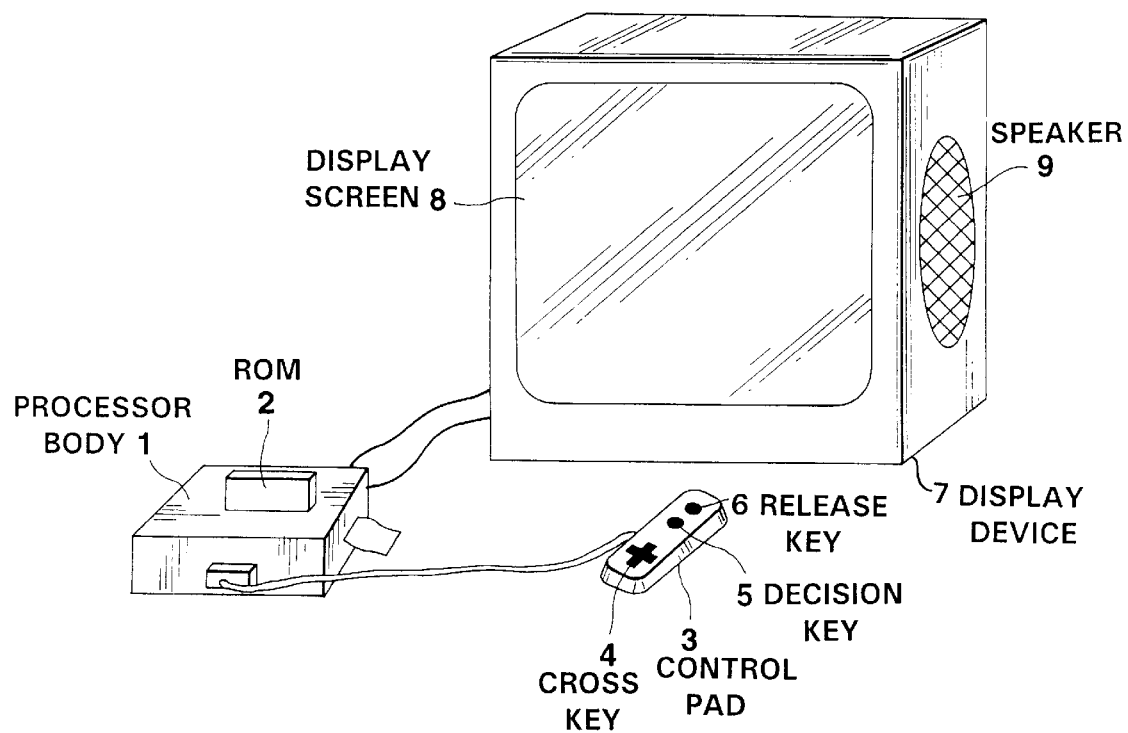
FIG. 1 is a perspective view of a system structure of a first embodiment of the present invention.

FIG. 1 is a perspective view of the first embodiment indicative of its system structure. In FIG. 1, the processor body 1 has an image processing function and a printing function. ROM 2 is a read only memory of a cassette type which is insertable into the body 1 and which contains application programs (hereinafter referred to as "programs" simply), part image data used in the image processing and other various data which will be described later. A control pad 3 is connected to the body 1 to thereby command image processing and other control operations. The control pad 3 has a cross key 4, decision key 5 and release key 6. An external display device 7 is a general television set connected to the body 1 and includes a display screen 8 and a speaker 9.

Figure 2:
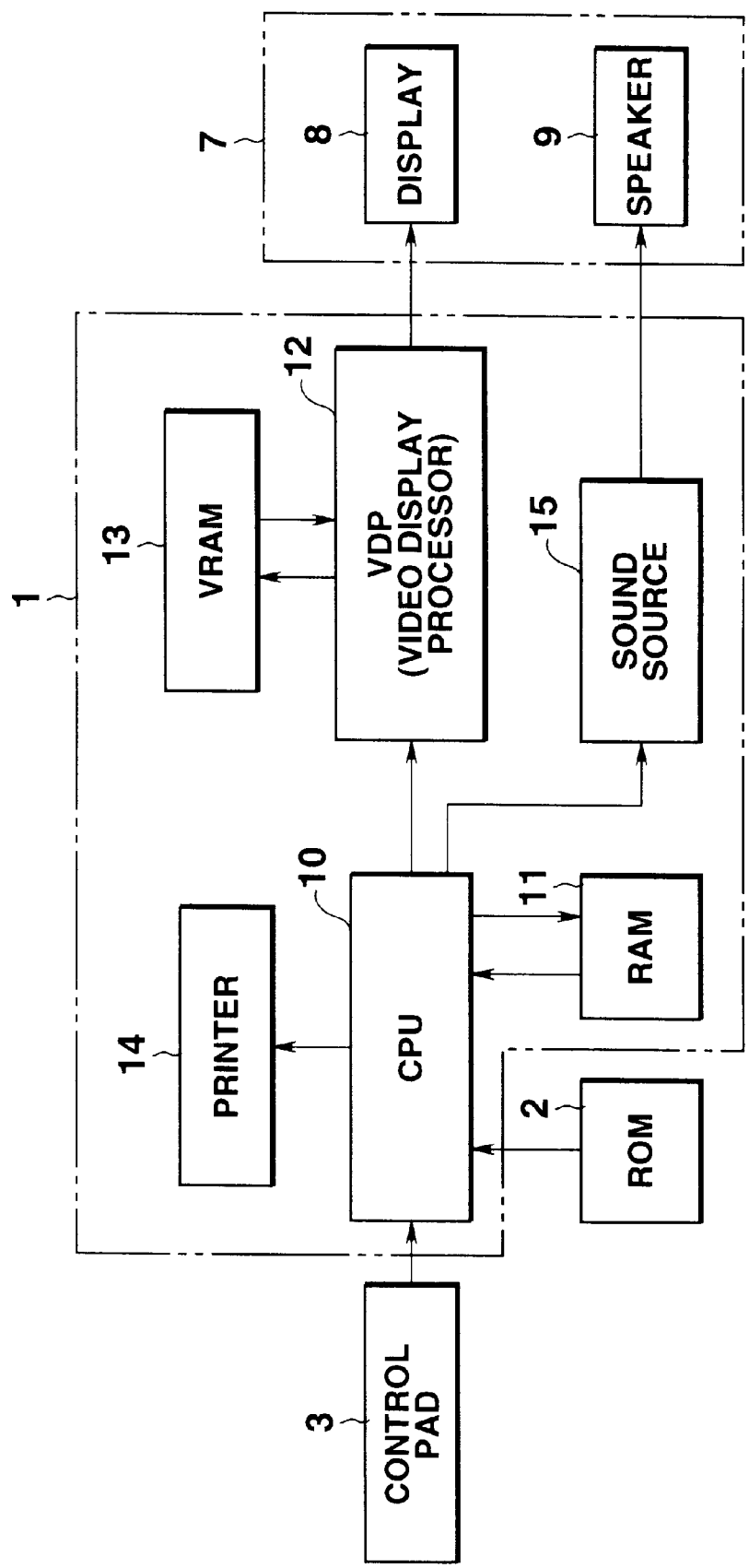
FIG. 2 is a block diagram indicative of the system structure of the first embodiment.

FIG. 2 is a block diagram indicative of the system structure of FIG. 1. CPU 10 is connected to ROM 2 and control pad 3 so that it reads a program, etc., from ROM 2 and performs image processing and other control operations on the basis of commands from control pad 3. The image data to be processed includes image data, for example, of indicative of the shape of a human being and an object. RAM 11 is connected to CPU 10 and is used as a work area which temporality records programs, etc., read from ROM 2 and which temporality records image data and other data necessary for the image processing. A video display processor 12 is connected to CPU 10 so that it outputs an image signal to display screen 8 of external display device 7 in accordance with a command from CPU 10 for displaying purposes. VRAM 13 is connected to a video display processor 12 so that it sends video display processor 12 dot data corresponding to a display position in the display device 8 in accordance with a read command from video display processor 12 and records image data output from CPU 10 in accordance with a write command from video display processor 12. A printer 14 is connected to CPU 10 to print image data recorded in RAM 11 in accordance with a command from CPU 10. A sound source 15 is connected to CPU 10 so that it sends speaker 9 of external display device 7 a voice signal indicative of an alarm sound or music necessary for the image processing and display in accordance with voice data output from CPU 10.

Figure 3:
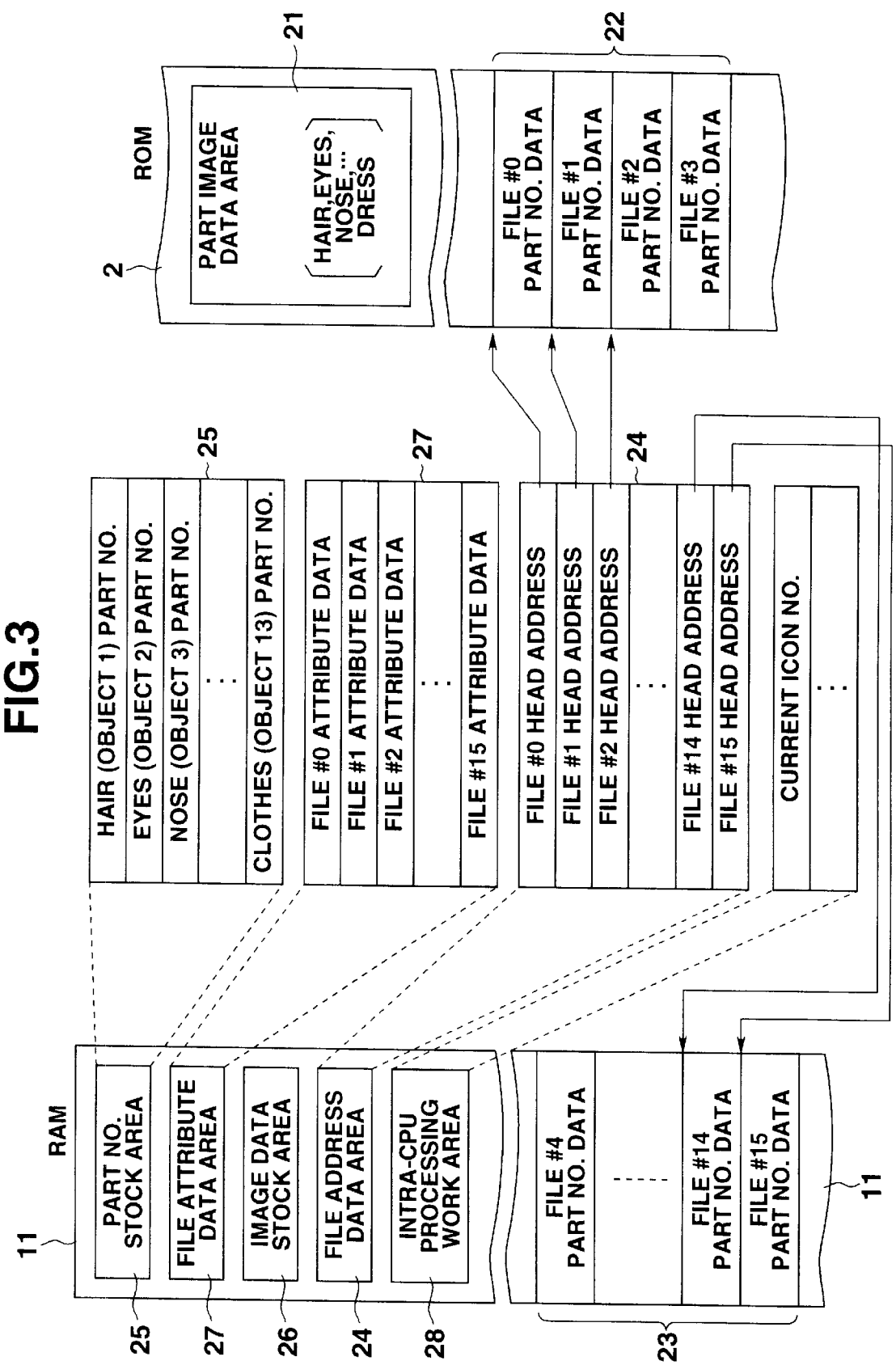
FIG. 3 shows the area map of a ROM and RAM.

FIG. 3 shows an area map of ROM 2 and RAM 11. A part image data area 21 of ROM 2 contains data on a plurality of different images for each of the parts which make up a character or an object; for example, in the case of part data on a plurality of different categories for hair, eyes, nose, clothes, etc., which make up a character, data on a plurality of different part shapes for each category with each part having an assigned number. Each part number uniquely indicates the category and shape thereof. Thus, different character images are each created by selecting the images of parts one from each category and combining them, and a file including data on a plurality of part numbers is managed in correspondence to image data.

In the case of the first embodiment, a part number data area 22 of ROM 2 has 4 files #0–#3 which record data. A part number data area 23 of RAM 11 has 12 files #4–#15 which record data. The head addresses of those 12 areas are recorded in a file address data area 24 of RAM 11. Data on part numbers stored in any one of the 16 files #0–#15 is recorded temporarily in part number stock area 25 of RAM 11. Data on the image of a person, etc., composed of parts having their numbers recorded in the part number stock area 25 is stored in an image data stock area 26 of RAM 11. Data indicative of the contents of each file is stored in a file attribute data area 27 of RAM 11.

Figure 4:
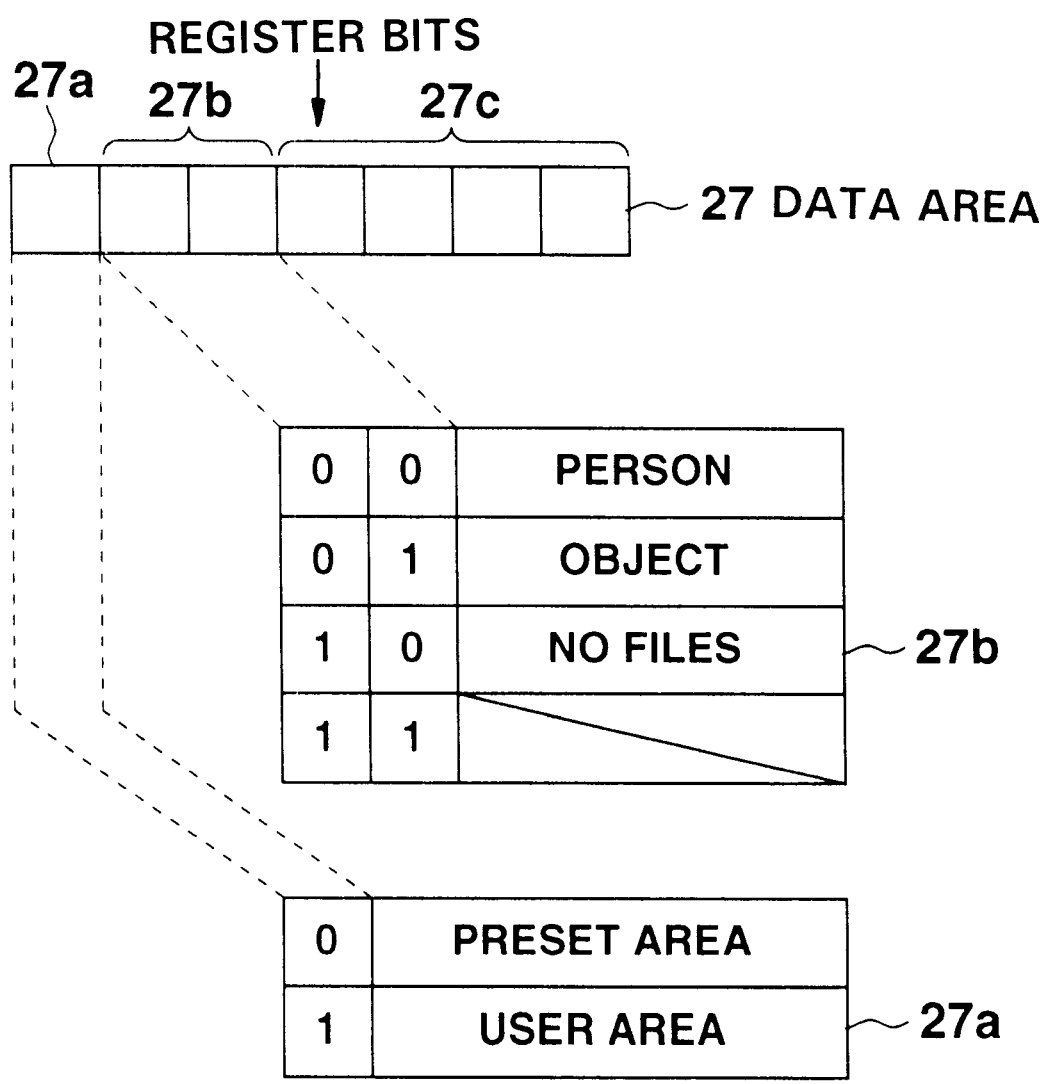
FIG. 4 shows the structure of a file attribute data area of the RAM.

As shown in FIG. 4, each file attribute data area 27 is composed of a register of bits. That the most significant bit is 0 in the register indicates a part number data area where the user can not record any file (preset area) while that the most significant bit is 1 indicates that a part number data area where the user can record a file (user area). That the next two bits 27b are 0 indicates that the part number data in a file recorded in that area relates to data on a person's image. That the two bits are 0,1 indicates that the part number data in a file recorded relates to data on the image of an object; that the two bits are 1, 0 indicates that no files are recorded in that area; and that the last four bits 27c indicates a number to identify a respective one of the 16 areas. An intra-CPU processing work area 28 records data on a current icon number.

The operation of the first embodiment will be described next. When a power supply (not shown) for the system body 1 and the external display 7 is turned on, this system starts up, so that CPU 10 reads the programs from ROM 2 to RAM 11 to thereby execute this program.

Figure 5:
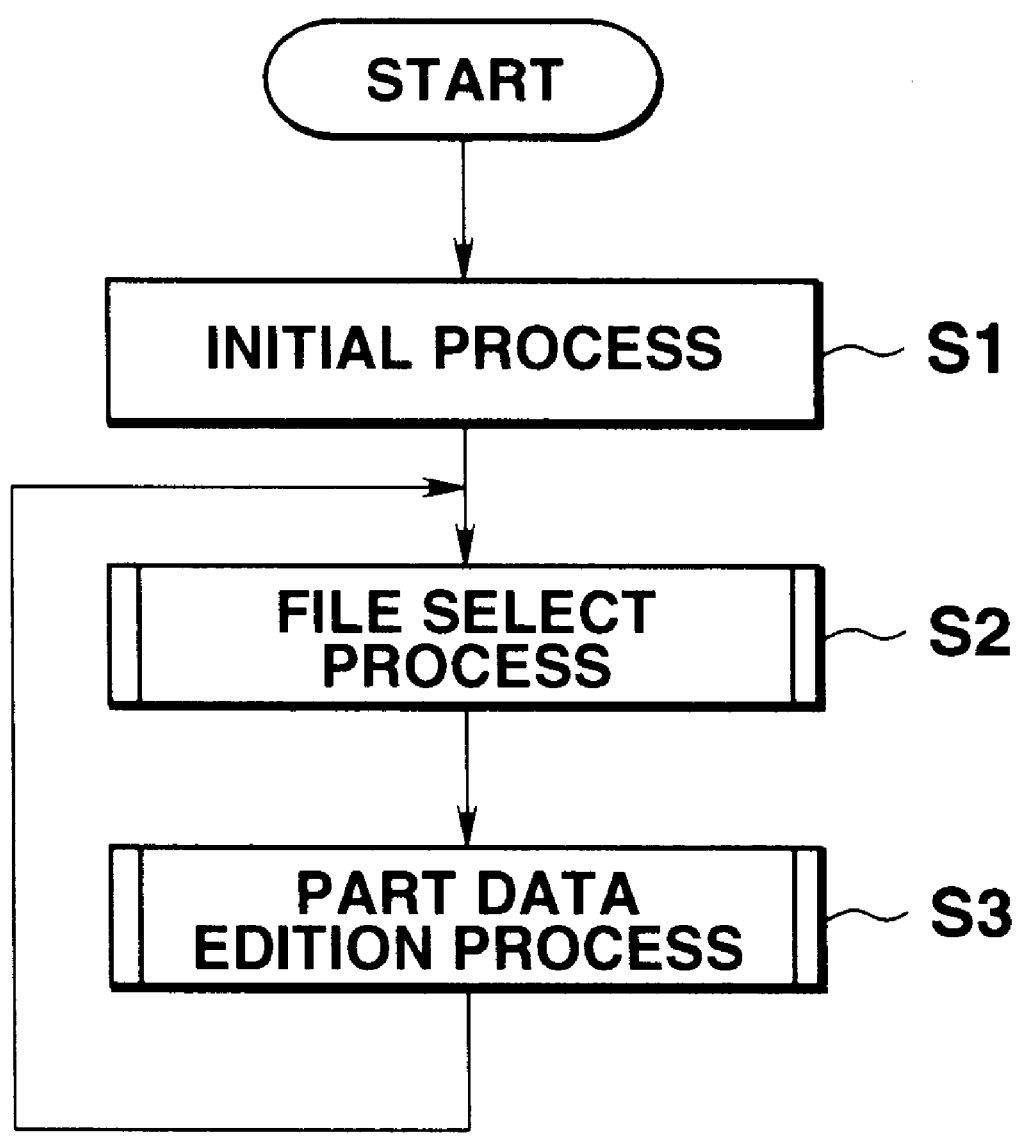
FIG. 5 is flow chart of a main program indicative of the operation of the first embodiment.

FIG. 5 shows a flow chart indicative of a main program. First, initialization is performed for the whole system (step S1). A file select process is then performed to read out a file which relates to an image to be edited (step S2).

Figure 6:
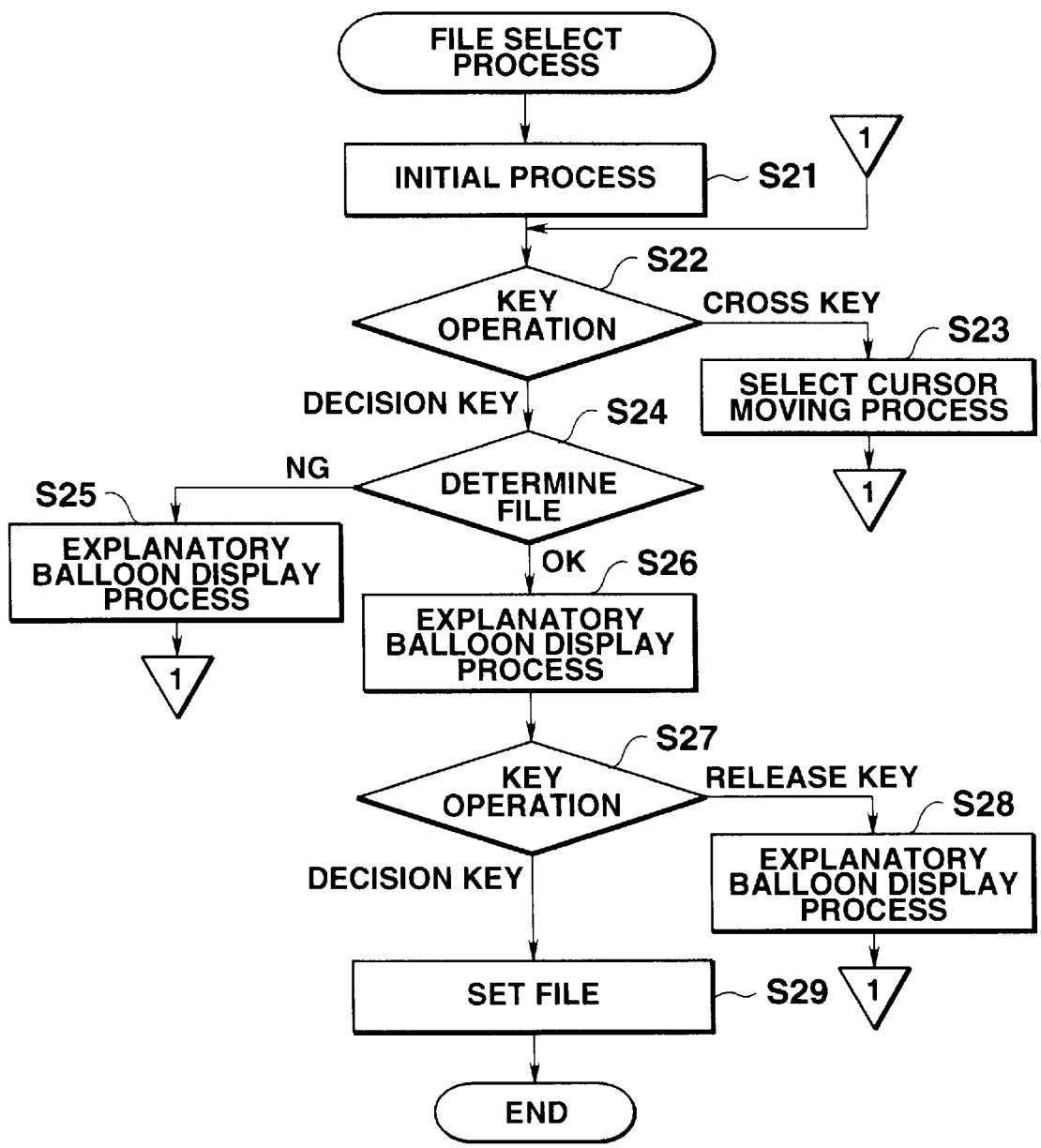
FIG. 6 is a flow chart of a program indicative of a file select process.

FIG. 6 is a flow chart indicative of a program for the file select process. First, an initial process is performed to display a menu display screen on display 8 (step S21). As shown in FIG. 7, 16 icons (marks) 31 and a select cursor 32 which is used to select any one icon are displayed on the menu screen in this case. In addition, an explanatory text (information) 33 for the user, and images of a peculiar illustration such as emphasizes this explanatory text 33, for example, a balloon (surrounding mark) 34 which surrounds the explanatory text 33 and the image of a clown 35 which issues the balloon 34 are displayed. In this case, the clown image 35 is an animation which moves right and left.

Numbers "1"–"16" are indicated on corresponding 16 icons 31 in correspondence to data in file attribute area 27. Icons having numbers "1"–"4" are each displayed in an inverted manner to indicate that they correspond to a file in the preset area; icons having numbers "5"–"16" show that they correspond to the files in the user area in a regular display. A black or white star mark is displayed depending on whether part number data in the file relates to a person or an object. A question mark "?" is displayed when no file is recorded.

Data on explanatory text 33, explanatory balloon 34 and clown image 35 displayed in the menu display screen is recorded in ROM 2, and the contents of the data to be displayed changes depending on a menu display screen to be displayed. FIG. 8A shows one example of explanatory text 33. Explanatory text 33 of the menu screen of FIG. 7 is "Which do you call?" and displayed as a message which urges the user to select an icon. Data on balloon 34 and clown's image 35 is displayed by reading balloon and shape data of FIG. 8C. Since balloon 34 and clown image 35 animation are displayed so as to emphasize explanatory text 33, the user pays attention to the screen and recognize that explanatory text 33 is information which urges the user to select an icon and operates control pad 3.

Thereafter, at step S22 of FIG. 6, a key operation is determined. If the depressed key is a cross key 4, a select cursor moving process is performed to move select cursor 32 to the position of the operational icon (step S23). The control then passes to the determination of the key operation at step S22. When decision key 5 has been operated, file attribute data area 27 is referred to and a file corresponding to the icon at the position of select cursor 32 is determined (step S24). That is, it is determined whether a file can be read out from part number data area 22 or 23. In this case, the user can determine the presence of a file, using the mark of an individual icon. If the user is a beginner or since user's possible misoperations or oversight of a mark is considered, CPU 10 determines a file corresponding to a selected icon.

When select cursor 32 indicates an icon having a number "5", determination of a file in an area corresponding to this icon clarifies that nothing is recorded in the area. Thus, no files can be read out, the data "there is nothing there" in the explanatory text of FIG. 8A is read and an explanatory balloon display process is performed (step S25). Thus, as shown in FIG. 9, explanatory text "there is nothing there" 33 is displayed along with a characteristic balloon and an animation clown image 35 in explanatory balloon 34 on the menu screen. By paying attention to this display, the user confirms whether a file has been recorded in an area corresponding to the selected icon. In this case, the user recognizes that explanatory text 33 indicates information which urges the user to select another icon, and operates the control pad 3.

Figure 10:
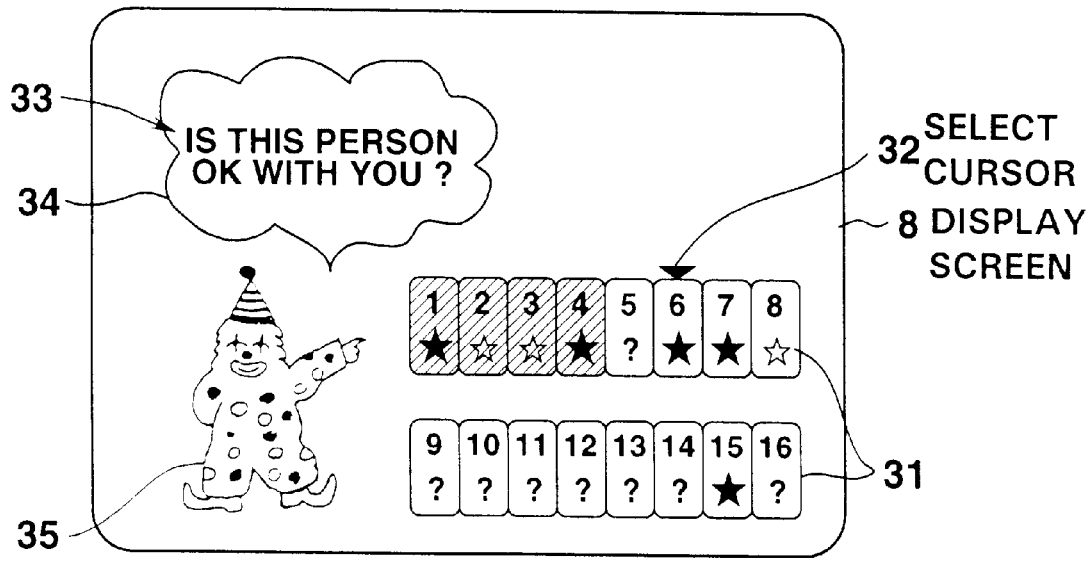
FIG. 10 illustrates one example of a menu display screen in the file select process.
Figure 11:
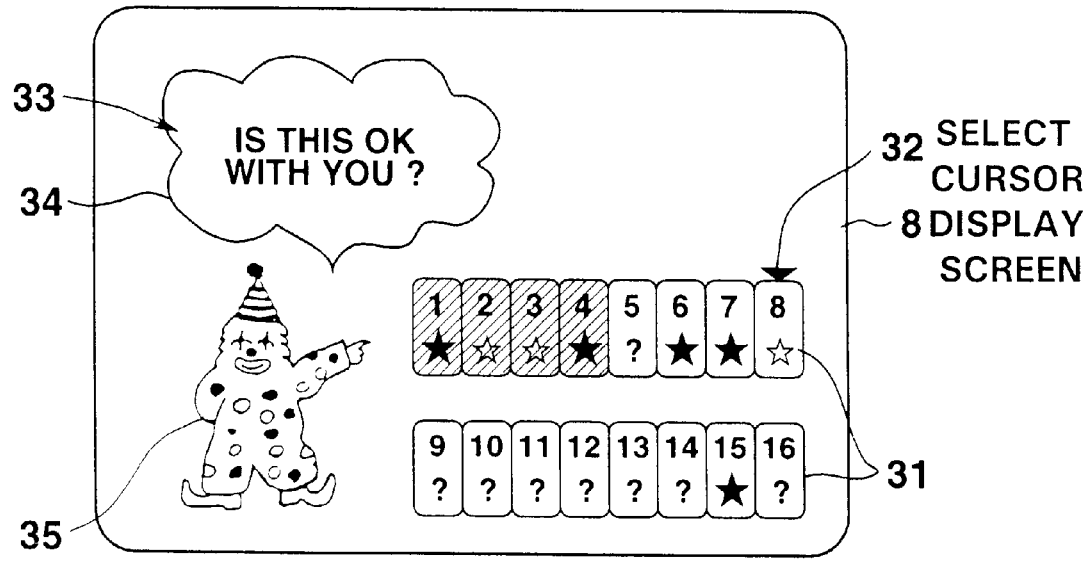
FIG. 11 illustrates one example of a menu display screen in the file select process.

When it is determined in the file determination process at step S24 that the file corresponding to the selected icon is readable, an explanatory balloon display process is performed which displays explanatory text 33 depending on the determination of a file from among the explanatory texts of FIG. 8A (step S26). For example, when an icon having a number "6" is selected, the image data relates to a character, so that as shown in FIG. 10, explanatory text 33 "Is this character OK with you?" is displayed along with a characteristic image on the menu screen. For example, when an icon having a number "8" is selected, the image data relates to an object, so that as shown in FIG. 11, explanatory text 33 "Is this character OK with you?" is displayed along with a characteristic image on the menu screen. By paying attention to this display, the user operates decision key 5 or release key 6 on the control pad 3.

When any one of those keys is depressed, its operation is determined (step S27). If release key 6 is depressed, an explanatory balloon display process is performed (step S28). In this case, the menu screen of FIG. 7 appears, and an explanatory text "which do you call?" is displayed. If decision key 5 is depressed, a file set process is performed in which the head address of an area corresponding to the selected icon in file address data area 24 is referred to and a file corresponding to that address is read and the part number of the file is stored in part number stock area 25 (step S29). In this case, data on a plurality of parts one for each of the categories corresponding to the part numbers in a file stored in part number stock area 25 is read from part data area 21 and the image, for example, of a character composed of data on the plurality of parts is recorded in image data stock area 26. This image data is then read from image data stock area 26 and displayed on display 8 through video display processor 12 and VRAM 13.

When a file has been called in the file select process, the control passes to a part data edition process (step S3) of FIG. 5.

Figure 12:
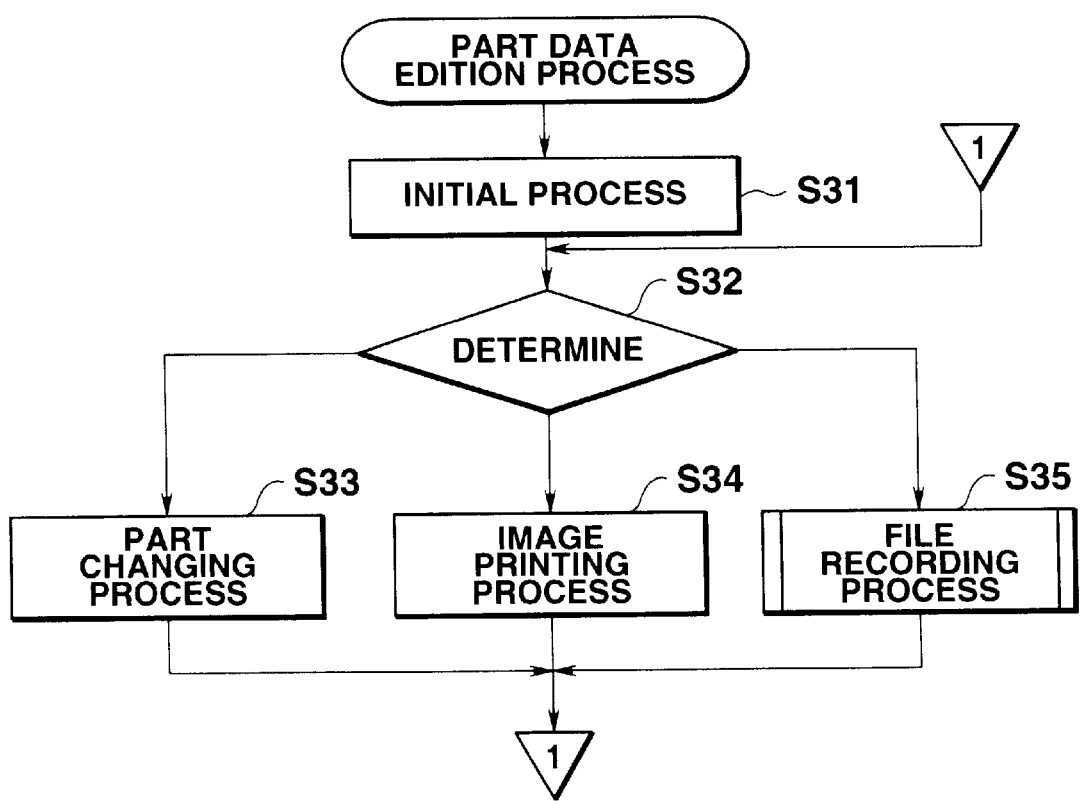
FIG. 12 is a flow chart of a program indicative of a part data edition process.

FIG. 12 is a flow chart of a program indicative of a part data edition process. First, an initial process is performed (step S31). A menu display screen (not shown) is then displayed for editing purposes. It is determined by operating a select key (not shown) on control pad 3 which process should be performed (step S32). In the case of a part changing process (step S33), the part number in part number stock area 25 is changed. In the image printing process (step S34), image data recorded in image data stock area 26 is sent to printer 14 to thereby print out the image. In the case of a file recording process (step S35), the edited file is recorded.

Figure 13:
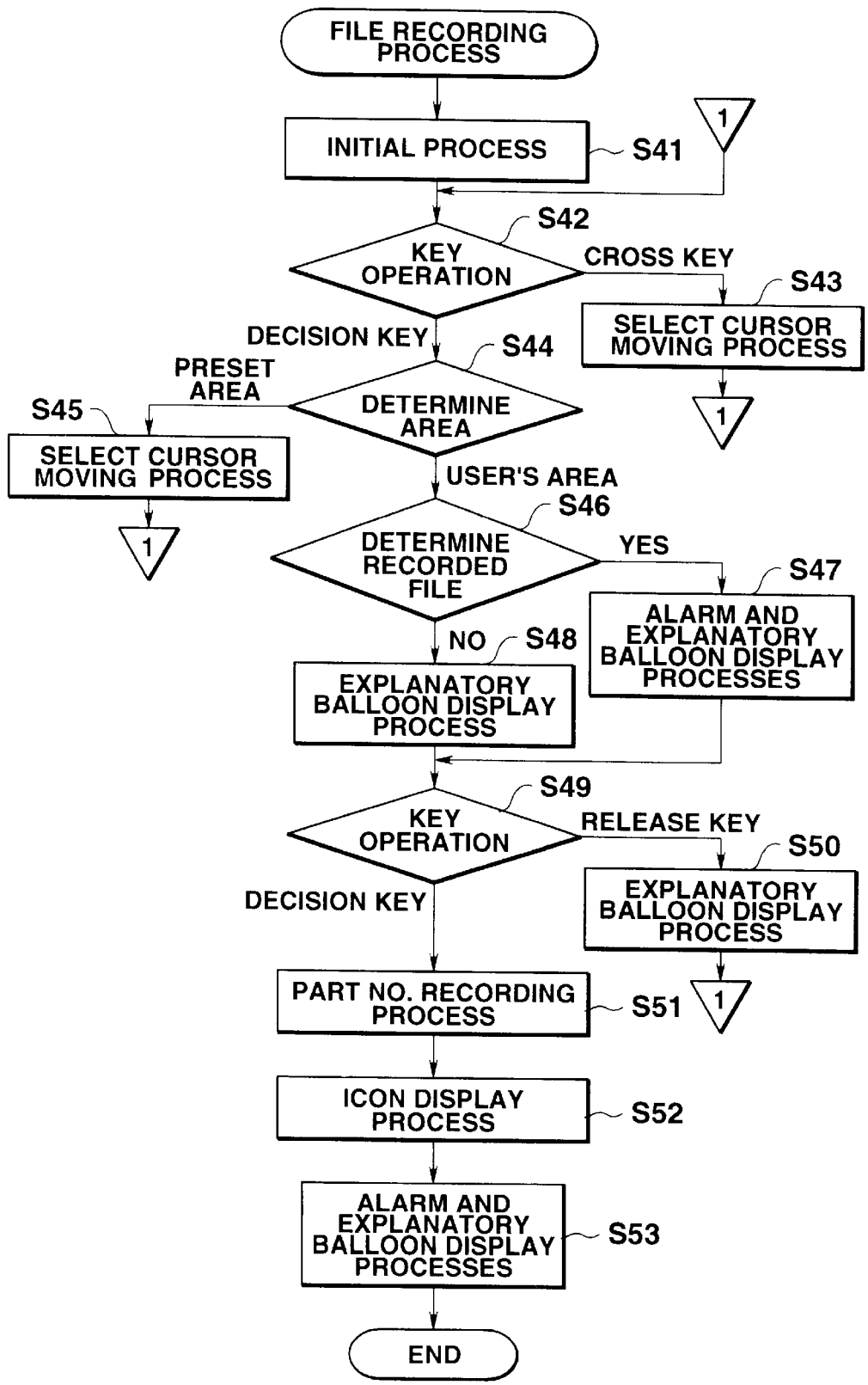
FIG. 13 is a flow chart of a program indicative of a file recording process.
Figure 14:
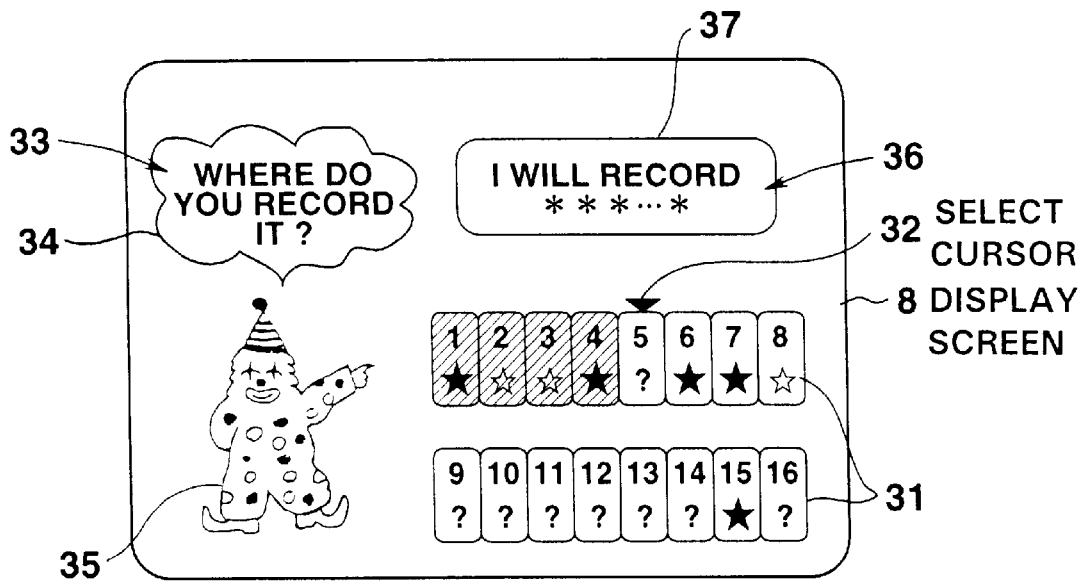
FIG. 14 illustrates one example of a menu display screen in the file recording process.

FIG. 13 is a flow chart of a program indicative of the file recording process. First, an initial process is performed (step S41) to thereby display a menu display screen such as is shown in FIG. 14. In this case, explanatory text 33 "where is the file recorded?" of FIG. 8A is displayed along with characteristic balloon 34 and animation clown image 35. In addition, alarm text 36 is displayed along with surrounding mark 37 above icon 31. In this case, alarm text 36 is displayed which is "I will record ******" composed of combined "******" which denotes the name of a part to be recorded and alarm data "I will record" in ROM 2 of FIG. 8B.

Since characteristic balloon 34 and animation clown image 35 are displayed along with explanatory and alarm texts 33 and 36, the user pays attention to the screen and recognizes that explanatory text 33 is information which urges the user to select an icon, recognizes that a part number which alarm text 36 records relates to target part data, and then operates control pad 3.

Figure 15:
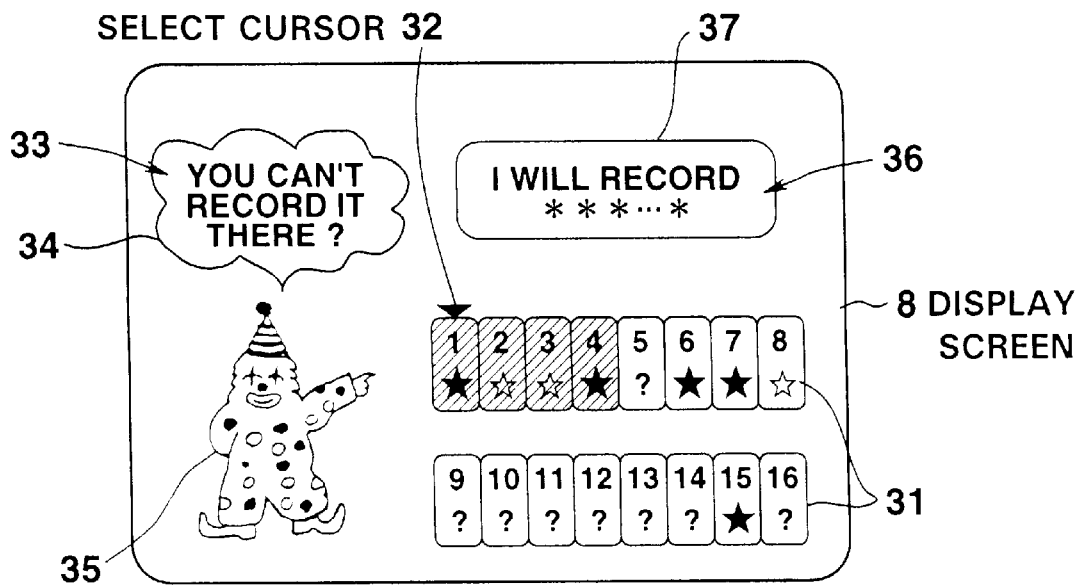
FIG. 15 illustrates one example of a menu display screen in the file recording process.

When a key is depressed, its operation is determined (step S42). When the depressed key is cross key 4, the select cursor moving process is performed to move select cursor 32 to the position of an icon corresponding to the operation (step S43). The control then passes to the determination of the key operation at step S42. When decision key 5 has been depressed, file attribute data 27 in RAM 11 corresponding to an icon which select cursor 32 indicates is referred to and an area portion of part number data area 22 where the part number to be recorded is determined (step S44). For example, when select cursor 32 is at the position of an icon having a number "1", it is determined that the corresponding area portion is the preset area and the explanatory balloon display process is performed (step S45). In this case, as shown in FIG. 15, explanatory text 33 "You can not record data there" of FIG. 8A is displayed along with a characteristic image. Since the characteristic image is displayed along with explanatory text 33 and alarm text 36, the user pays attention to the screen and recognizes whether the area corresponding to the selected icon is recordable. In this case, the user recognizes that explanatory text 33 is not recordable and implies information which urges the user to select another icon, and operates control pad 3.

Figure 16:
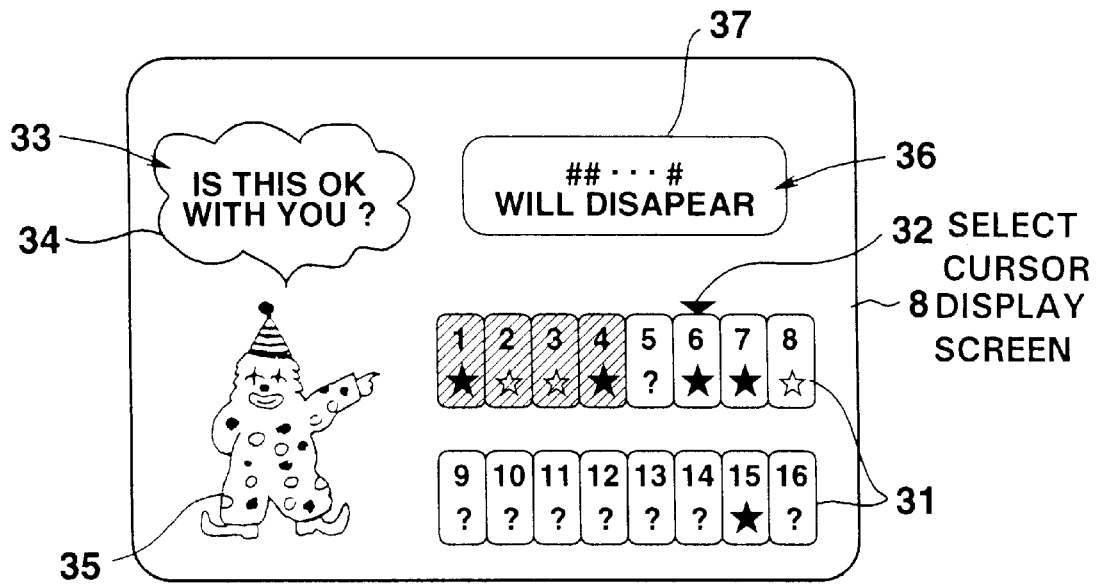
FIG. 16 illustrates one example of a menu display screen in the file recording process.

When it is determined at step S44 that the area corresponding to the selected icon is user's area, it is then determined whether another file has been recorded in that area (step S46). For example, when select cursor 32 is at the position of an icon having a number "6", another file is already recorded in the corresponding area. Thus, as shown in FIG. 16, alarm text "######## will disappear" composed of a combination of recorded image data name "########" and alarm data of FIG. 8B "will disappear" is displayed in a surrounding mark 37, and simultaneously, explanatory text "Is this OK with you?" is displayed along with a characteristic image (step S47). The user pays attention to the screen, and recognizes that alarm text 36 is information for the user to confirm the erasure of the file on the basis of the characteristic image, and operates any one of decision key 5 or release key 6.

Figure 17:
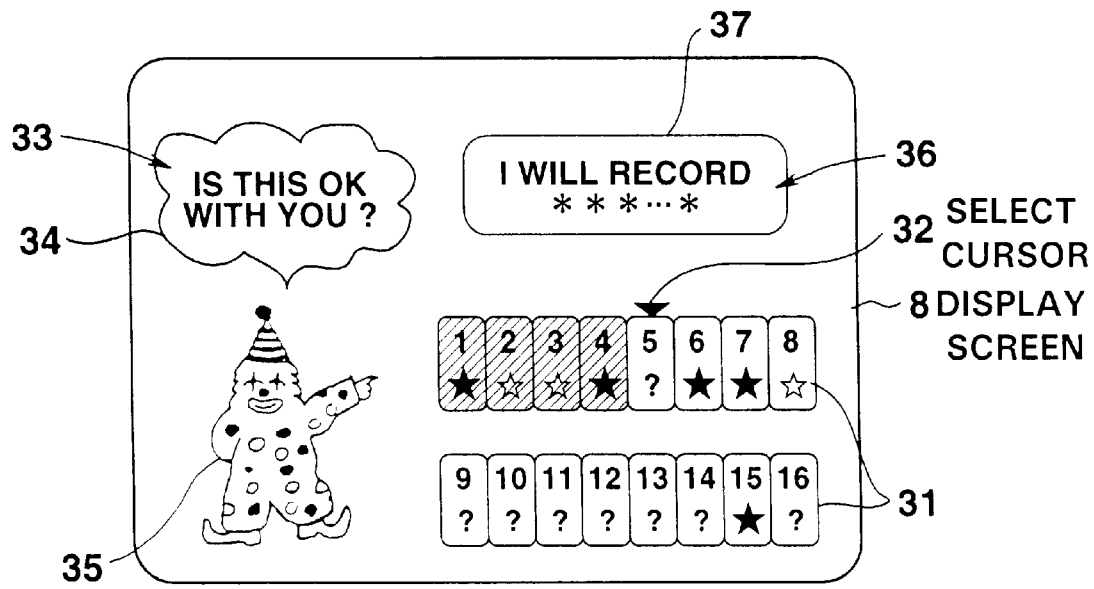
FIG. 17 illustrates one example of a menu display screen in the file recording process.

When select cursor 30 is at the position of an icon having a number "5", no file is recorded in an area corresponding to the icon. Thus, as shown in FIG. 17, explanatory text 33 "Is this OK with you?" is displayed along with a characteristic image, as shown in FIG. 17 (step S48). In this case, since alarm text 36 is the same in content as alarm text 36 of FIG. 15, a new alarm display process is not performed.

Figure 18:
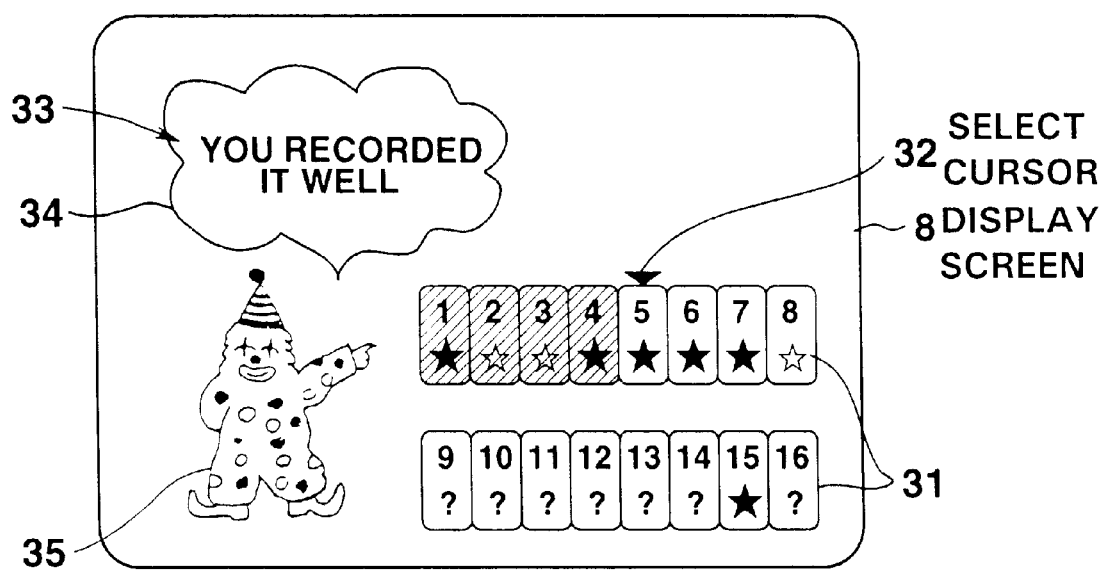
FIG. 18 illustrates one example of a menu display screen in the file recording process.

Next, the key operation is determined (step S49). When release key 6 is depressed, an explanatory balloon display process is performed which displays a menu screen of FIG. 14 (step S50). If decision key 5 is depressed, data on the part numbers stored in part number stock area 23 is recorded in an area #4 of part number data area 25 of RAM 11 corresponding to the selected icon (step S51). When the mark of the selected icon changes, a file icon display process is performed (step S52). For example, when an icon having a number "5" has been selected, the mark of this icon is changed from a mark "?" indicative of being empty to a black star mark indicative of a person. As shown in FIG. 18, a process for erasing the display of alarm text 36, that is, a process for reading alarm data "DISPLAY-OFF" of FIG. 8B is performed, and an explanatory balloon display process is performed (step S53). In this case, explanatory text "You recorded well" is displayed along with a characteristic image.

As described above, according to the first embodiment, when explanatory text 33, etc., about part number data area 22 or 23 corresponding to the selected icon are displayed, it is displayed along with a characteristic image which emphasizes that explanatory text 33, etc., that is, a balloon 34 and a clown image 35 which utters the balloon 34. Thus, the attention of the user is strongly called to the text compared to uniform display of letters, etc., alone and the information in a file in part number area 22 or 23 is recognized securely.

In this case, the display area for explanatory text 33 and the display area for balloon 34 which is a characteristic image are displayed in an overlapping manner, so that the user recognizes these images visually as a unit. Thus, no explanatory text 33 is overlooked.

While in the first embodiment the characteristic image which emphasizes explanatory text 33, etc., has been illustrated as balloon 34 and illustration clown image 35, other characteristic illustrations may be used as images to be displayed, may be a characteristic figure excluding the illustrations, or otherwise may be a combination of illustrations and figures.

While in the first embodiment an image which emphasizes explanatory text 33, etc., has been illustrated as having features in its shape, a characteristic image may be displayed in a color different from that of icon 31. In this case, explanatory text 33, etc., are further emphasized.

While in the first embodiment explanatory text 33, etc., have been displayed along with a characteristic image to call the user's attention to the text, explanatory text 33, etc., may be reported simultaneously by voice through a speaker. In this case, the user's attention can be called visually and acoustically to thereby produce a larger beneficial effect.

While in the first embodiment the programs have been illustrated as being recorded in the cassette type ROM 2 to be inserted into the body 1, the programs may be recorded in a ROM built in a one tip CPU. In this case, the whole apparatus will be reduced in size.

While in the first embodiment the external display device 7 which is a general television set has been illustrated as being connected to body 1, the external display device is not limited to the television set, but may be a display, for example, of a personal computer or an arrangement may be used in which the display, speaker and control pad are incorporated. When the displays, etc., are incorporated into body 1, a very compact apparatus is realized.

Second Embodiment

A second embodiment of the image processor according to the present invention will be described next. The image processor in this case creates the images of a person, an animal or an object in the form of dialogue (questionnaire) with the user through a displayed menu screen, and displays the created image and prints it.

The structure of the second embodiment will be described with reference to FIGS. 19 and 20. The system structure of the second embodiment is similar to that of the first embodiment.

Figure 19:
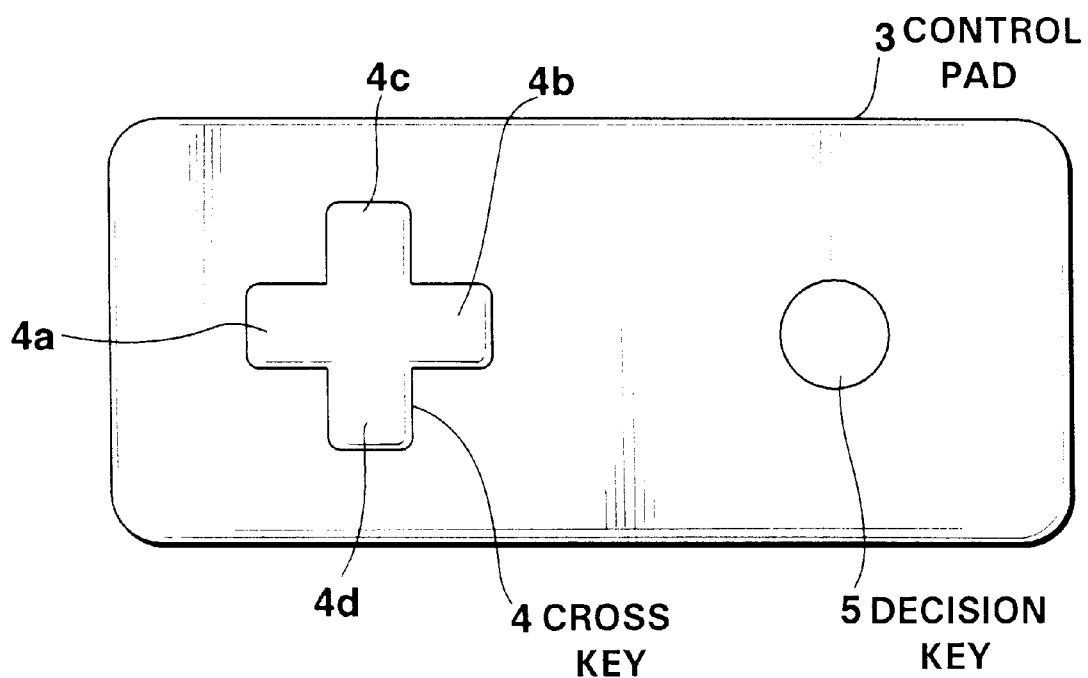
FIG. 19 shows the face of a control pad in a second embodiment of the present invention.

As shown in FIG. 19, the operating face of control pad 3 is provided with cross key 4 and decision key 5. Cross key 4 is turnable horizontally and vertically. By pushing a horizontal end 4*a* or 4*b* or vertical end 4*c* or 4*d* of the cross key, a switch (not shown) provided below the corresponding cross key end is actuated. Hereinafter, a push of the horizontal end 4*a* or 4*b* is referred to as a left or right key operation while a push of vertical end 4*c* or 4*d* is hereinafter referred to as an up or down key operation.

Figure 20:
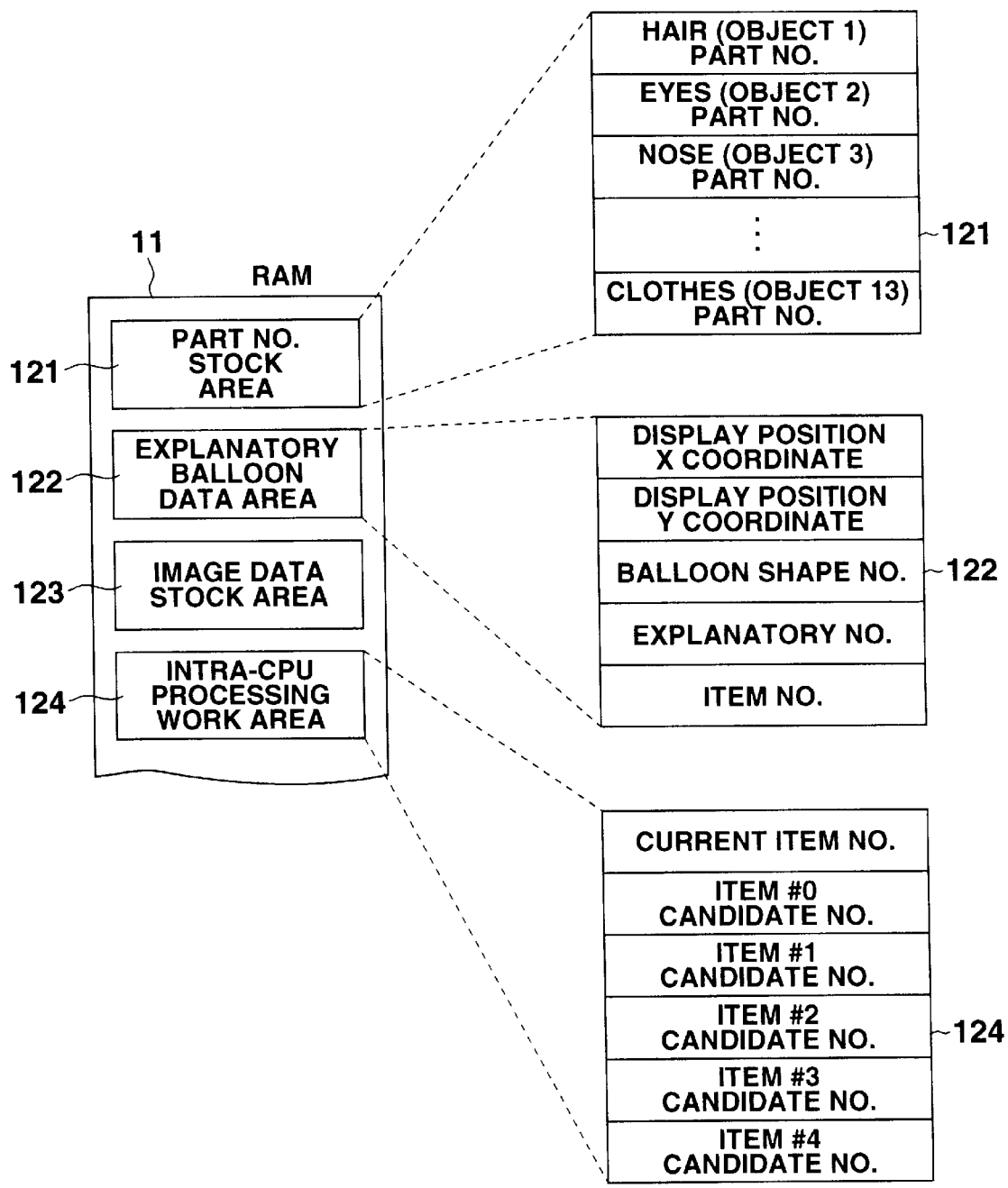
FIG. 20 shows an area map of the RAM.
Figure 21:
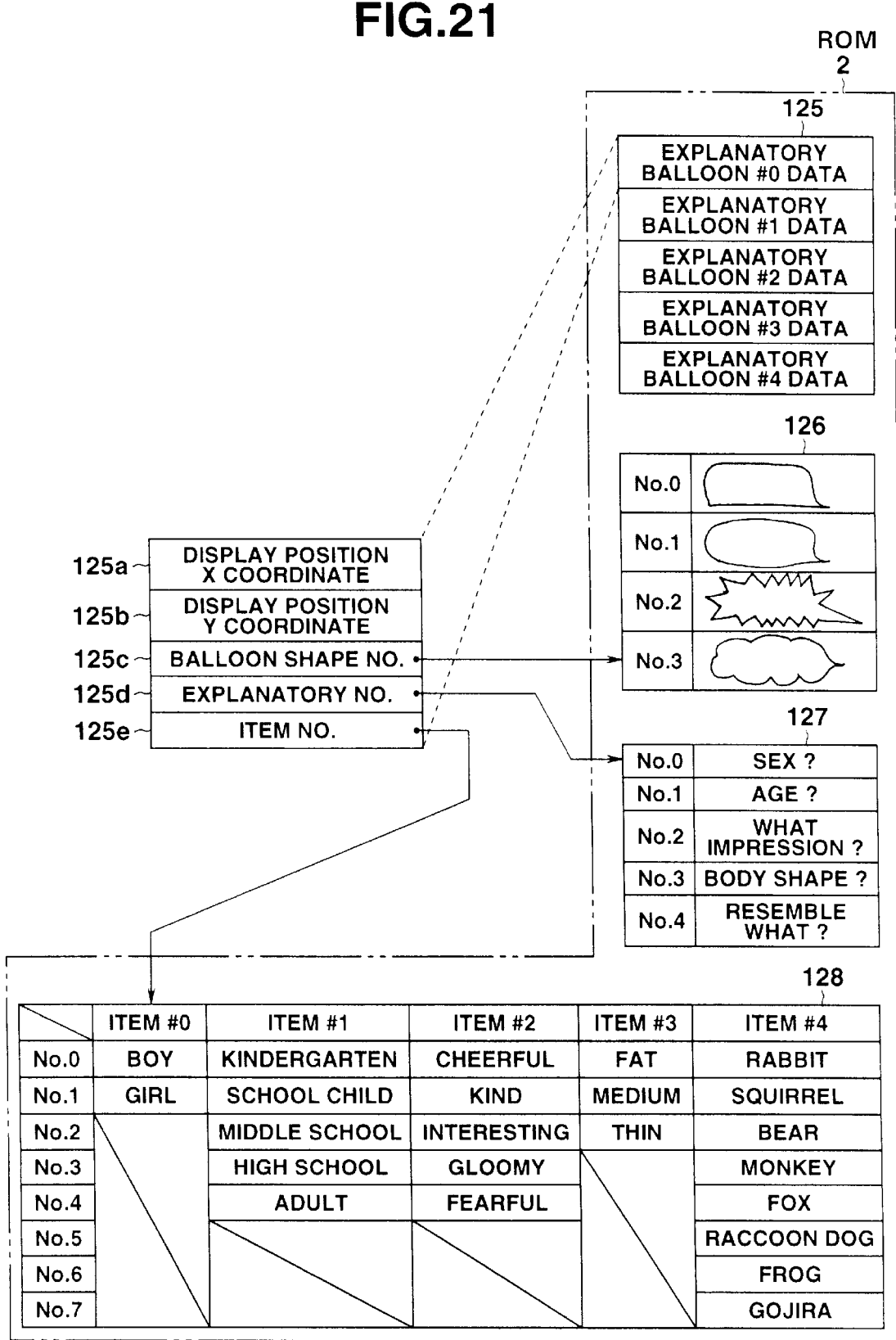
FIG. 21 shows data in a ROM which is recorded in an explanatory balloon data area.

FIGS. 20 and 21 show the data structure of RAM 11 and ROM 2, respectively. As shown in FIG. 19, RAM 11 includes a part number stock area 121, explanatory balloon area 122, image data stock area 123, and intra-CPU processing work area 124. Stored in part number stock area 121 is data on a plurality of part numbers corresponding to data on a like number of part images such as hair, eyes, nose, clothes images, etc. (not shown) which constitute the image of a person or an object and recorded in ROM 2. More specifically, a group of part numbers which constitutes an image is recorded in the part number stock area 121. Image data composed of a group of part numbers recorded in part number stock area 121 is recorded in image data stock area 123 when it is printed. Explanatory balloon data 125 recorded in ROM 2 is transferred to explanatory balloon data area 122.

As shown in FIG. 21, balloon shape data 126, explanatory balloon letter string data 127 and questionnaire item option data 128 are recorded in ROM 2 in addition to explanatory balloon data 125 transferred to RAM 1. Explanatory balloon data 125 is composed of data #0–#4 each being composed of five data items 125*a*–125*e*; that is, X and Y coordinates 125*a* and 125*b* which determine a display position on display 8, balloon shape number 125*c* indicative of one of Nos. 0–3 of balloon shape data 126, explanatory number 125*d* indicative of one of Nos. 0–4 of explanatory balloon letter string data 127 and an item number 125*e* corresponding to one of item numbers #0–#4 of questionnaire item option data 128. In this case, for example, in explanatory balloon #0 data of the explanatory balloon data 125, No. 3 is recorded as balloon shape number 125*c*, No. 0 as explanatory number 125*d*, and #0 as an item number. In questionnaire item option data 128, there is a plurality of options for each item with each option being designated a candidate number. Thus, as shown in FIG. 21, letter string data for one questionnaire item is specified, using an address composed of an item number and a candidate number.

Data on the numbers of items of the current question or data on the current item numbers and data on the candidate numbers of options displayed for each item are recorded in intra-CPU processing work area 124 of FIG. 20. CPU 10 records letter string data of questionnaire item option data 128 of ROM 2 into VRAM 13 through video display processor 12 on the basis of the corresponding candidate numbers of the respective items recorded in work area 124.

The operation of this embodiment will be described next with reference to FIGS. 22–26. When a power supply (not shown) for the body 1 and external display 7 is turned on, the system starts up and CPU 10 reads a program from ROM 2 into RAM 11 and executes the program.

Figure 22:
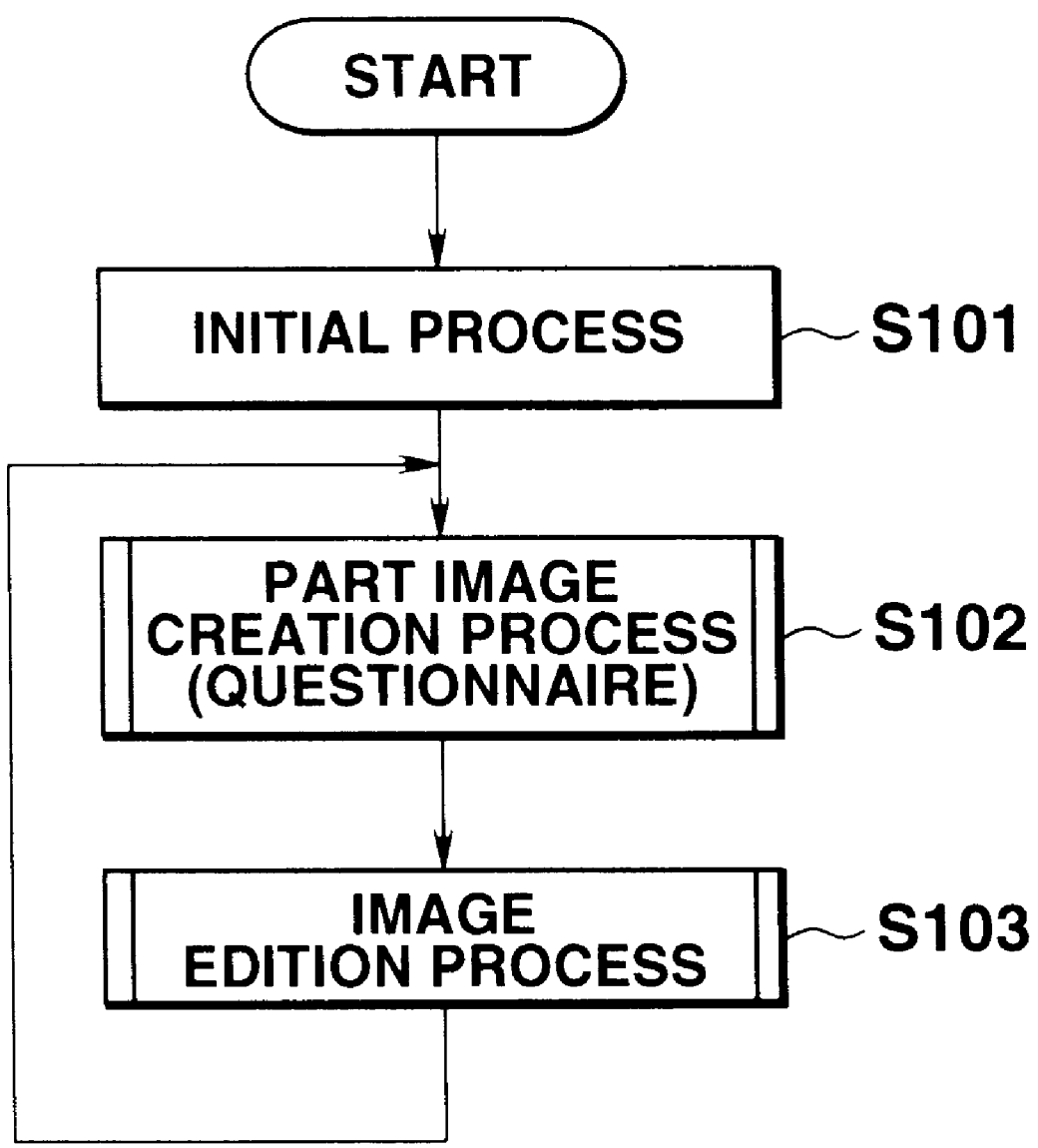
FIG. 22 is a flow chart of a main program indicative of the operation of the second embodiment.

FIG. 22 is a flow chart indicative of a main program executed by CPU 10. First, an initial process is performed for initializing the system (step S101). A part image creation process is then performed in the form of a questionnaire (step S102).

Figure 23:
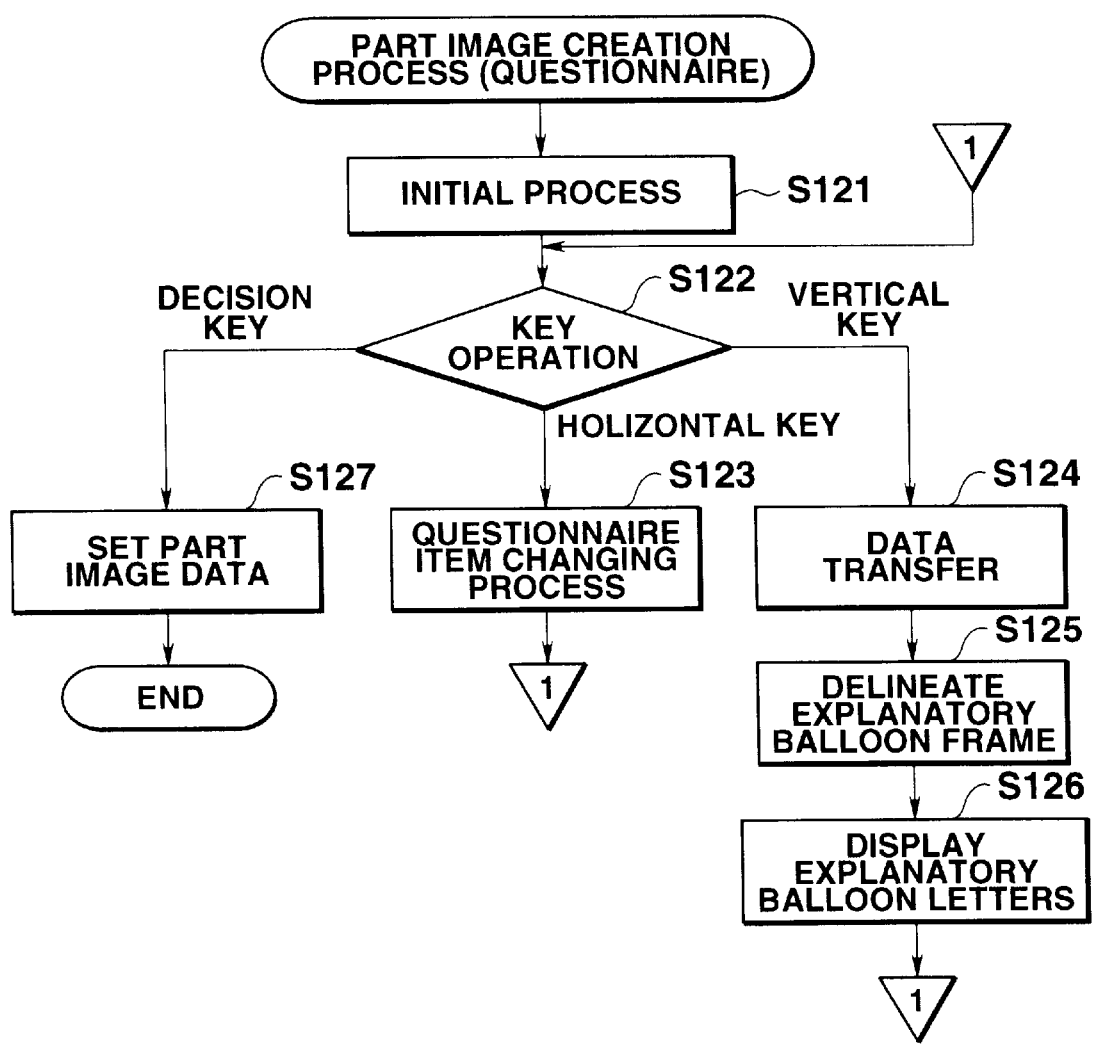
FIG. 23 is a flow chart of a program indicative of an image creation process.

FIG. 23 is a flow chart of a program indicative of the part image creation process. First, an initial process is performed to display a default menu image on display 8 (step S121). In this process, choicable questionnaire items and an explanatory balloon in which questions corresponding to the items are explained are displayed.

As the initial process for displaying the questionnaire items, the #0–#4 item candidate numbers in intra-CPU processing work area 124 of RAM 11 are set at 0 and letter string data "BOY", "KINDERGARTEN", "BRIGHT", "FAT", "RABBIT" having a candidate No. 0 of the respective items #0–#4 of questionnaire item option data 128 in ROM 2 are transferred to VRAM 13. Positional information which displays the letter strings of these five items of predetermined positions on the display 8 is set in video display processor 12.

The explanatory balloon default number is set at #0 and the current item number of intra-CPU processing work area 124 of RAM 11 is set at 0. Explanatory balloon #0 data is read out from explanatory balloon data 125 of ROM 2 on the basis of the current item number and transferred to explanatory balloon data area 122 of RAM 11. Thus, the display position X and Y coordinates of explanatory balloon #0 data, balloon shape No. 3, explanatory No. 0, and item No. 0 are recorded in explanatory balloon data area 122. Balloon shape data 126 corresponding to balloon shape No. 3 is read out from ROM 2 on the basis of the contents of explanatory balloon data area 122 and transferred to VRAM 13 and values corresponding to the display position X and Y coordinates are set in video display processor 12. Explanatory letter string data "SEX?" corresponding to explanatory No. 0 is read from ROM 2 and transferred to VRAM 13 and information on a position coincident with the position of display of a balloon frame is set in video display processor 12.

Figure 24:
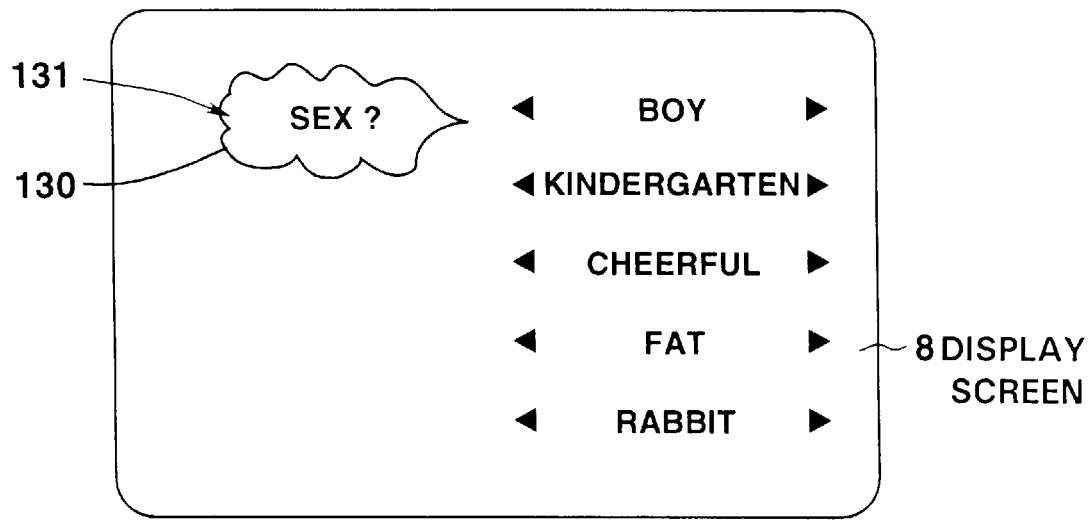
FIG. 24 shows one example of a menu screen in the image creation process.

FIG. 24 shows an initial menu display screen. "BOY", "KINDERGARTEN", "BRIGHT", "FAT", "RABBIT" are displayed as questionnaire items 125 in the respective predetermined areas. A balloon frame (surrounding mark) 130 is displayed characteristically so as to indicate the area of "BOY" and explanatory balloon letter string "SEX?" 131 is displayed surrounded in balloon frame 130. Balloon frame 130 serves as a cursor while explanatory balloon letter string 131 in balloon frame 130 constitutes information which explains the contents of the indicated questionnaire item. The user recognizes that the questionnaire item implies sex and there are other options on the basis of balloon frame 130 which indicates a questionnaire item characteristically on the screen and explanatory balloon letter string 131, and then operates control pad 3.

Thereafter, the key operation is determined at step S122 of FIG. 22. When the operated key is the left or right key, the questionnaire item changing process is performed (step S123). For example, when the cross key end 4*b* is depressed once, the current item #0 of intra-CPU processing work area 124 of RAM 11 is referred to and the corresponding #0 candidate number is incremented by one. Letter string data "GIRL" corresponding to the current item #0 and the changed candidate No. 1 is read out from questionnaire item option data 128 in ROM 2 and transferred to VRAM 13. As a result, the display of questionnaire item #0 is changed from "BOY" to "GIRL". Then, the control passes to step S122, where the next key operation is determined.

When the up and down key operation is performed at step S122, the current item number of intra-CPU processing work area 124 of RAM 11 is changed to a value depending on the key operation, and explanatory balloon data 125 corresponding to the new current item number is read out from ROM 2 and transferred to explanatory balloon data area 122 of RAM 11 (step S124). For example, when the cross key end 4d is depressed once, the current item number is changed from 0 to 1 and explanatory balloon #1 data is read from ROM 2 and transferred to explanatory balloon data area 122 of RAM 11.

An explanatory balloon frame delineating process is then performed (step S125). Balloon shape data 126 corresponding to a balloon shape number (in this case, the number is 0) of explanatory balloon data area 122 is transferred to VRAM 13 and the corresponding display position X and Y coordinates are set in video display processor 12. The explanatory balloon letter display process is then performed (step S126). More particularly, explanatory letter string data "AGE?" corresponding to explanatory No. 1 of explanatory balloon data area 122 is read out from ROM 2 and transferred to VRAM 13 and information on a position coincident with the display position of the balloon frame is set in video display processor 12. Thereafter, the control passes to step S122, where the next key operation is determined.

Figure 25:
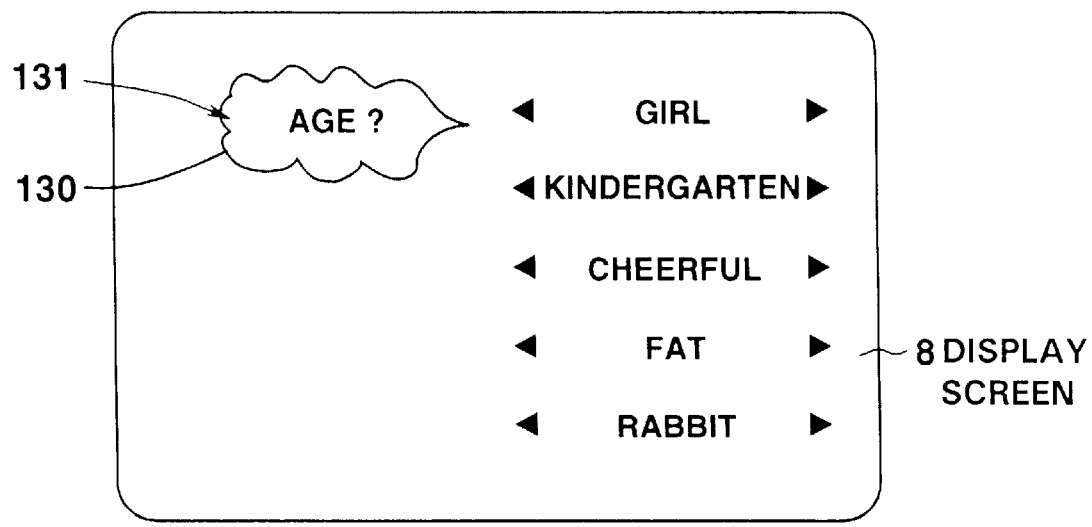
FIG. 25 shows one example of a menu screen in the image creation process.

As a result, as shown in FIG. 25, in the menu screen of display 8, balloon frame 130 and explanatory balloon letter string 131 "AGE?" within the frame 130 are moved to a position which indicates questionnaire item #1. The user recognizes on the basis of the balloon frame 130 which indicates a characteristic item on the display screen and explanation balloon letter string 131 that the questionnaire item has been changed to an item which implies age and that there are other options for that item, and operates control pad 3.

When the up or down key is operated, that is, when the cross key end 4d is depressed twice, the current item #1 of intra-CPU processing work area 124 of RAM 10 is referred to and the corresponding item #1 candidate No. is incremented by two so that No. 0 is changed to No. 2. Data on the current item #1 and letter string "MIDDLE SCHOOL BOY" corresponding to the changed candidate No. 2 is read out from questionnaire item option data 128 in ROM 2 and transferred to VRAM 13. Thereafter, the control passes to step S122, where the next key operation is determined.

Figure 26:
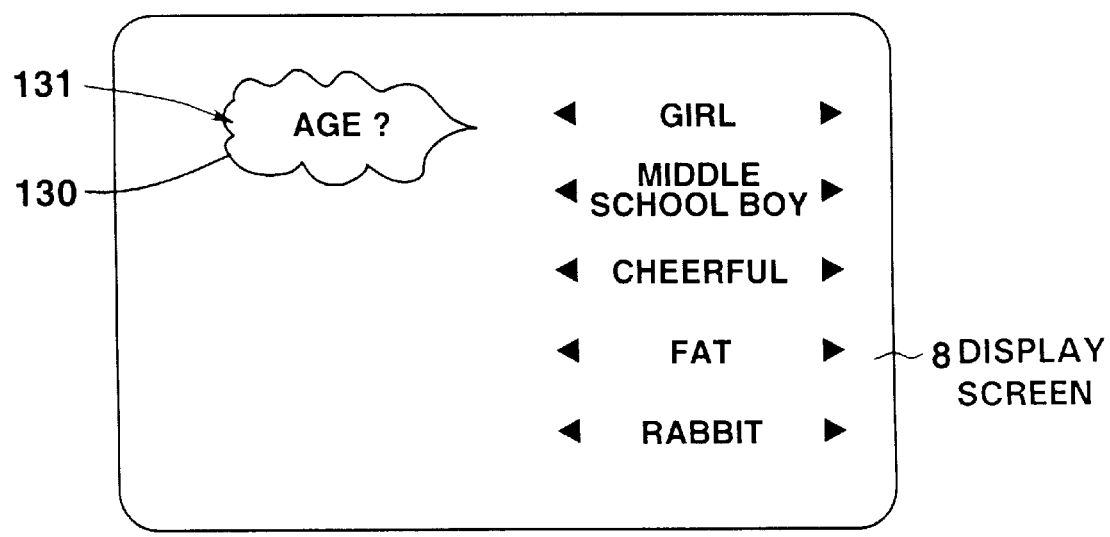
FIG. 26 shows one example of a menu screen in the image creation process.

As a result, as show n in FIG. 26, in the menu screen of display 8, the indication of questionnaire item #0 is changed from "KINDERGARTEN" to "MIDDLE SCHOOL BOY". The user recognizes that the questionnaire item about the age has been changed to the content depending on the operation on the basis of balloon frame 130 indicative of an item characteristically on the screen and explanatory balloon letter string 131, and sets a desired option about each questionnaire item while operating control pad 3 sequentially. When a desired result of the questionnaire is obtained, the user operates decision key 5 of control pad 3.

When decision key 5 has been operated at step S22, part image data is set (step S126). In this process, a table (not shown) of ROM 2 is referred to on the basis of the respective decided questionnaire items #0–#4. Part number data corresponding to a combination of options of questionnaire items #0–#4 has been recorded on the table. Thus, data on the part numbers corresponding to the decided combination is recorded in part number stock area 121 of RAM 11 and the control then passes to step S103 of main program of FIG. 22.

At step S103 of the main program, part image data corresponding to the part number recorded in part number stock area 121 is read out from ROM 2 and transferred to VRAM 13. As a result, an image based on the user's questionnaire is displayed on display 4. When the edited image is printed, the image data is transferred to VRAM 13 and recorded in image data stock area 123 and the recorded image data is then read out and delivered to printer 14.

As described above, according to the second embodiment, balloon frame 30 as an indicating image indicates an area of a questionnaire item selected by control pad 3 and explanatory balloon letter string 131 which is information explaining the selected questionnaire item is displayed within the balloon frame 130. Thus, when the user manipulates the menu display screen while viewing the menu screen of display 8, she can recognize the next manipulating step easily and securely and can easily manipulate the processor even in the case of a complicated menu structure in which the questionnaire items are each further accompanied by a plurality of options. Thus, the user can avoid misoperations which might otherwise be performed due to her bewilderment about the next operation or even a beginner can avoid her inability to perform the next operation.

While in the second embodiment the display areas of balloon frame 130 and explanatory balloon letter string 131 are displayed in an aligning manner, the display area of balloon frame 130 may be placed adjacent to the display area of explanatory balloon letter string 131. Briefly, arrangement is required to be such that balloon frame 130 and explanatory balloon letter string 131 indicate a specified item and have information on that item.

While in the second embodiment the shape of balloon frame 130 changes depending on the questionnaire item, it may maintain the same shape in spite of the item. While in the second embodiment the shape of balloon frame 130 which is the indicating image has been illustrated as having an abstract shape, it may be an indicating image having a shape such as expresses a specified object. The shape is preferably changed depending on the contents of the item. In this case, the contents of the item are recognized also by an image, so that the screen manipulation is further facilitated. In addition, the color of the indicating image may be changed depending not only on a change in the shape but also on the item. In this case, the contents of the item are also recognized from its color, so that the screen manipulation is further facilitated.

While in the second embodiment programs have been illustrated as being recorded in a cassette type ROM 2 to be inserted into the body 1, the programs may be recorded in a built-in ROM of a one-tip CPU. In this case, the whole processor is reduced in size.

While in the second embodiment the external display 7 which is a general television set is illustrated as being connected to the process body, the external display is not limited to the television sets, but may be a display, for example, of a personal computer. Alternatively, the display, speaker and control pad may be incorporated into the body 1. In this case, a very compact processor is realized.

While in the second embodiment an image processor has been illustrated which performs an image creation process for persons, animals or objects, the present invention is applicable to other devices such as perform data processing in the form of dialogue with the user through the menu screen. While, for example, in electronic notebooks and word processors having sophisticated functions, the menu screen has a complicated structure, an indicating image filling the role of a cursor indicating an item and information explaining the contents of an item indicated by the indicating image are displayed. Thus, the screen manipulation while viewing the menu screen is facilitated.

Third Embodiment

The third embodiment of the image processor according to the present invention will be next described specifically.

Figure 27:
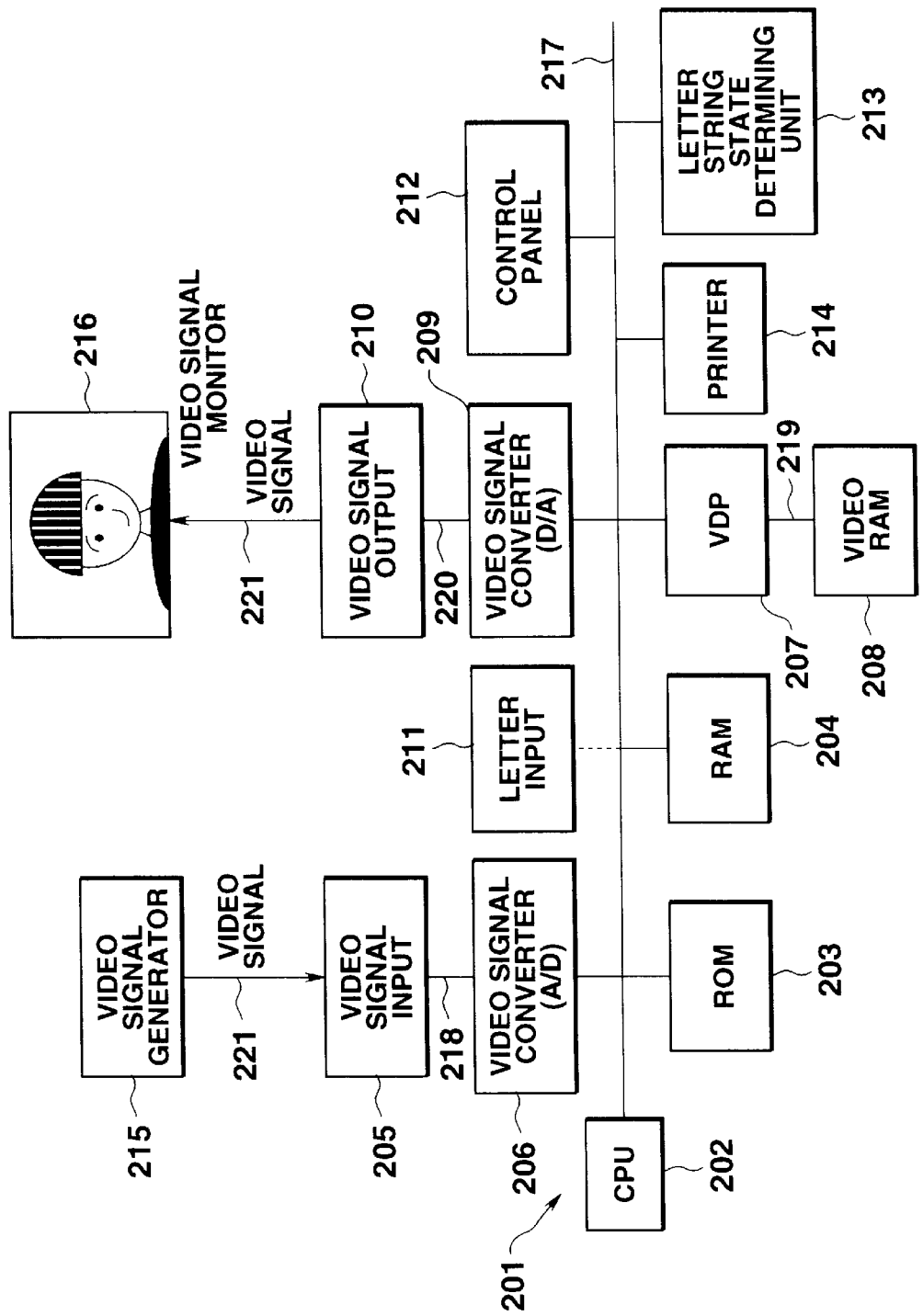
FIG. 27 is a circuit block diagram indicative of the structure of an image control apparatus of a third embodiment of the present invention.

FIG. 27 is a block diagram of the circuit of image processor 201 of this embodiment. Image processor 201 includes CPU 202, ROM 203, RAM 204, video signal input 205, video signal converter (A/D) 206, VDP 207, video RAM 208, video signal converter (D/A) 209, video signal output 210, letter input 211, control panel 212, letter string state determining unit 213, and printer 214.

CPU 202, ROM 203, RAM 204, video signal converter (A/D) 206, VDP 207, video signal converter (D/A) 209, control panel 212, letter string state determining unit 213 and printer 214 are connected through bus 217. Video signal input 205 and video signal converter (A/D) 206; VDP 207 and video RAM 208; video signal converter (D/A) 209 and video signal output 210 are connected by busses 218, 219 and 220, respectively.

Video signal generator 215 is connected through signal cable 221 to video signal input 205 of image processor 201. Video signal monitor 216 is connected through signal cable 222 to video signal output 210.

ROM 203 contains programs and various data necessary for the process to be performed by the image processor. The various data contained in ROM 203 includes image data for various balloons 1)–9) shown in FIG. 28, data on the image of a menu screen of FIG. 32, data on the image of a letter input screen of FIG. 40A, letter font data, color data, coordinate position data, etc. The balloon implies a surrounding figure which surrounds a letter string, etc., indicative of the contents of words or thought uttered or expressed by a character, etc.

RAM 204 is a work memory of CPU 202. A part of its storage area is allocated to a buffer area for printing. The capacity of the buffer area is such as can store image data for one field.

CPU 202 uses RAM 204 as a work memory to control the respective elements of image processor 1 in accordance with a program contained in ROM 203.

Video signal input 205 outputs a video signal, coming from video signal generator 215 through signal cable 221, to video signal converter (A/D) 206, which converts this video signal to a digital one.

VDP 207 sequentially gets and transfers image data stored in RAM 204 to video RAM (VRAM) 14 and outputs its image data to video signal converter (D/A) 209, etc.

Video signal converter 209 converts image data to a video signal and outputs same to video signal output 210, which outputs this video signal to video signal monitor 216.

Control panel 212 has A, B, C, D, L, R, START, and SELECT buttons as operating elements and a power supply switch disposed thereon (None of them are shown). The operational signals from the various operating elements are input to CPU 202.

Letter string state determining unit 213 has in its initial memory a state determining table in which mental situations such as being delightful, angry, doubtful, crying, etc., are placed in corresponding relationship to specified symbols such as a space symbol "␣", exclamation mark "!", question mark "?", etc., used at the ends of symbol strings in the expressions of the respective situations and determines the situation expressed by an displayed input letter string on the basis of the symbol at the end of the expressed input letter string.

The printer prints image data loaded in the printing buffer area of RAM 204.

In the third embodiment, letter input unit 211 is a virtual unit which displays on video signal monitor 216 image data on the letter input screen contained in ROM 203, points out a letter/symbol on the letter input screen by the cursor and inputs the letter by depressing the A button on control panel 212. During display of the letter input screen, video signal monitor 216 functions as letter input unit 211.

Video signal generator 215 may be a video player, a camcorder for use at households.

Video signal monitor 216 may be a monitor which is capable of displaying a video signal visually; for example, a household television set.

The operation of the image processor 1 of the present embodiment will be described with reference to flow charts of FIGS. 42–46 and monitor images of FIGS. 28–41. The operations of the image processor 1 at the respective steps shown below are performed by CPU 202 which sequentially executes program commands stored in ROM 203.

Figure 42:
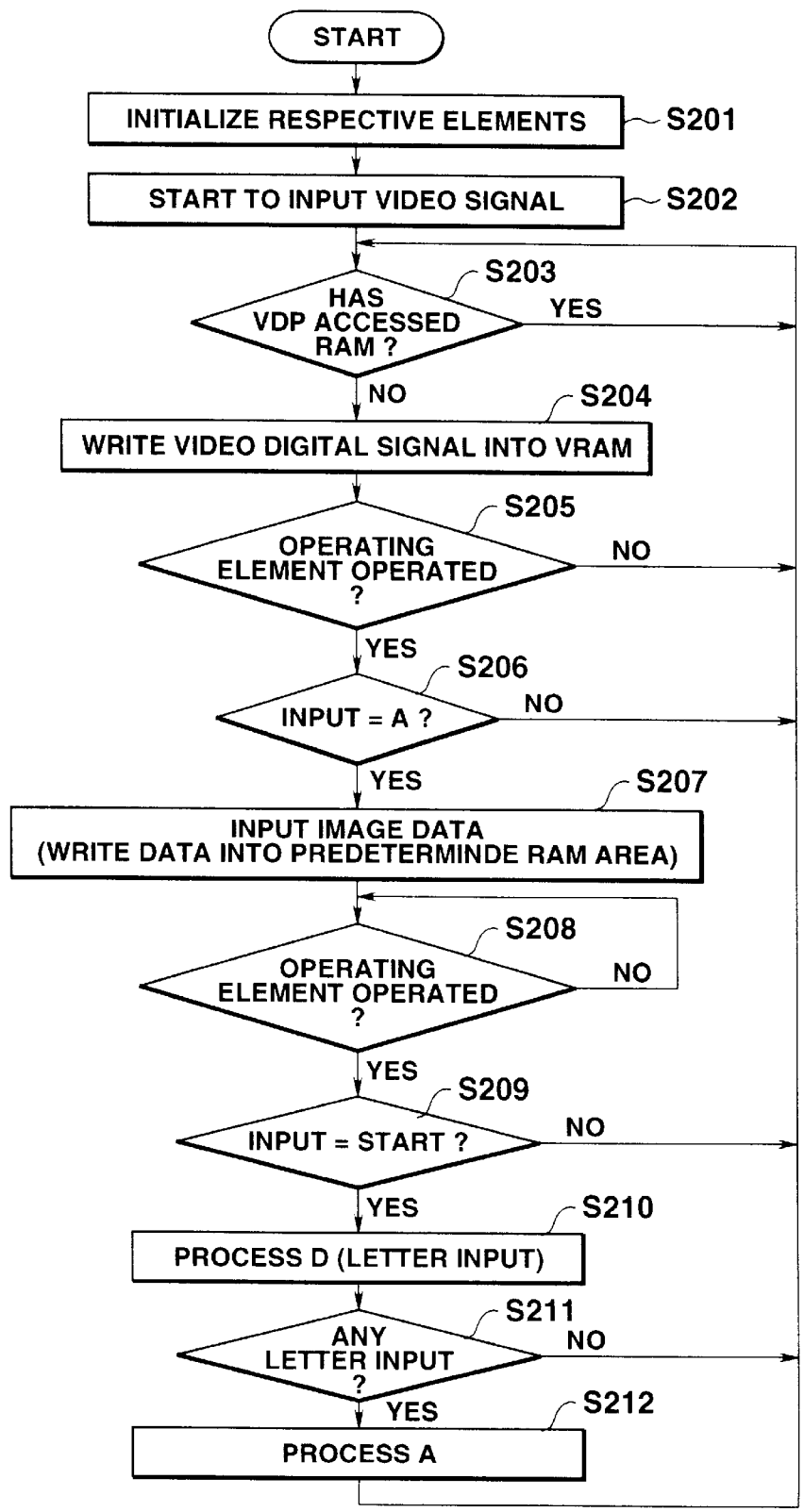
FIG. 42 is a flow chart indicative of the operation of the image control apparatus.

When the power supply switch (not shown) of control panel 212 is turned on, the program (main routine) of FIG. 42 is executed and initialization of the respective elements of the image processor 201 including the erasure of all data in RAM 204 and VRAM 208 is performed (step S201). Thereafter, inputting a video signal is started by video signal generator 215 (step S202).

Thereafter, it is determined whether VDP 207 is now accessing RAM 204 (step S203). If not, a video signal generated by video signal generator 215 is input through video signal input 205 to video signal converter 206 where it is converted to a digital signal, which is sequentially written into VRAM by VDP 207 (step S204). The image data written into VRAM 208 is sequentially output by VDP 207 to video signal converter (D/A) 209, which converts the video signal to an analog signal, which is then output through video signal output 210 to video signal monitor 216. Thus, as shown in FIG. 29A, the image gotten or input from video signal generator 215 is displayed on the screen of the video signal monitor 216.

Next, it is determined whether the inputting operation has been performed through the control panel (step S205). If so, it is further determined whether its inputting operation has been performed by depression of the A button (step 206). If so, the video signal generated by the video signal generator 215 is sequentially written through video signal input 205 and video signal converter (A/D) 206 into a predetermined storage area of RAM 204 (step S207).

Figure 46:
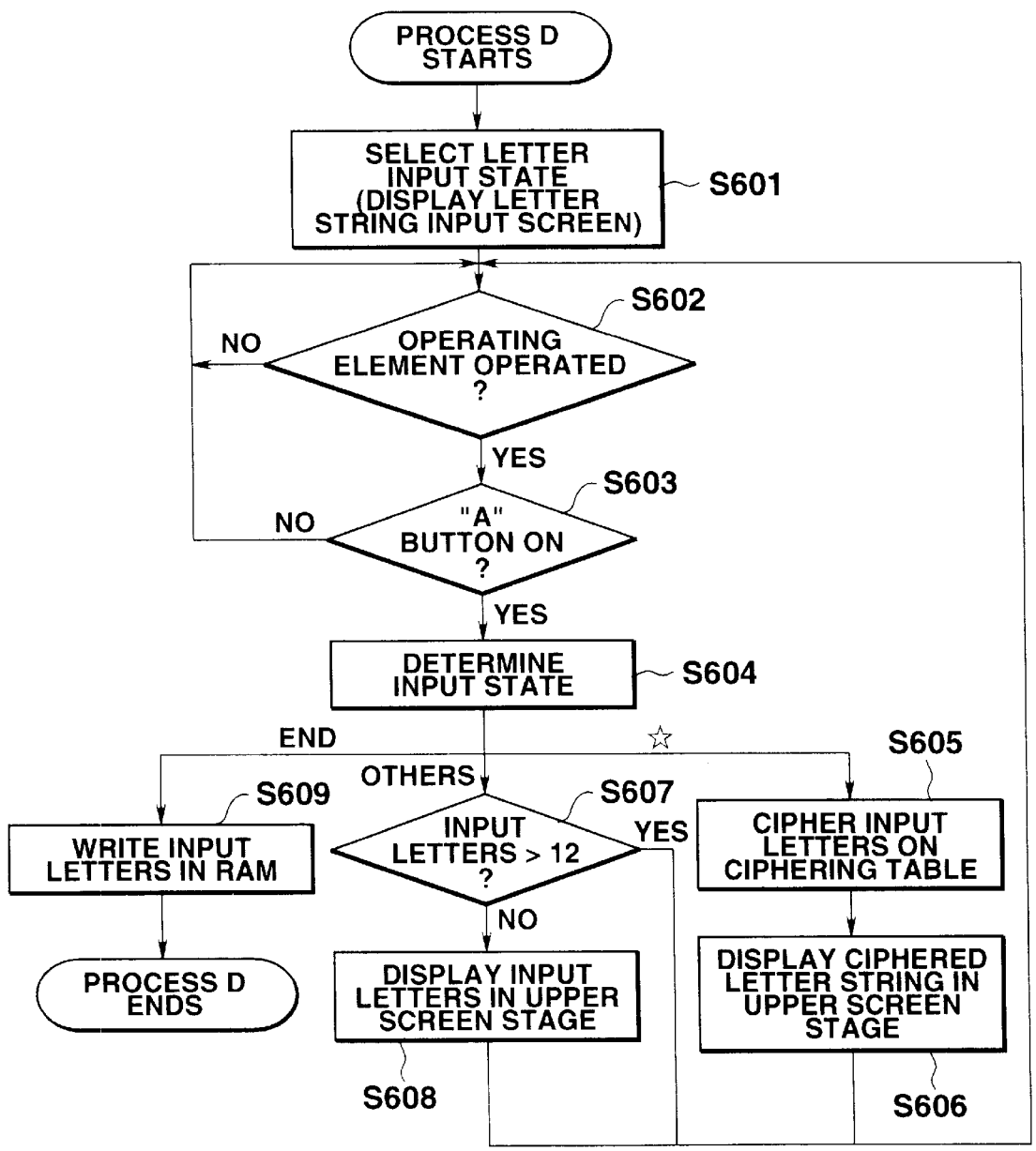
FIG. 46 is a flow chart indicative of the operation of the image control apparatus.

Thereafter, it is determined whether the inputting operation by the operating element has been performed (step S208). If so, it is further determined whether the inputting operation has been performed by the START button (step S209). If so, the program indicative of the process D of FIG. 46 is executed at step S210.

In the process D, first, the image data on the letter input screen contained in ROM 203 is written by VDP 207 into VRAM 208 and output through video signal converter (D/A) 209, video signal output 210 to video signal monitor 216. Thus, a letter input screen of FIG. 40B is displayed on video signal monitor 216 (step S601). Input designation symbols such as "A", "a", "☆", "END", etc., are displayed in addition to the input letter string on the letter input screen. In this connection, "A", "a" and "☆" are symbols to designate a capital letter input, a small letter input and a cipher input, respectively. The "END" is a symbol to designate the end of the letter inputting operation.

When the up, down, right or left button is depressed in a state in which the letter input screen is displayed, the cursor moves on the screen to thereby display a letter, etc., emphatically at the cursor position. By depressing the A button on control panel 212 while displaying letters, other symbols to be input, and input designating symbols such as "END", "☆", etc., emphatically, the letter inputting and designating operations are performed.

While the letter inputting operation is being performed on the letter inputting screen, it is determined whether the inputting operation through the operating element has been performed (step S602). If so, it is further determined whether its inputting operation has been performed by depression of the A button (step S603). Each time the A button is depressed, it is determined whether what input designation state exists (step S604).

For example, when it is determined the cipher input designation state exists, the input letters are converted to a cipher by cipher conversion table (FIG. 41) contained in ROM 203 (step S605). Data on the cipher to which data on the letter string was converted is written by VDP 207 into VRAM 208 and the cipher letter string image data and the image data input from video generator 215 are output through video signal converter (D/A) 209 and video signal output 210 to video signal monitor 216. Thus, as shown in FIG. 40C, the ciphered letter string is displayed in the upper portion of the monitor screen (step S606). In the case of a regular input designation state, an unciphered input letter string is displayed in the upper portion of the monitor screen, as shown in FIG. 40D.

The number of input letters to be displayed has an upper limit. Each time a letter is input, it is determined whether the number of input letters has exceeded the upper limit of the number of input letters to be displayed (in this case, 12 letters) (step S607). Only when it is determined that the upper limit has not been exceeded, the input letters are displayed (step S608).

Thereafter, when it is determined at step S604 that a state in which the inputting operation of letters has ended has appeared, data on the images of letters (font data) of the input letter string (font data) displayed on the screen is read out from ROM 203 and loaded in a predetermined storage area of RAM 204 (step S609). Data on the image of the letter string loaded in RAM 204 is written by VDP 207 into VRAM 208, data on the image of the letter string and data on the input image are combined and output through video signal converter (D/A) 209, and video signal output 210 to video signal monitor 216. Thus, as shown in FIG. 29B, the input letter string is displayed by the side of a character's face displayed on the screen.

Figure 43:
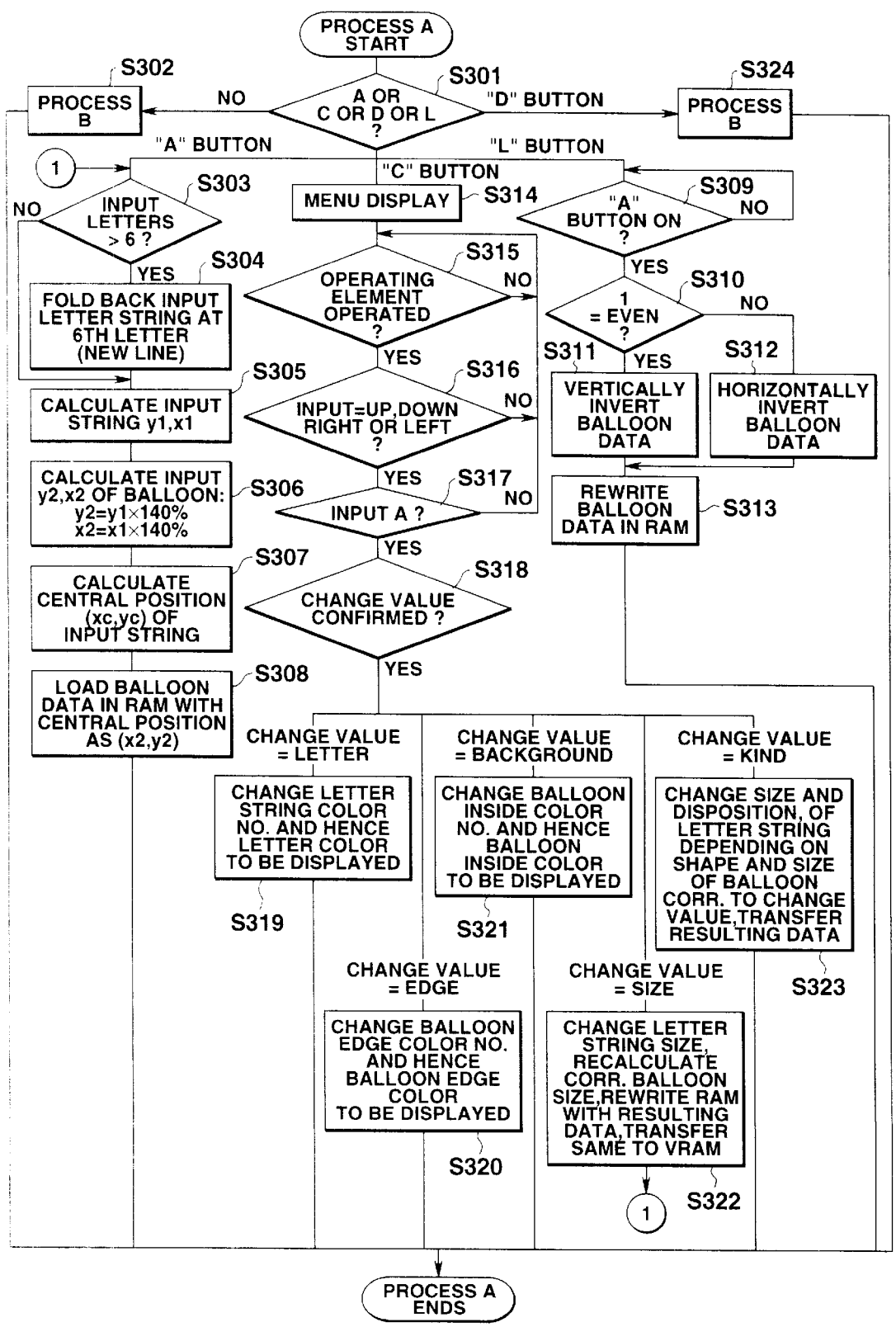
FIG. 43 is a flow chart indicative of the operation of the image control apparatus.

Thus, the letter inputting process ends, the control then returns to the main routine (FIG. 42), and it is determined at step S211 whether there is any input letter in the letter inputting process (step S210). If so, the program for the process A of FIG. 43 is executed at the next step S212.

Figure 44:
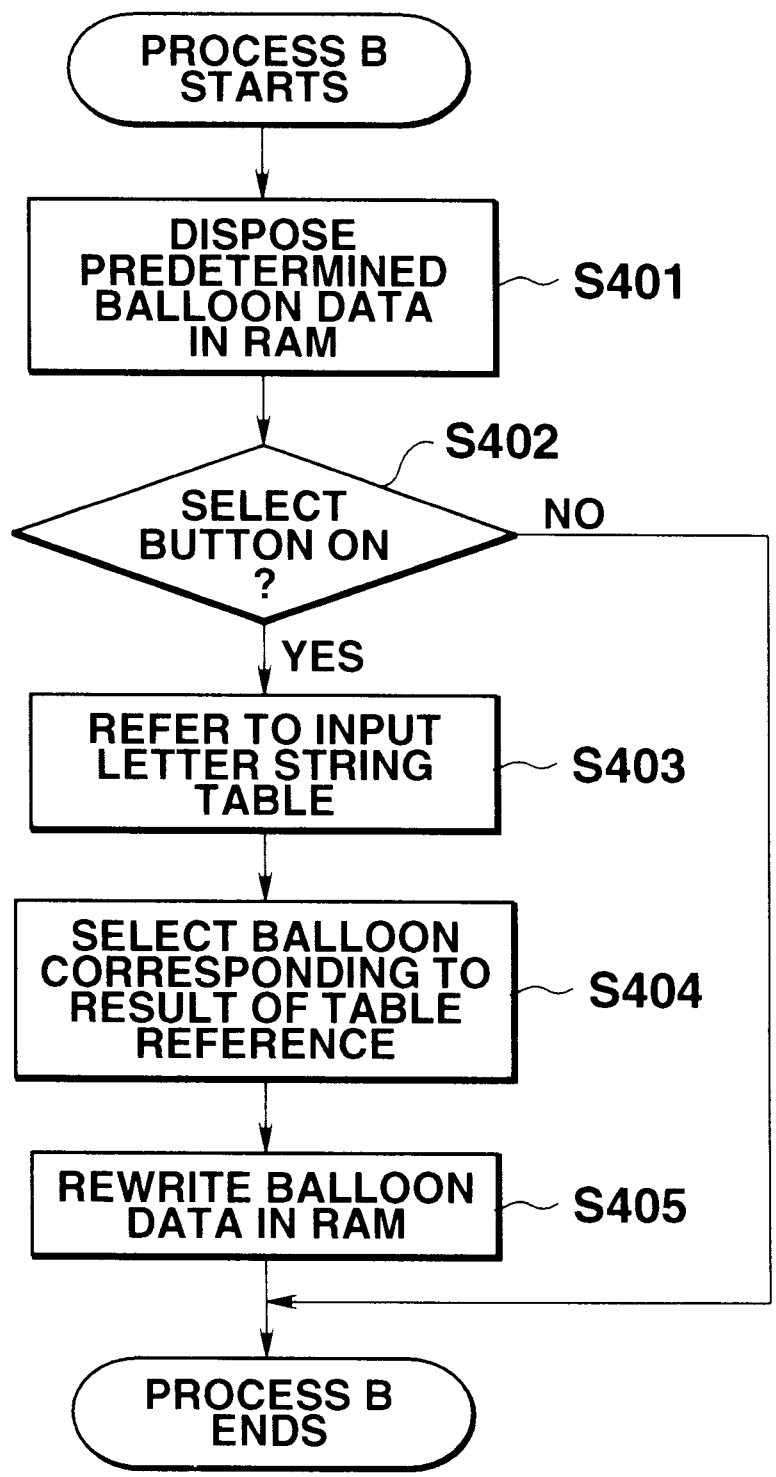
FIG. 44 is a flow chart indicative of the operation of the image control apparatus.

In the process A, first, it is determined which of the A, C, D and L buttons has been depressed (step S301). If it is determined that none of them has been depressed, a program for a process B of FIG. 44 is executed at step S302.

In the process B, first, data on the image of a predetermined most standard balloon (cubic Bezeir data) is read out from ROM 203 and loaded in the predetermined storage area of RAM 204 such that a balloon surrounds the letter string loaded already in RAM 204 (step S401).

The letter string image data loaded in RAM 204 and the balloon image data are written by VDP 207 into VRAM 208, the letter string image data, balloon image data, and input image data are combined and output through video signal converter (D/A) 209 and video signal output 210 to video signal monitor 216. Thus, as shown in FIG. 30C, a synthetic image composed of the input image, letter string image and balloon image is displayed.

Thereafter, it is determined whether the select button has been depressed (step S402). If so, letter string state determining unit 213 determines on the basis of a symbol (space symbol "␣", exclamation mark "!", question mark "?", etc.) at the end of the current displayed input letter string what the current situation expressed by the input letter string (being delightful, angry, doubtful, crying, etc.) is. Further, the conversion table (FIG. 39) contained in ROM 203 is referred to and it is checked which condition in the conversion table the current expressed situation coincides with (step S403). When as a result of the referring-to operation the corresponding balloon is selected (step S404), the balloon image data loaded so far in RAM 204 is rewritten with the selected balloon data (step S405). Thus, a balloon image which can more effectively express the mental situation of the person, etc., displayed on the screen is displayed automatically.

Figure 31A:
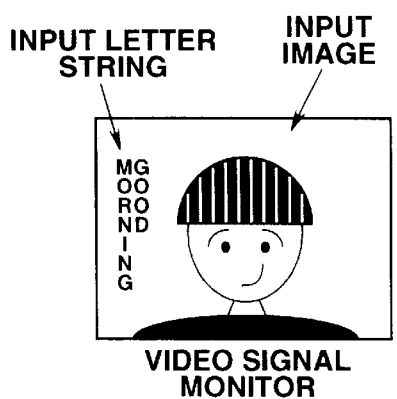
FIGS. 31A to 31C illustrate an image processing function of the apparatus.
Figure 31B:
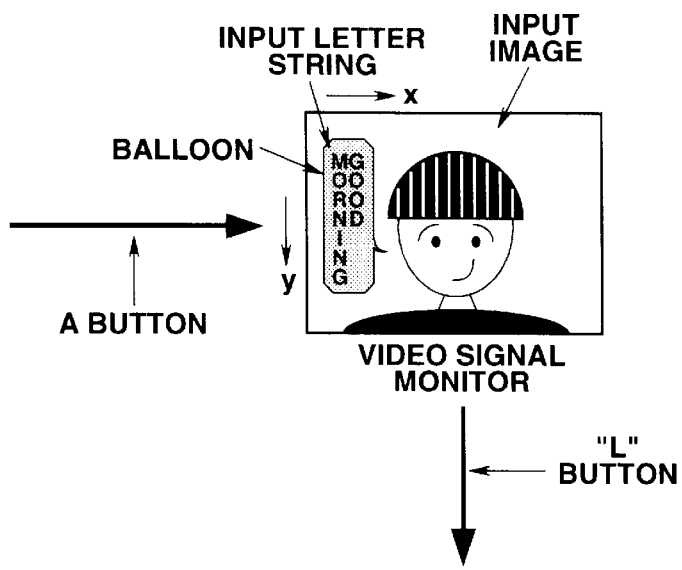

When it is determined at step S301 of the process A (FIG. 43) that the A button has been depressed, it is then determined whether the number of letters of the input letter string is larger than the preset number of letters (step S303). Assume now that the preset number of letters is six. If the input number of letters is six or more, the input letter string is automatically folded back at its sixth letter (step S304). The size (vertical y1, horizontal x1) of the folded-back input letter string is calculated (step S305). In addition, on the basis of the result of this calculation, the size of a balloon (vertical y2, horizontal x2) which can surround the folded-back input letter string is calculated (step S306). At this time, the size (vertical y2, horizontal x2) of the balloon is calculated such that it is, for example, 1.4 times the size (vertical y1, horizontal x1) of the letter string both vertically and horizontally. Thereafter, the center position (yc, xc) of the input letter string is calculated (step S307). The balloon image data is loaded in RAM 204 such that the input letter string coincides in center position with the balloon (step S308). Thus, the balloon is displayed automatically such that folded-back input letter string is placed at a position where it looks good within the balloon (FIGS. 31A, 31B).

Figure 31C:
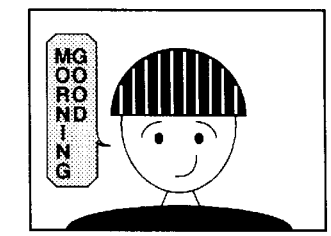

By depressing the L button on the control panel 212 after the input image is displayed with the message information surrounded by the balloon, the displayed apparently synthetic letter string image data, balloon image data and input image data are loaded as one-image data in a printing buffer area of RAM 204 and the one-image data is printed by printer 214 (FIGS. 30C, 31C).

When it is determined at step S301 that the L button has been depressed, it is further determined whether the A button has been depressed (step S309). If so, it is then determined whether the number of times of depression of the A button is even or odd (step S310). If it is determined to be even (inclusive of 0 times), a vertically inverted version of the balloon image, data on which is stored in RAM 204, is calculated (step S311) and the data on the balloon image in RAM 204 is replaced with data on the inverted version. When it is determined at step S310 that the number of times of depression of the A button is odd, a horizontally inverted version of the balloon image, data on which is stored in RAM 204, is calculated (step S313) and data on the balloon image in RAM 204 is replaced with data on the horizontally inverted version. Thus, as the A button is depressed after the L button has been depressed, the balloon image is subjected to the appropriate one of its vertical and horizontal inversions, and when the A button is depressed after the L button has been depressed in the next situation, the balloon image is subjected to the other of its vertical and horizontal inversions. This situation occurs in an alternately repeated manner.

When it is determined at step S301 of the process A that the C button has been depressed, data on the image of a menu screen (FIG. 32) contained in ROM 203 is written by VDP 207 into VRAM 208 and the menu screen is displayed overlapping in the displayed image, as shown in FIGS. 33A–36A (step S314).

In the menu screen of FIG. 32, "LETTER" denotes input keys each of which designates a different color of the letter; "EDGE" denotes input keys each of which designates a different color of the edge of a balloon (an outline); "BACK-GROUND" denotes input keys, each of which designates a different color of the area within the balloon; "SIZE" denotes input keys, each of which designates a different size of the letters; and "KIND" denotes input keys, each of which designates a different shape of the balloon. That is, the respective input keys displayed arranged side by side express the corresponding parameters of the attributes. The parameters of each of the "LETTER", "EDGE" and "BACKGROUND" are displayed in their actual colors (from left in order, red, orange, yellow, green, light blue, blue, white, black, transparent). A parameter of the "SIZE" is shown by a respective one of numerical values "1"–"9". In this connection, the relationship in correspondence between numerical value ("1"–"9") and the number of pixels is: 1:16 dots; 2:20 dots; 3:24 dots; 4:32 dots; 5:48 dots; 6:60 dots; 7:72 dots; 8:96 dots; and 9:128 dots. Also, a parameter of the "KIND" is similarly expressed by a numerical value ("1"–"9").

By depressing the up, down, right or left cursor buttons on control panel 212 in a state where the menu screen is displayed, the cursor moves in the corresponding direction on the display screen to thereby display the input key at the cursor position emphatically. By depressing the A button on control panel 212 while displaying a desired input key emphatically, a change of an attribute of a balloon displayed on the screen is designated.

More specifically, after a menu screen is displayed, it is determined whether an operating element has been operated to input the corresponding data (step S315). If so, it is then determined whether its input depends on the operation of the cursor button (up, down, right or left) (step S316). If so, it is then determined whether the A button has been depressed, that is, whether data which designates a change of the attribute has been input (step S317). If so, it is further determined which of the attributes; that is, the color of the letter, balloon edge, or balloon inside area; letter size; and balloon shape, the designated change value requires to change (step S318).

When it is determined at step S318 that the designated change value relates to the color of a letter, the color number of the letter string, data on which is stored in VRAM 208, is changed to a number corresponding to the change value such that the letter color to be displayed is changed by VDP 207 to a color indicated by the changed number (step S319). Thus, the color of letters within the balloon displayed on the screen is changed.

When it is determined at step S318 that the designated change value relates to the color of a balloon edge, the color number of the balloon image edge, data on which is stored in VRAM 208, is changed to a number corresponding to the change value such that the balloon image edge color to be displayed is changed by VDP 207 to a color indicated by the change number (step S320). Thus, the color of the balloon edge displayed on the screen is changed. (FIGS. 33A and 33B)

When it is determined at step S318 that the designated change value relates to the color of a balloon inside, the color number of the balloon inside, data on which stored in VRAM 208, is changed to a number corresponding to the change value such that the balloon inside color to be displayed is changed by VDP 207 to a color indicated by the change value (step S321). Thus, the color of the balloon inside displayed on the screen is changed (FIGS. 34A and 34B).

When it is determined at step S318 that the designated change value relates to the size of a letter string, the size of the letter string, data on which is stored in RAM 204, is changed to a size corresponding to the change value (FIG. 35B). The size of the balloon image, data on which is stored in RAM 204, is recalculated depending on the size of the related letter string so as to have an appropriate size (for example, so as to be 140% of the size (vertical/horizontal) of the letter string), and data on the recalculated appropriate size of the balloon image is rewritten into RAM 204 and then transferred to VRAM 208 (step S322). Thus, as the size of the letter string changes, the size of the balloon is automatically changed (FIG. 35C).

When it is determined at step S318 that the designated change value relates to the shape of the balloon, data on the balloon shape corresponding to the change value is read from ROM 203, and disposed again on RAM 204. The letter string, data on which is loaded on RAM 204, is changed so as to have an appropriate size and disposition in accordance with the shape and size of the balloon, and the resulting letter string data is rewritten into RAM 204 and transferred to VRAM 208 (step S323). Thus, as the balloon shape changes, the size and disposition of a letter string within the balloon are automatically changed (FIG. 36).

Figure 45:
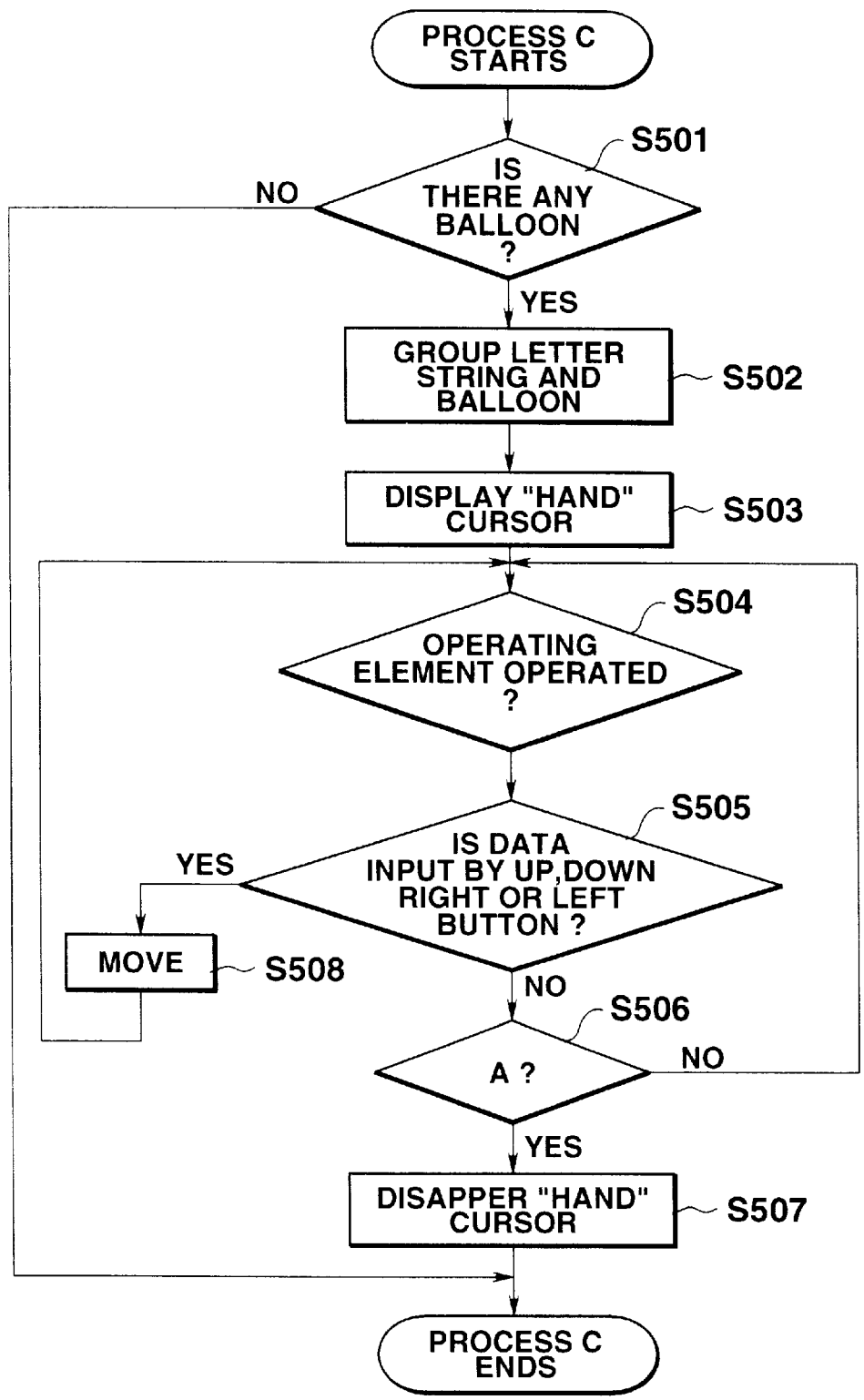
FIG. 45 is a flow chart indicative of the operation of the image control apparatus.

When it is determined at step S301 of process A that the "D" button has been depressed, the program of the process C of FIG. 45 is executed at step S324.

Figure 37A:
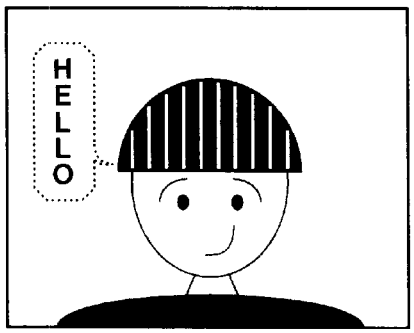
FIGS. 37A to 37D illustrate an image processing function of the apparatus.
Figure 37B:
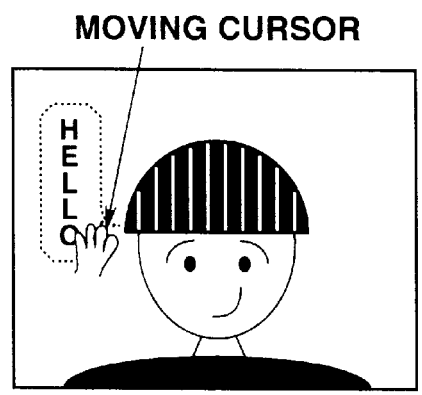
Figure 37C:
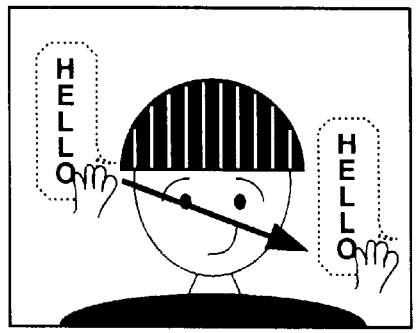
Figure 37D:
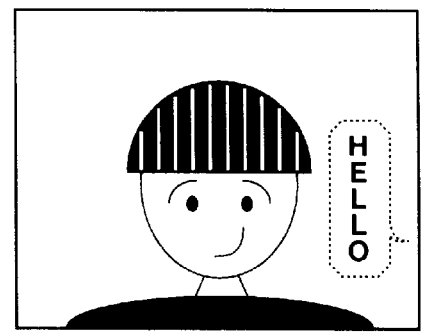
Figure 38:
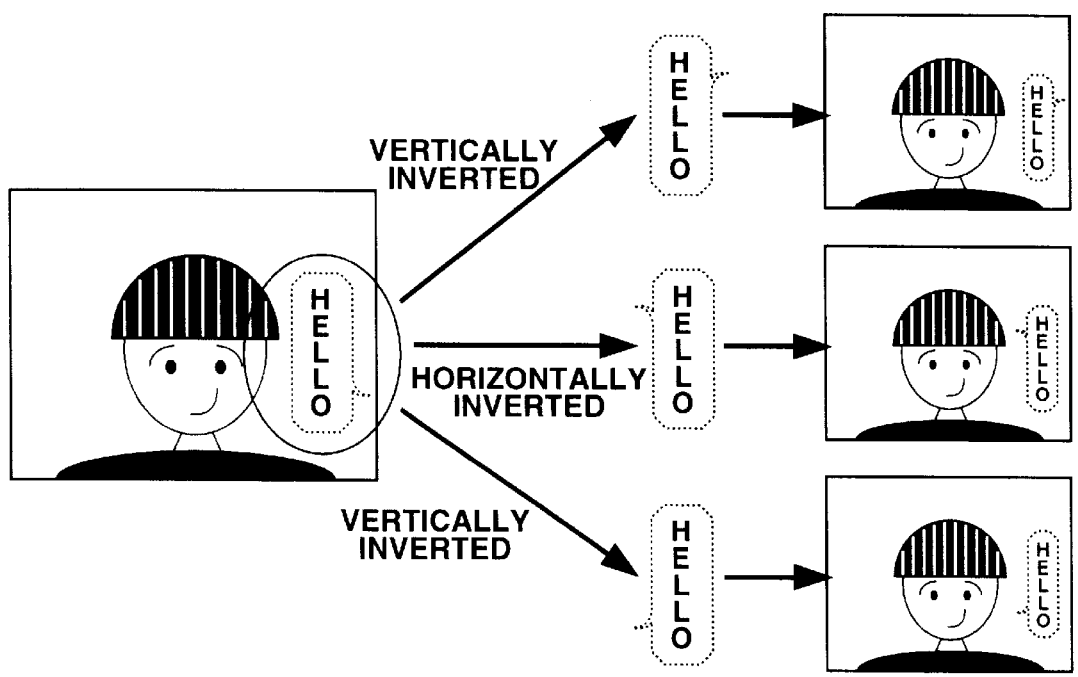
FIG. 38 illustrates an image processing function of the apparatus.

In the process C, first, it is determined whether a balloon has already been displayed (step S502). If so, the letter string and the balloon are grouped (step S502). As shown in FIG. 37B, a moving cursor in the form of a hand is displayed overlapping with the balloon on the monitor display screen (step S503). Thereafter, it is determined whether data has been input by an operating element (step S504). If so, it is then determined whether the data has been input by the cursor button (up, down, right, left) as the operating element (step S505). If so, the moving cursor is moved to a position determined in accordance with the operation of the cursor button, which causes the balloon image data and letter string image data in RAM 204 to move to the same position as the cursor (step S508). Thus, the balloon and the letter string are moved simultaneously. As shown in FIG. 37C at this time, it looks as if a "hand" in the image carried the balloon and the letter string. When the A button is depressed, the movement of the balloon and the letter string stop, and the moving cursor disappears from the image screen, as shown in FIG. 37D (steps S506, S507).

Since the image processor of the third embodiment is capable of getting the images of various persons and animals, by using a household video player, for example, as the video signal generator and adding various balloons to the image when a letter or a letter string is input to the image. Thus, a live image is displayed by adding various ballooned message information to the various expressions of the persons and animals.

Since ballooned message information can be added to various images and printed by printer 214, prints may be used as a present to user's family or friends.

The present invention is not limited to the third embodiment. For example, while the image processor of the third embodiment displays data on an image on a letter input screen contained in ROM 203 on video signal monitor 216 to realize letter input unit 211 virtually, it may include a unit such as letter input unit 211 as a real unit, of course.

Since the image processor fulfills a sufficiently advanced entertaining function only by having the function of adding ballooned image information to the image of the face of a person or an animal and displaying it, the printing function is not necessarily required to be provided.

Fourth Embodiment

A. Structure of Fourth Embodiment (1) Whole Structure

Figure 47:
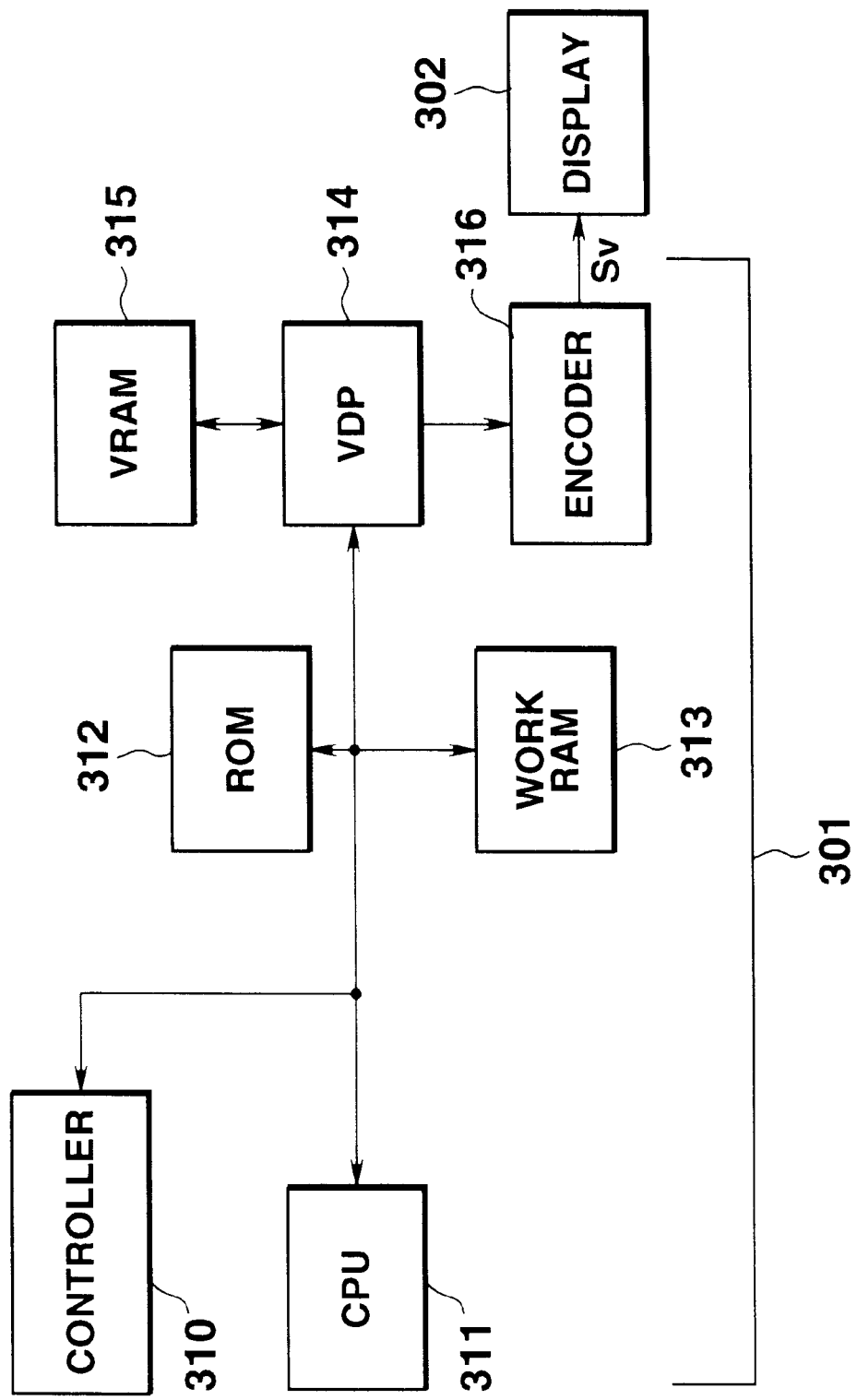
FIG. 47 is a block diagram indicative of the whole structure of a face image creation device 1 as a fourth embodiment of the present invention.

FIG. 47 is a block diagram indicative of the whole structure of a face image creation device 301 as s fourth embodiment of the present invention. The face image creation device 301 delivers to display 302 a composite video signal $S_v$ produced on the basis of elements 310–316 thereof to be described later. Display 302 may be, for example, a regular television set or a VDT (Video Display Terminal) and displays an image depending on the composite video signal $S_v$ delivered from face image creation device 301.

Figure 48:
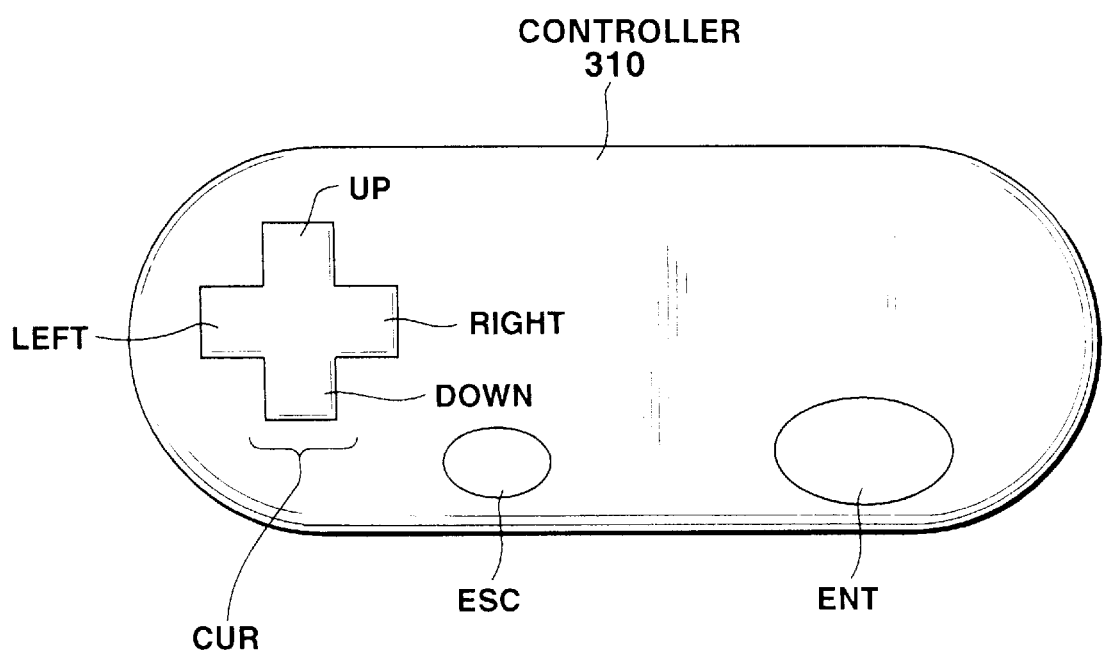
FIG. 48 illustrates the structure of a controller 10 of the fourth embodiment.

In face image creation device 301, reference numeral 310 denotes a controller which has various operating switches and generates a control signal depending on the switching operation by the operator. Provided on the controller 310, as shown in FIG. 48, cursor key CUR composed of a up or down key which moves the cursor vertically and a left or right key which moves the cursor horizontally, decision key ENT which decides an icon process selected by cursor key CUR and release key ESC used to release the setting. Reference numeral 311 denotes a CPU which controls the respective elements of the device on the basis of control signals generated from controller 310 and the operation thereof will be described later. CPU 311 further includes peripheral devices such as a DMA controller (not shown) so as to perform a DMA transfer operation.

Reference numeral 312 denotes a ROM which contains a face image creation program loaded by CPU 311, image data which displays a face image and a balloon to be describe later, or image data necessary for display of a control image screen on which the icon operation is performed. The memory structure of ROM 312 will be described later. Reference numeral 313 denotes a work RAM which includes various registers which temporarily store the results of calculations by CPU 311 and flag values and also store various image data and attribute data (to be described later) read out from ROM 312. The memory structure of work RAM 313 will be described later in more detail. Reference numeral 314 denotes a video display processor (VDP) which controls the display under control of CPU 311 and converts various DMA-transferred image data to display data (RGB data) and outputs it to VRAM 315.

VRAM 315 stores data on a face image DMA-transferred from work RAM 313 or image data forming a balloon image in accordance with a command from CPU 311 or image data necessary for display of the control image screen on which the icon operation is performed. Reference numeral 316 denotes an encoder which converts display data (RGB data) output from VDP 314 to a composite video signal $S_v$, and output same to display 302.

According to this structure, a face image having desired looks is formed by part images selected by the operation of the controller 310, and a balloon is displayed in a form harmonic with the created face image in accordance with attribute data (to be described later) expressing the features of the face image.

(2) Memory Structure of ROM 312

Figure 49:
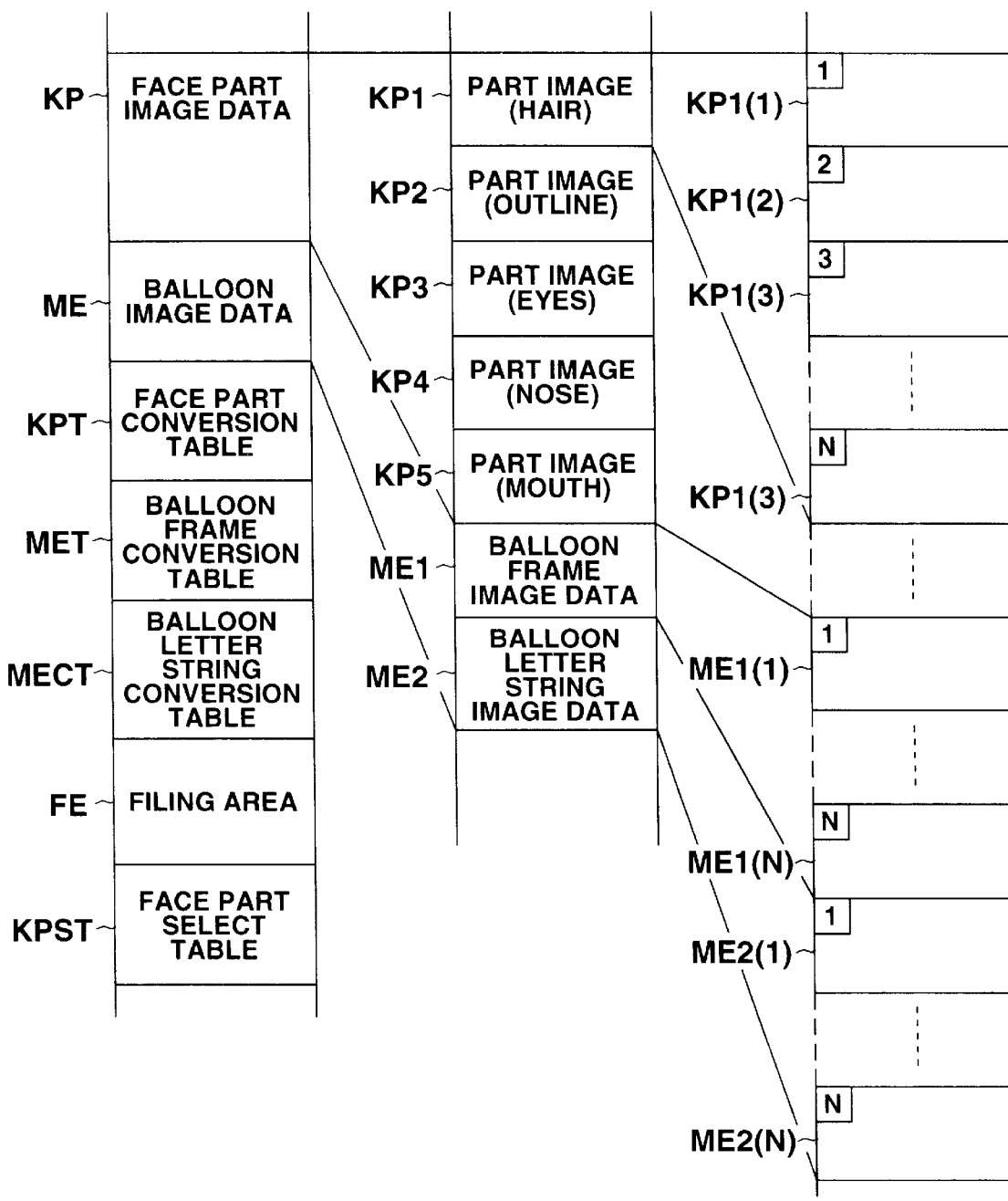
FIG. 49 shows a memory map indicative of the memory structure of ROM 12 in the fourth embodiment.

FIGS. 49 and 50 show a memory map indicative of the structure of an image storage area in ROM 312. First, in FIG. 49, reference symbol KP denote a face part image data storage area composed of data areas KP1–KP5 which store data on the images of the respective parts of a face. Data areas KP1–KP5 contain data on N kinds of "hair" images, data on N kinds of "outline" images, data on N kinds of "eyes" images, data on N kinds of "nose" images, and data on N kinds of "mouth" images, respectively. For example, data area KP1 contains data on "hair" part images KP1(1)–KP1(N). The form of this storage applies similarly to other data areas KP2–KP5.

Reference symbol ME denote a balloon image data storage area composed of a data area ME1 which stores data on a balloon frame image for balloon display, and a data area ME2 in which balloon letter string image data is stored which delineates a letter string displayed within the balloon frame. Stored in data areas ME1 and ME2 are N kinds of balloon image data ME1(1)–ME(N) and balloon letter string image data ME2(2)–ME2(N), respectively.

Reference symbol KPT denotes a face part conversion table which changes a face part image, data on which is stored in the area KP. In table KPT, an image changing parameter is stored which gives an emotional expression to a face part image, data on which is stored in area KP, and an image changing parameter is read out from the table KPT depending on expression data to be described later.

Reference symbol MET denotes a balloon frame conversion table, which generates a balloon frame number which designates the shape of a balloon frame depending on data on attributes accompanying a face image. MECT denotes a balloon letter string conversion table which generates data which designates a balloon letter string frame corresponding to data on attributes accompanying the face image.

Reference symbol KPST denotes a face part select table, which generates data to select the images of the respective parts of a face depending on attribute data which expresses a sex, age, body shape and personality of a person. That is, when a face image having desired looks is created in the form of a questionnaire to be described later, table KPST generates data for selecting and designating data on the respective part images necessary for creation of that face image on the basis of the attribute data obtained from the result of the questionnaire.

Reference symbol FE denotes a file area which stores data which designates the images of the respective parts of faces. The memory structure of file area FE will be described in detail with reference to FIG. 50.

As shown in FIG. 50, file area FE is composed of file subareas A–D, each file subarea storing data NUM, FN, PN0–PN5, ATT1–ATT4 and ME2N. NUM expresses a file number and FN denotes a file name. PN0–PN5 expresses parts numbers which designate part images "BACKGROUND", "HAIR", "OUTLINE", "EYES", "NOSE" and "MOUTH", respectively. These part numbers designate the respective part image data stored in face part image data area KP mentioned above. The background image corresponding to PN0 is stored in a background image area (not shown). ATT1–ATT4 express "SEX", "AGE", "BODY SHAPE" and "PERSONALITY" of the face image to be displayed. Data ME2N designates a balloon letter string of the above mentioned balloon letter string image data ME2. A group of those data is hereinafter referred to as image designation data.

ROM 312 further contains data on a plurality of select display screens, each of which is subjected to an icon operation in addition to the file area FE. As shown in FIG. 50, the main ones of the display screens are a mode select display screen MSD, questionnaire display screen AMD, sex select display screen SSD, age select display screen OSD, body shape select display screen BSD, file select display screen FSD, frame select display screen WSD, letter string select display screen MOSD, and balloon select display screen FWSD. The structure of each display screen and what that display screen is intended to express will be outlined below.

Figure 51A:
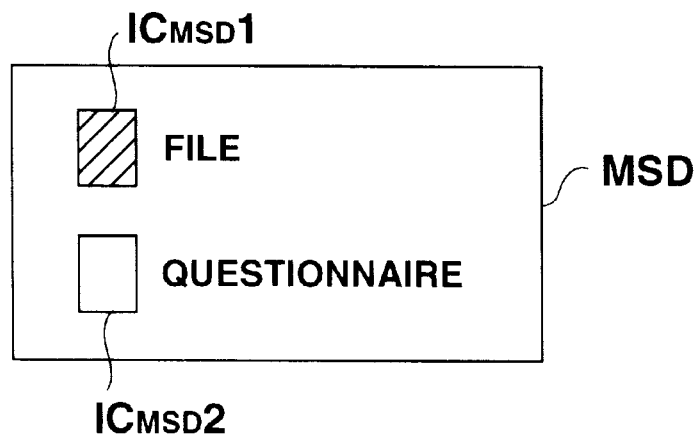
FIGS. 51A and 51B illustrate the structure of a mode select screen MSD and a file select screen FSD in the fourth embodiment.

(3) Structure of a Display Screen to be Operated a) Mode Select Display Screen MSD Mode select display screen MSD is used to determine which of a questionnaire system or file system to be described later a face image is created in. As shown in FIG. 51A, icons $IC_{MSD}1$ and $IC_{MSD}2$ are displayed on the display screen MSD. Icon $IC_{MSD}1$ is operated to select any one of files A–D of file area FE. Icon $IC_{MSD}2$ is operated to create a face image in the questionnaire system to be described later. That of the icons $IC_{MSD}1$ and $IC_{MSD}2$ which was operated is displayed emphatically by bit inversion. For example, FIG. 51A shows a state in which icon IC was operated.

b) File Select Display Screen FSD

Figure 51B:
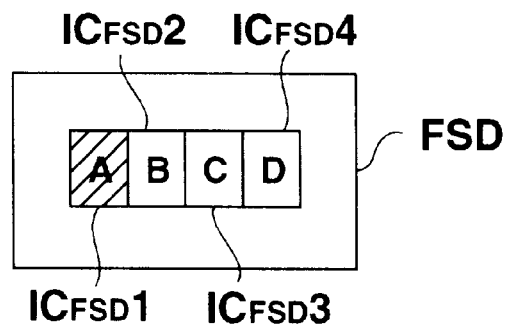

When icon $IC_{MSD}1$ was operated in mode select display screen MSD, file select display screen FSD of FIG. 51B is displayed. Displayed on display screen FSD are icons $IC_{FSD}1$–$IC_{FSD}4$ corresponding to files A–D. By operating any one of icons $IC_{FSD}1$–$IC_{FSD}4$, the above-mentioned image designation data is read out from a file corresponding to the operated icon. On the basis of the read image designation data, the corresponding various image data is stored from ROM 312 into work RAM 313 and DMA-transferred to VRAM 315 and displayed by VDP 314 as a face image on the screen.

c) Questionnaire Display Screen AMD

When icon $IC_{MSD}2$ is operated in the mode select display screen MSD, questionnaire display screen AMD of FIG. 52 appears, in which questionnaire items are displayed as icons $IC_{AMD}1$–$IC_{AMD}5$ which ask the user to answer when a face image is created newly. Icon $IC_{AMD}1$ asks the sex of a target person whose face image is to be created. When this icon is operated, sex select display screen SSD to be described later is selected and displayed. Icon $IC_{AMD}2$ asks the age of the target person. When this icon is operated, age select display screen OSD to be described later is selected and displayed. Icon $IC_{AMD}3$ asks the body shape of the target person. When this icon is operated, body shape select display screen BSD to be described later is selected and displayed. Icon $IC_{AMD}4$ asks the personality of a target person whose face image is to be created. When this icon is operated, the personality select display screen CSD is selected and displayed. Icon $IC_{AMD}5$ is operated to terminate the questionnaire inputting operation. When this icon is operated, personality select display screen CSD to be described later is selected and displayed.

d) Sex Select Display Screen SSD

When icon $IC_{AMD}1$ is operated on the questionnaire display screen AMD, sex select display screen SSD of FIG. 52 is displayed which displays icons $IC_{SSD}1$ and $IC_{SSD}2$, any one of which is used to input data on the sex of the target person and the sex data designated by the operation of that icon is stored in attribute data area ATT (to be described later) of work RAM 313.

e) Age Select Display Screen OSD

When icon $IC_{AMD}2$ is operated on the questionnaire display screen AMD, age select display screen OSD of FIG. 52 is displayed which displays icons $IC_{OSD}1$–$IC_{OSD}3$, any one of which is used to input data on the age of the target person and the age data designated by the operation of that icon is stored in attribute data area ATT (to be described later) of work RAM 313.

f) Body Shape Select Display Screen BSD

When icon $IC_{AMD}3$ is operated on the questionnaire display screen AMD, body shape select display screen BSD of FIG. 52 is displayed which displays icons $IC_{BSD}1$–$IC_{BSD}3$ which are used to input data on the body shape of the target person and body shape data designated by the operation of the icon is stored in attribute data area ATT (to be described later) of work RAM 313.

g) Personality Select Display Screen CSD

When icon $IC_{AMD}4$ is operated on the questionnaire display screen AMD, personality select display screen CSD of FIG. 52 is displayed which displays icons $IC_{CSD}1$–$IC_{CSD}3$, any one of which is used to input data on the personality of the target person and the personality data designated by the operation of that icon is stored in attribute data area ATT (to be described later) of work RAM 313.

h) Frame Select Display Screen WSD

Figure 53A:
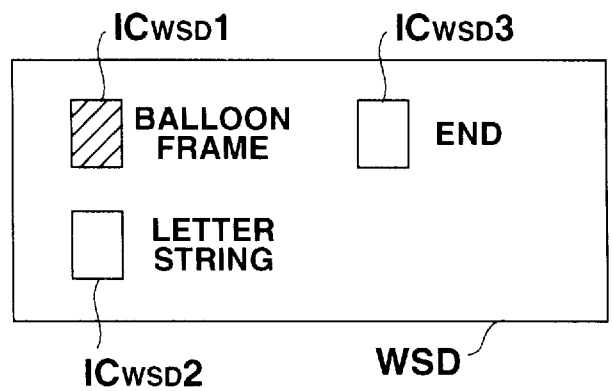
FIGS. 53A, 53B and 53C illustrate the structures of a frame select display screen WSD, a letter string select display screen MOSD and a balloon letter string select screen FWSD, respectively, in the fourth embodiment.

After the face image is created either in the above mentioned file system or in the questionnaire system, and when "BALLOON FRAME" or "BALLOON LETTER STRING" displayed along with the face image on the screen is selected, frame select display screen WSD of FIG. 53A is displayed. Displayed on this screen are icons $IC_{WSD}1$–$IC_{WSD}3$ which are used to select "BALLOON FRAME", "BALLOON LETTER STRING" and "END", respectively. This screen is changed to balloon frame select display screen FWSD or letter string select screen MOSD depending on the icon operation.

i) Letter String Select Display Screen MOSD

Figure 53B:
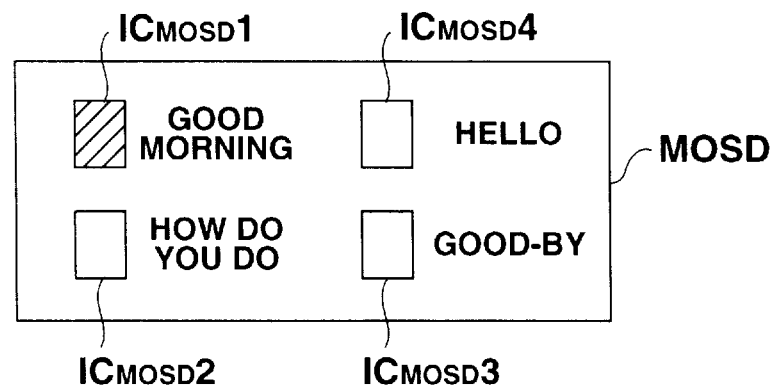

When icon $IC_{WSD}2$ is operated in the frame select display screen WSD, letter string select display screen MOSD of FIG. 53B is displayed. Displayed on image screen MOSD are icon $IC_{MOSD}1$–$IC_{MOSD}4$ each of which selects a basic balloon letter string (message text). Depending on the icon operation, a balloon letter string number is generated and stored in image designation data area IMD (to be described later) of work RAM 313.

j) Balloon Frame Select Display Screen FWSD

Figure 53C:
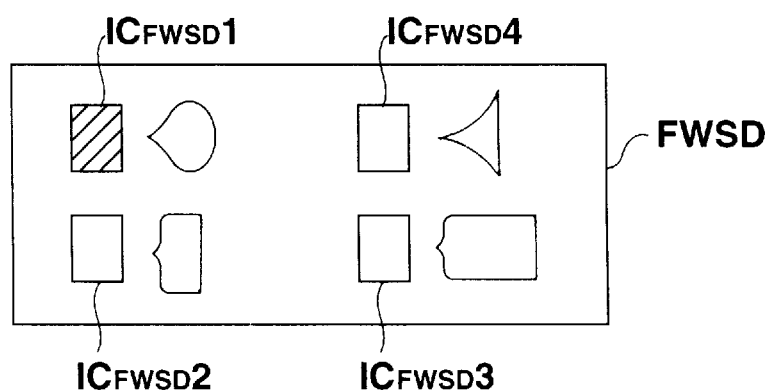

When icon $IC_{WSD}1$ is operated in the frame select display screen WSD, balloon frame select display screen FWSD of FIG. 53C is displayed which displays icon $IC_{FWSD}1$–$IC_{FWSD}4$, the operation of any one of which generates a corresponding balloon frame number, which is then stored in image designation data area IMD (to be described later) of work RAM 313.

(4) Structure of Work RAM 313

Figure 54:
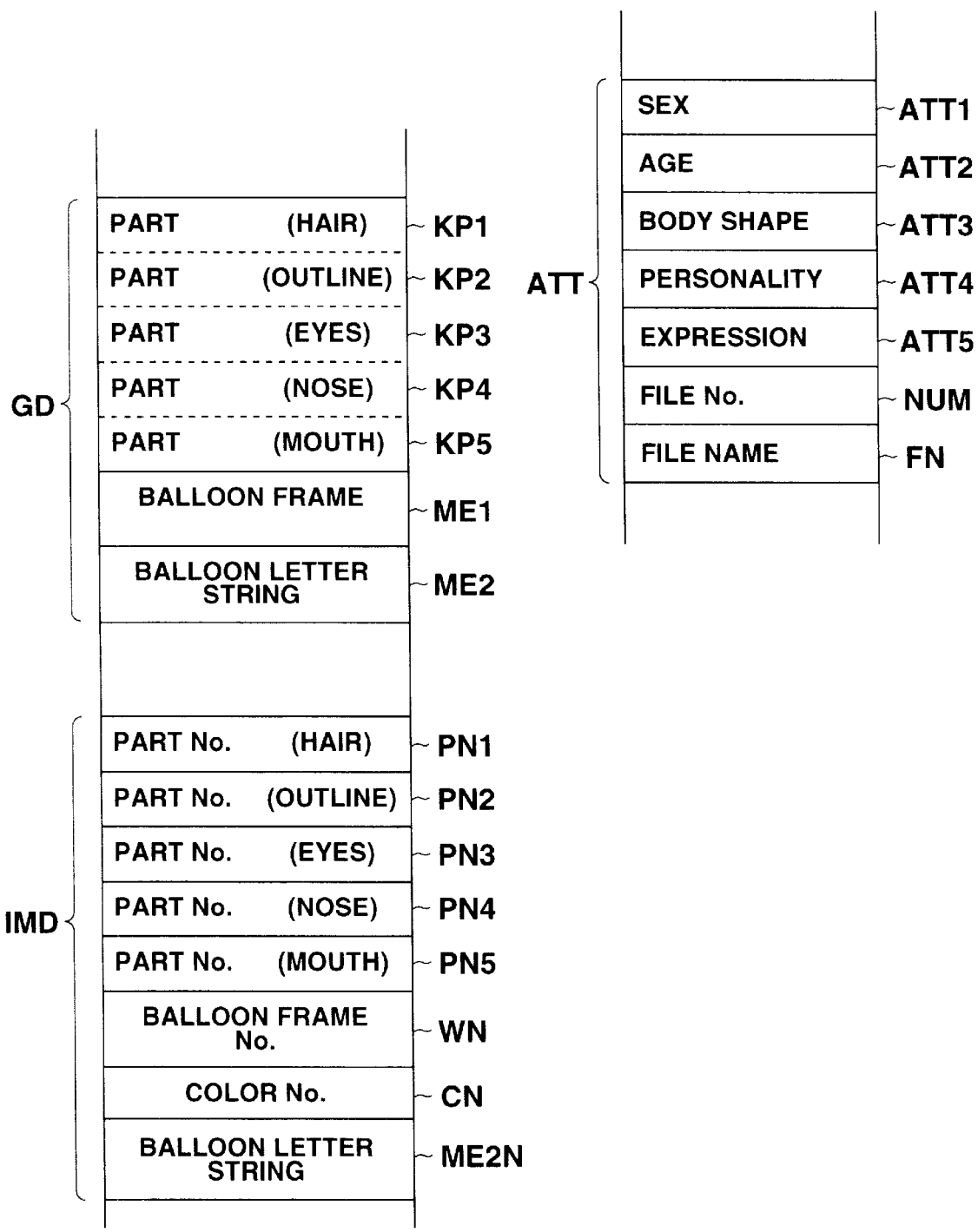
FIG. 54 shows a memory map which explains the memory structure of a work RAM 13 in the fourth embodiment.

Referring to FIG. 54, the memory structure of work RAM 313 will be described next.

As described above, work RAM 313 includes a storage area in which various registers which temporarily store the results of calculations by CPU 311 and or flag values and a display area where, as shown in FIG. 54, various data which displays a face image/balloon is stored. The display areas are mainly divided into an image data area GD, image designation data area IMD and attribute data area ATT.

Image data area GD stores part image data KP1–KP5 designated by image designation data stored in image designation data area IMD to be described later, balloon frame image data ME1 and balloon letter string image data ME2. These data are transferred from ROM 312 in accordance with image designation data.

Image designation data area AMD stores data on part numbers PN1–PN5 which designate respective ones of KP1–KP5 "HAIR", "OUTLINE", "EYES", "NOSE" and "MOUTH" as the images of parts which constitute a face, balloon frame number WN which designates balloon frame image data ME 1, color number CN which designates the display color of the balloon frame, and balloon letter string number ME2N which designates balloon letter string image data ME2. Respective part numbers PN1–PN5 of the image designation data are designated in correspondence to attribute data determined in either the file or questionnaire system. Balloon frame number WN, color number CN, and balloon letter string ME2N are each determined by the inputting operation.

Attribute data area ATT stores sex data ATT1, age data ATT2, body shape data ATT3, personality data ATT4 and expression data ATT5 input in the questionnaire system. When any one of files A–D, data on which is contained in ROM 312 is selected in the file system, area ATT stores data on the file number NUM and file name FN of the selected file.

B. Operation of the Fourth Embodiment

The operation of the fourth embodiment having the device structure and data structure, mentioned above, will be described with reference to FIGS. 55–66 below.

Figure 55:
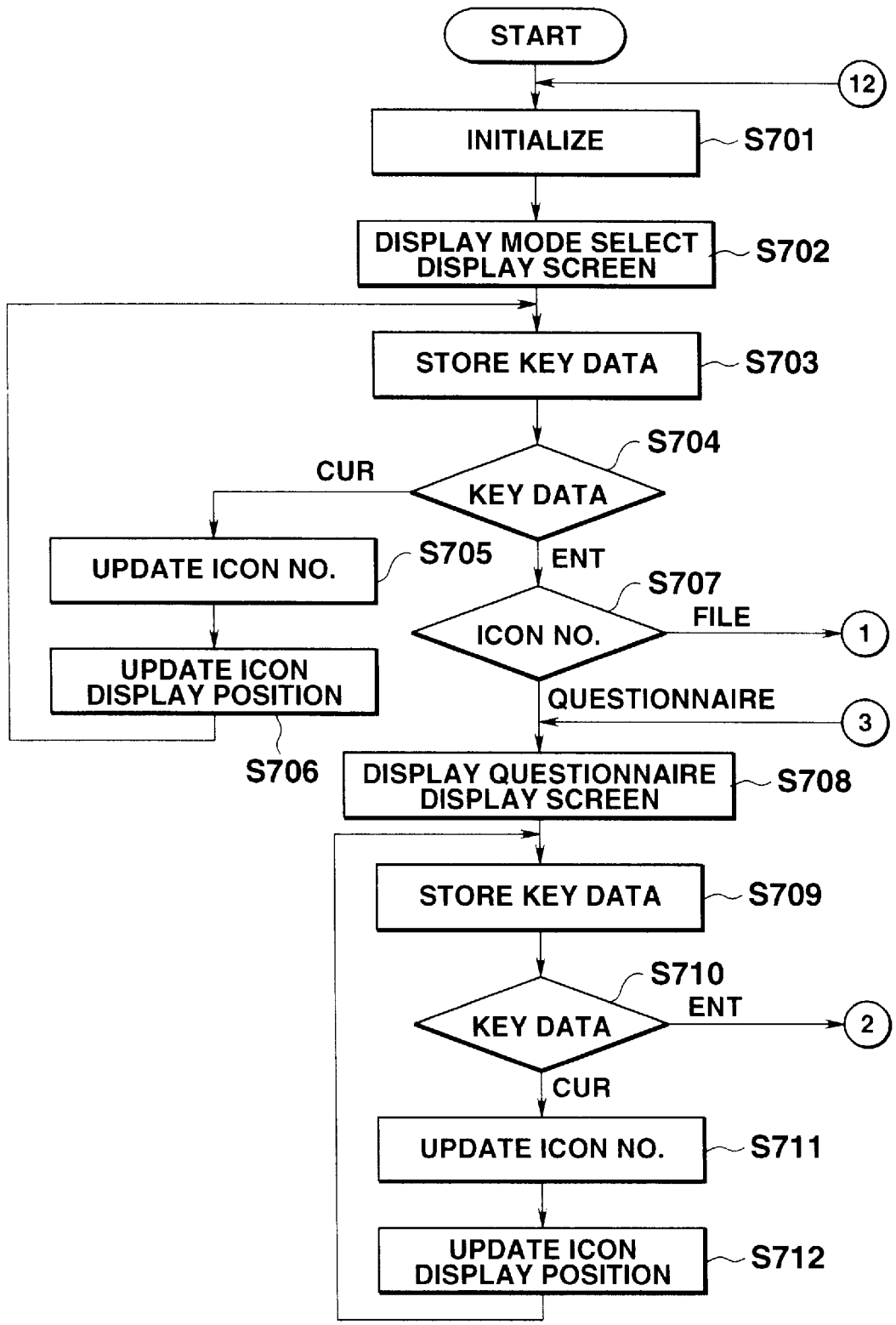
FIG. 55 is a flow chart indicative of the operation of the fourth embodiment.

First, when a power supply (not shown) for face image creation device 301 is turned on, CPU 311 reads a face image creation program from ROM 312 and loads it on CPU 311 and advances its process to step S1 of FIG. 55 where CPU 311 initializes various registers/flags provided in work RAM 313 and instructs VDP 314 to initialize its internal memory.

(1) Mode Select Process

After initialization, when CPU 311 passes to the processing at step S702, mode select display screen MSD of FIG. 51A is displayed. At step S703, CPU 311 stores into a key buffer key data depending on the operation of controller 310. The CPU then passes to the processing at step S704, where it determines whether the key data stored into the key buffer is due to the operation of cursor key CUR or due to the operation of decision key ENT.

When cursor key CUR is operated to select any one of icons $IC_{MSD}1$ and $IC_{MSD}2$ displayed on mode select display screen MSD, the CPU passes through the determination at step S704 to step S705, where the old icon number is updated with a new one selected in accordance with the operation of cursor key CUR. Subsequently, at step S706, icon $IC_{MSD}1$ (or $IC_{MSD}2$) on the side of the changed icon number is displayed emphatically and the control returns to step S703.

(2) Questionnaire Display Screen Process

Next, assume, for example, that decision key ENT has been operated. In this case, CPU 311 passes through determination at step S704 to S707, where CPU 311 determines which of icons $IC_{MSD}1$ and $IC_{MSD}2$ has been selected. If icon $IC_{MSD}2$ has been selected, CPU 311 then passes to the processing at step S708, where CPU 311 performs a face image creation or a balloon creation in the questionnaire system.

When icon $IC_{MSD}1$ has been selected, the CPU passes to file selection (step S764 of FIG. 61) to be described later.

In the questionnaire system process, CPU 311 passes the processing at step S708 where it displays questionnaire display screen AMD (FIG. 52). At the next step S709, CPU 311 stores key data into the key buffer and determines at step S710 CPU 311 whether the key data stored into the key buffer was due to the operation of cursor key CUR or decision key ENT.

When it is determined that the key data was obtained by the operation of cursor key CUR, the CPU passes to the processing at step S711, where CPU 311 updates the icon number in accordance with the operation of the cursor key CUR. Next, at step S712, CPU 311 updates the icon display position in correspondence to the updated icon number and returns the process to step S709. Operations corresponding to icons $IC_{AMD}1$–$IC_{AMD}5$ of questionnaire display screen AMD will be described next.

(3) Sex Select Process

Figure 56:
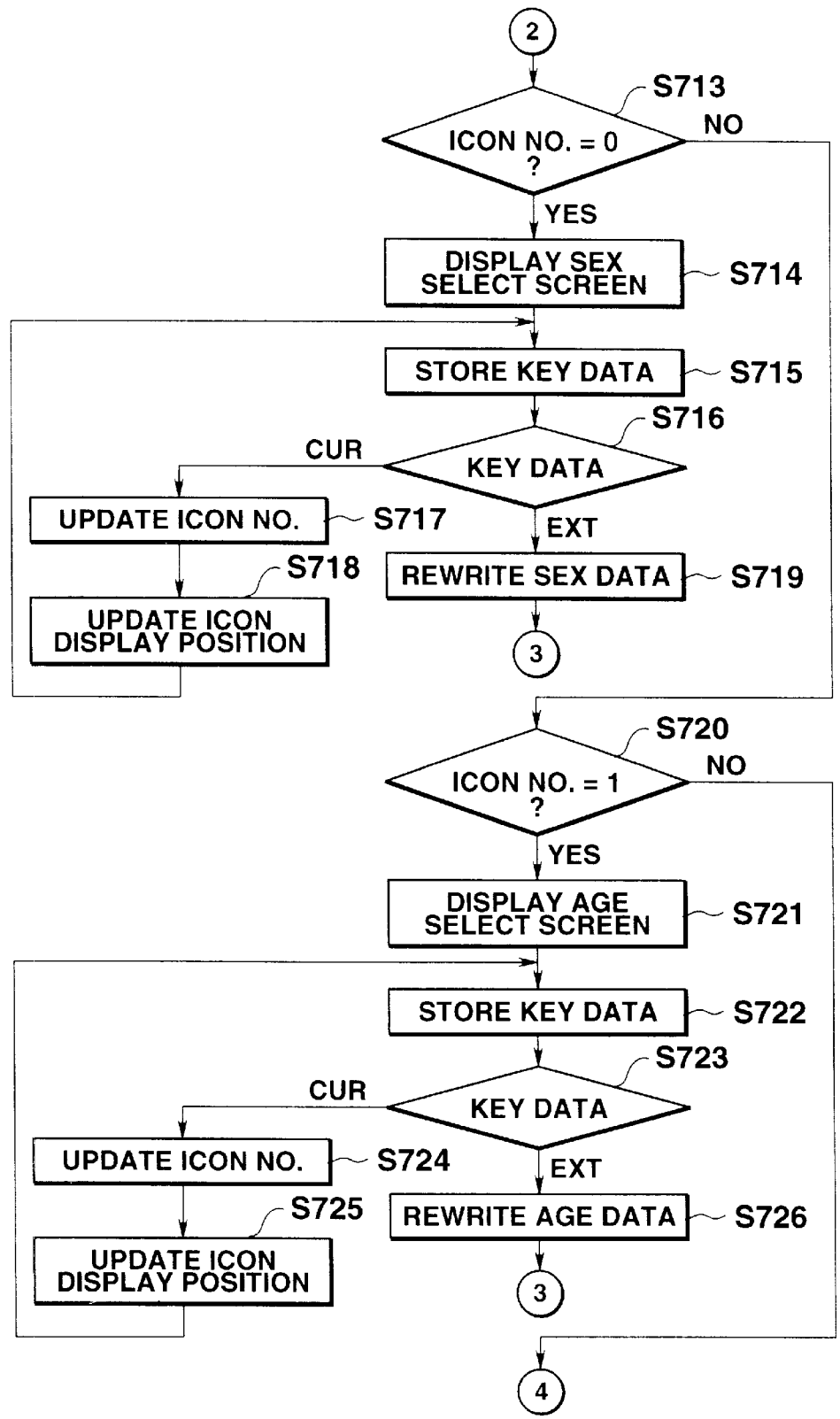
FIG. 56 is a flow chart indicative of the operation of the fourth embodiment.

When decision key ENT is depressed in a state where icon $IC_{AMD}1$ is selected in questionnaire display screen AMD, CPU 311 passes through step S710 to the processing at step S713 of FIG. 56, where CPU 711 determines whether the decided icon number is "0", that is, icon $IC_{AMD}1$ has been selected. In this case, the result of the determination is "YES" and CPU 311 passes the processing at step S714, where the CPU displays sex select display screen SSD (FIG. 52).

Next, when CPU 311 passes its step S715, the CPU stores key data into the key buffer and determines at step S716 whether the key data stored into the key buffer was due to the depression of cursor key CUR or due to the depression of decision key ENT.

When it is determined that the cursor key CUR has been operated, the CPU passes the processing at step S717, where it updates the icon number in accordance with that operation of the cursor key CUR. Next, at step S718, the CPU updates the icon display position in correspondence to the selected icon number and returns its process to step S715.

When any one of icons $IC_{SSD}1$ and $IC_{SSD}2$ of sex select display screen SSD is selected and decision key ENT is depressed, the CPU passes through determination at step S716 to step S719, where the CPU writes sex data ATT1 corresponding to the decided icon $IC_{SSD}1$ (male) or $IC_{SSD}2$ (female) into attribute data area ATT of work RAM 313 and then returns its process to the display of questionnaire display screen AMD at step S708.

(4) Age Select Process

When decision key ENT is depressed in a state where icon $IC_{AMD}2$ is selected in questionnaire display screen AMD, CPU 311 passes through step S713 to the processing at step S720, where CPU 311 determines whether the decided icon number is "1", that is, icon $IC_{AMD}2$ has been selected. In this case, the result of the determination is "YES" and CPU 311 passes to the processing at step S721, where the CPU displays age select display screen OSD (FIG. 52).

Next, passing to the processing at step S722, the CPU stores key data into the key buffer and determines at step S723 whether the stored key data is due to the depression of cursor key CUR or due to the depression of decision key ENT.

When the CPU determines that the stored key data is due to the operation of the cursor key CUR, the CPU passes the processing at step S724, where it updates the icon number in accordance with that operation of the cursor key CUR. Next, at step S725, the CPU updates the icon display position in correspondence to the selected icon number and returns its process to step S715.

When any one of icons $IC_{OSD}1$–$IC_{OSD}3$ is selected and decision key ENT is depressed, CPU 311 passes through determination at step S723 to step S726, where the CPU writes age data ATT2 corresponding to the decided icon $IC_{OSD}1$ (child), $IC_{OSD}2$ (adult) or $IC_{OSD}3$ (old) into attribute data area ATT of work RAM 313 and then returns its process to the display of questionnaire display screen AMD.

(5) Body Shape Select Process

Figure 57:
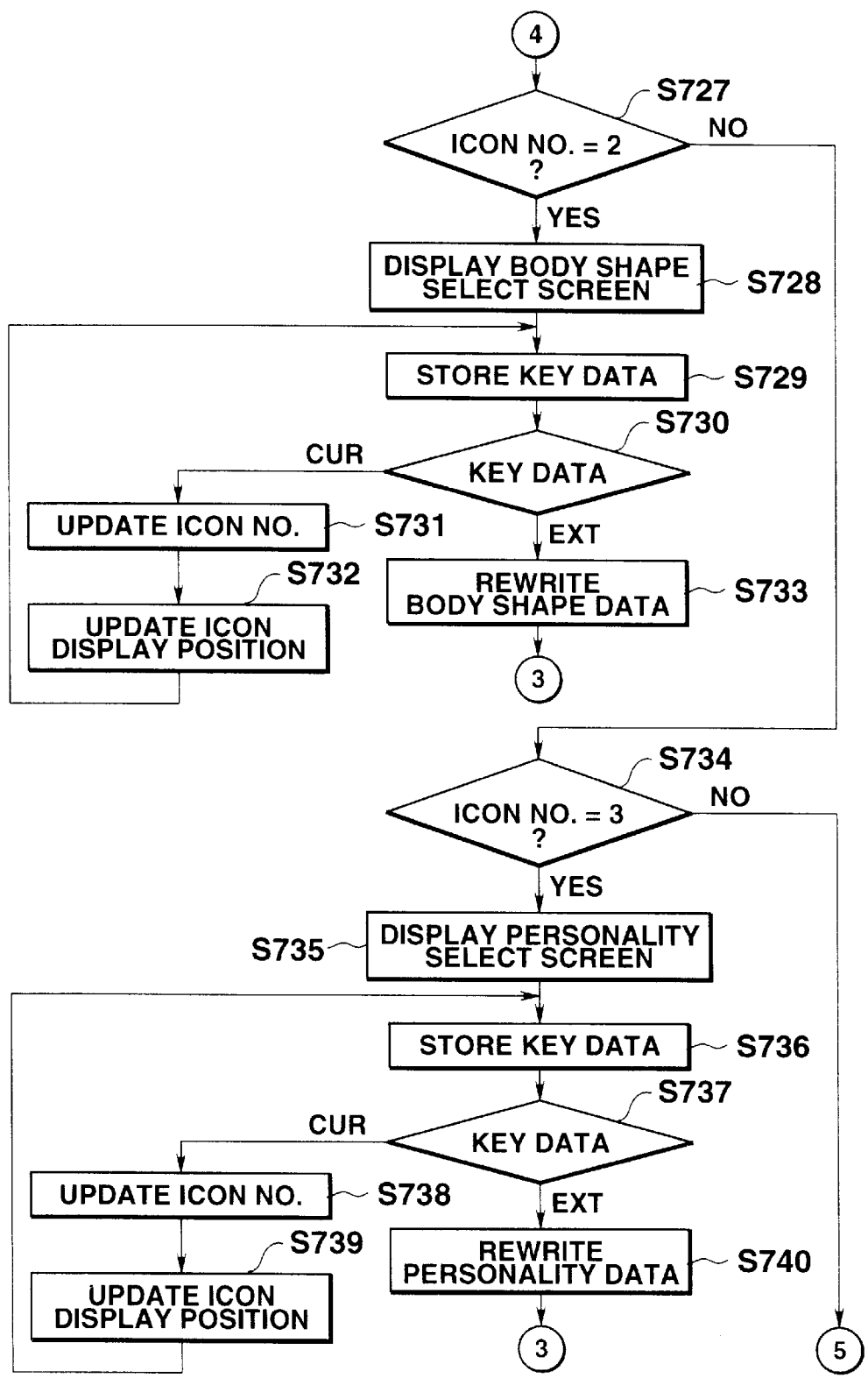
FIG. 57 is a flow chart indicative of the operation of the fourth embodiment.

When decision key ENT is depressed in a state where icon $IC_{AMD}3$ is selected in questionnaire display screen AMD, CPU 311 passes through determination at step S720 to the processing at step S727 of FIG. 57, where CPU 311 determines whether the decided icon number is "2", that is, icon $IC_{AMD}3$ has been selected. In this case, the result of the determination is "YES" and CPU 311 passes to the processing at step S728, where the CPU displays body shape select display screen BSD (FIG. 52).

Next, when CPU 311 passes to the processing at step S729, the CPU stores key data into the key buffer and determines at step S730 whether the stored key data is due to the depression of cursor key CUR or due to the depression of decision key ENT.

When the CPU determines that the key data is due to the operation of the cursor key CUR, the CPU passes to the processing at step S731, where it updates the icon number in accordance with that operation of the cursor key CUR. Next, at step S732, the CPU updates the icon display position in correspondence to the selected icon number and returns its process to step S729.

When any one of icons $IC_{BSD}1$–$IC_{BSD}3$ is selected and decision key ENT is depressed, CPU 311 passes through determination at step S730 to the processing at step S733, where the CPU writes body shape data ATT2 corresponding to the decided icon $IC_{BSD}1$ (thin), $IC_{BSD}2$ (medium) or $IC_{BSD}3$ (fat) into attribute data area ATT of work RAM 313, and then returns its process to the display of questionnaire display screen AMD (step S708).

(6) Personality Select Process

When decision key ENT is depressed in a state where icon $IC_{AMD}^4$ is selected in questionnaire display screen AMD, CPU 311 passes through step S727 to the processing at step S734, where CPU 311 determines whether the decided icon number is "3", that is, icon $IC_{AMD}4$ has been selected. In this case, the result of the determination is "YES" and CPU 311 passes to the processing at step S735, where the CPU displays personality select display screen CSD (FIG. 52).

Next, when CPU 311 passes to the processing at step S736, the CPU stores key data into the key buffer and determines at step S737 whether the stored key data is due to the depression of cursor key CUR or due to the depression of decision key ENT.

When the CPU determines that the stored key data is due to the depression of the cursor key CUR, the CPU passes to the processing at step S738, where it updates the icon number in accordance with that operation of the cursor key CUR. Next, at step S739, the CPU updates the icon display position in correspondence to the selected icon number and returns its process to step S736.

When any one of icons $IC_{CSD}1$–$IC_{CSD}3$ is selected and decision key ENT is depressed, CPU 311 passes through determination at step S737 to the processing at step S740, where the CPU writes personality data ATT4 corresponding to the decided icon $IC_{CSD}1$ (cheerful), $IC_{CSD}2$ (brave) or $IC_{CSD}3$ (hot-tempered) into attribute data area ATT of work RAM 313 and then returns its process to step S708 where the CPU displays the display of questionnaire display screen AMD.

(7) Questionnaire Terminating Process (Face Part Image Designation)

Figure 58:
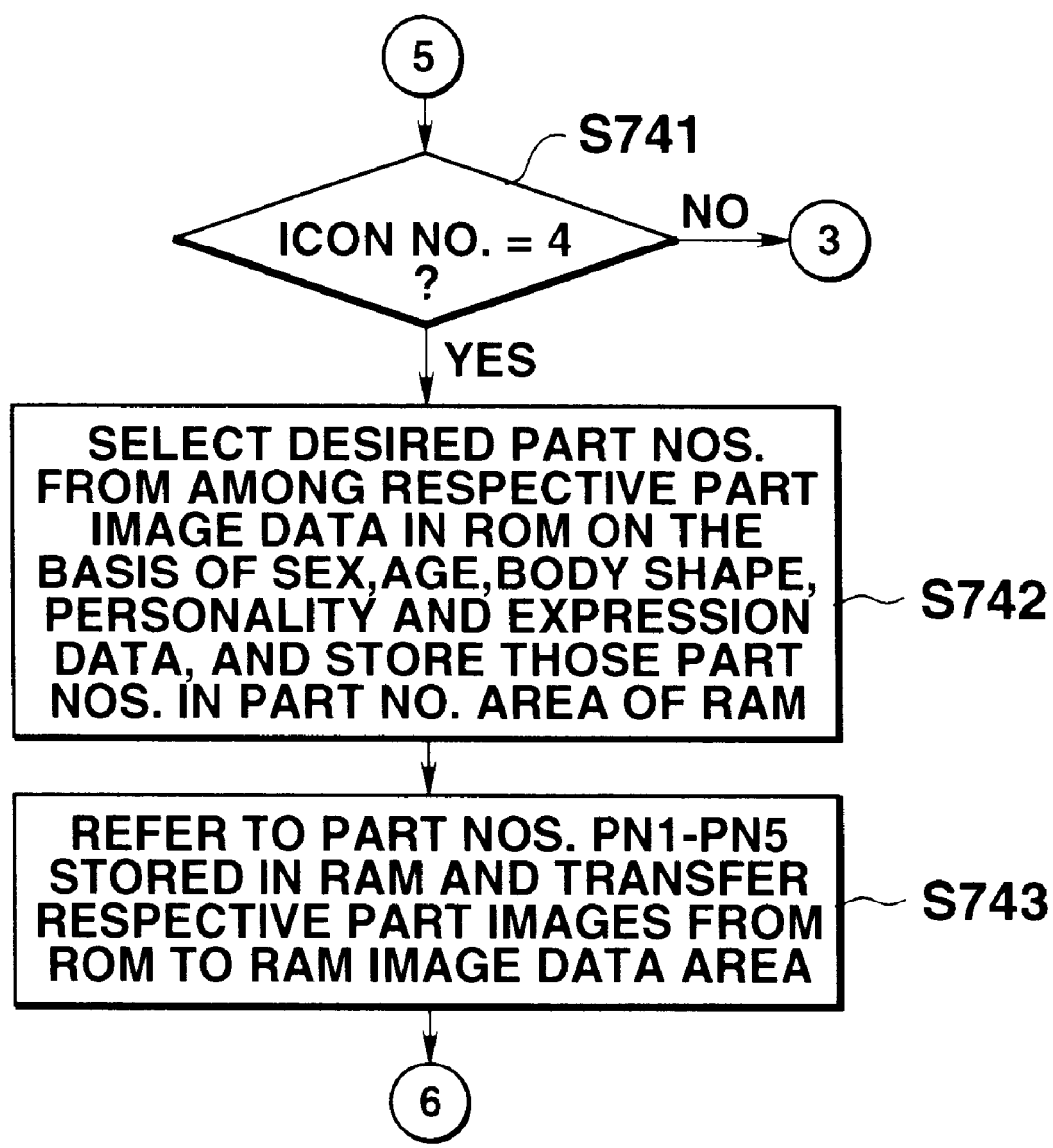
FIG. 58 is a flow chart indicative of the operation of the fourth embodiment.

When decision key ENT is depressed in a state where icon $IC_{AMD}5$ is selected in questionnaire display screen AMD, CPU 311 passes through step S734 to the processing at step S741 of FIG. 58, where CPU 311 determines whether the decided icon number is "4", that is, icon $IC_{AMD}5$ which terminates the questionnaire has been selected. In this case, the result of the determination is "YES" and CPU 311 passes to the processing at step S742.

At step S742, the CPU reads data on part numbers PN1–PN5 from face part select table KPS contained in ROM 312 in accordance with "SEX DATA" ATT1, "AGE DATA" ATT2, "BODY SHAPE DATA" ATT3, "PERSONALITY DATA" ATT4, and "DEFAULT (PREDETERMINED) EXPRESSION DATA" ATT written in attribute data area ATT of work RAM 313 in the above respective select processes and stores those data into image designation data area IMD of work RAM 313. AT step S743 the CPU DMA-transfers data on the respective part images corresponding to the part numbers PN1–PN5 stored in image designation data area IMD from ROM 312 to image data area GD of work RAM 313.

When at step S741 the result of the determination is "NO", and, for example, release key ESC is depressed to interrupt the questionnaire process, the CPU returns its process to step S708 and also returns the display screen to the questionnaire display screen AMD.

(8) Balloon Select Process

When the images of the respective parts of the face to be displayed are determined in the questionnaire system in the above-mentioned manner, CPU 311 passes to the processing at step S744 of FIG. 57. At step S744 the CPU displays balloon select display screen WSD of FIG. 53A. Next, at step S745 the CPU stores key data into the key buffer and determines at step S746 whether the stored key data is due to the depression of cursor key CUR or due to the depression of decision key ENT.

When the CPU determines that the stored key data is due to the depression of the cursor key CUR, the CPU passes to the processing at step S747, where it updates the icon number in accordance with that operation of the cursor key CUR. Next, at step S748, the CPU updates the icon display position in correspondence to the selected icon number and returns its process to step S745.

When any one of icons $IC_{WSD}1$–$IC_{WSD}3$ is selected and decision key ENT is depressed, CPU 311 passes through determination at step S746 to the processing at step S749, where the CPU determines its process according to the decided icon $IC_{WSD}1$ (balloon frame selection), $IC_{WSD}2$ (letter string selection) or $IC_{WSD}3$ (end).

a) Selection of Balloon Frame Image

When decision key ENT is operated in a state where icon $IC_{WSD}1$ has been selected, the CPU passes through determination at step S749 to the processing at step S750, where the CPU displays balloon frame select display screen FWSD of FIG. 53C. Next, at step S751, CPU 311 stores key data into the key buffer and determines at step S752 whether the stored key data is due to the depression of cursor key CUR or due to the depression of decision key ENT.

When the CPU determines that the cursor key CUR was operated, the CPU passes to the process at step S753, where it updates the icon number in accordance with that operation of the cursor key CUR. Next, at step S754, the CPU updates the icon display position in correspondence to the updated icon number and returns its process to step S751.

When decision key ENT is depressed to determine, for example, a balloon display shape shown by icon $IC_{FSD}1$, CPU 311 passes through determination at step S752 to the processing at step S755 where the CPU stores a number corresponding to balloon frame number WN of image designation data area IMD of work RAM 313. Thus, the display shape of the balloon frame is fixed.

Passing to the processing at step S756, CPU 311 reads from ROM 312 balloon frame image data ME1 corresponding to balloon frame number WN and transfers it to balloon frame image area ME1 in image data area GD of work RAM 313, and then returns its process to step S744.

b) Selection of Balloon Letter String Image

Figure 60:
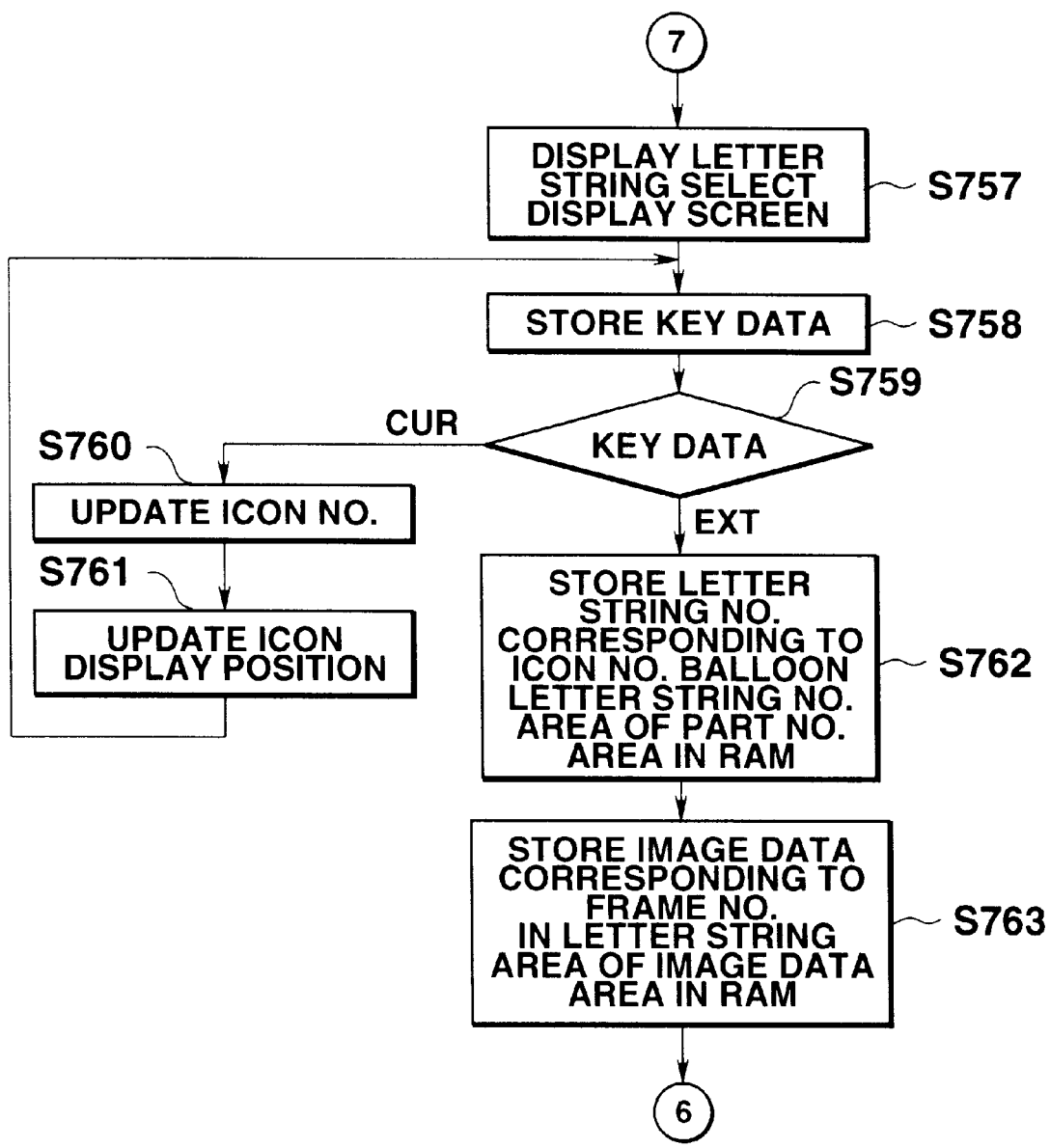
FIG. 60 is a flow chart indicative of the operation of the fourth embodiment.

When icon $IC_{WSD}2$ which selects a letter string is selected and the decision key ENT is operated in a state where the balloon frame has been fixed and the balloon select display screen WSD (FIG. 53A) has been displayed again at step S744, CPU 311 passes through the determination at S749 to the processing at step S757 of FIG. 60.

At step S757, the CPU displays letter string select display screen MOSD of FIG. 53B. Next, when CPU 311 passes to the processing at step S758, the CPU stores key data into the key buffer and determines at step S759 whether the stored key data is due to the depression of cursor key CUR or due to the depression of decision key ENT.

When the CPU determines that the stored data is due to the depression of the cursor key CUR, the CPU passes to the processing at step S760, where it updates the icon number in accordance with that operation of the cursor key CUR. Next, at step S761, the CPU updates the icon display position in correspondence to the updated icon number and returns its process to step S758.

When decision key ENT is depressed to determine, for example, a balloon letter string "Good morning" shown by icon $IC_{MOSD}1$, the CPU 311 passes through determination at step S759 to the processing at step S762 where the CPU stores data on a letter string number corresponding to icon $C_{MOSD}1$ in balloon letter string ME2N of image designation data area IMD of work RAM 313. Thus, the balloon letter string is fixed.

Figure 59:
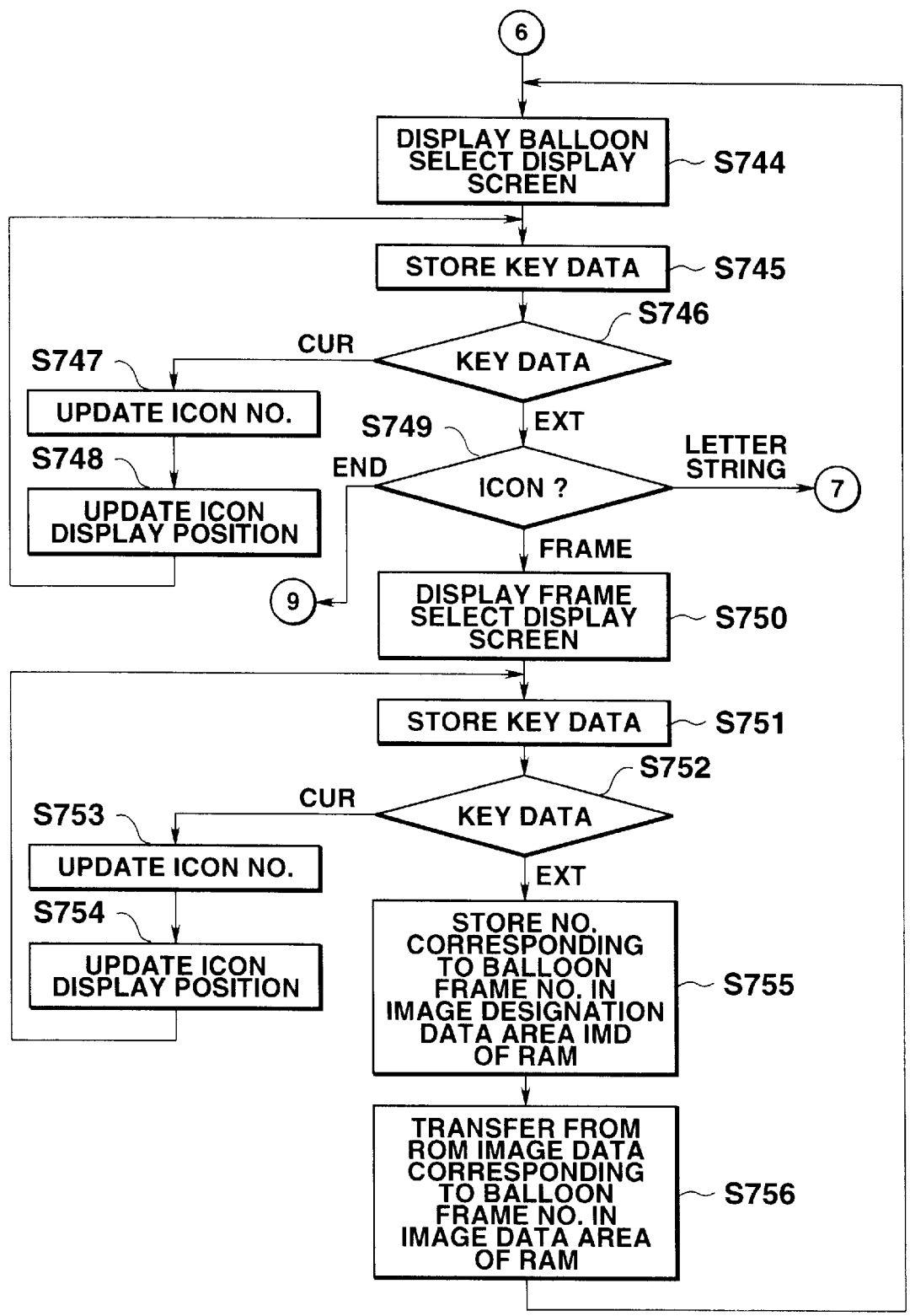
FIG. 59 is a flow chart indicative of the operation of the fourth embodiment.

Passing to the processing at step S763, CPU 311 reads from ROM 312 balloon letter string image data ME2 which designated by a letter string number written in balloon letter string ME2N and transfers it to balloon letter string image area ME2 in image data area GD of work RAM 313, and then returns its process to step S744 (FIG. 59).

When "BALLOON FRAME" and "BALLOON LETTER STRING" are determined in this way, the user selects icon $IC_{WSD}3$ and operates decision key ENT in a state in which balloon select display screen WSD has been displayed, in order to complete the balloon select process. In response, CPU 311 passes through the determination at step S749 (FIG. 59) to the processing at step S771 of FIG. 61.

The processing at step S771 and subsequent steps includes changing the "BALLOON FRAME" and "BALLOON LETTER STRING" in accordance with data on attributes of the face image to realize a balloon display harmonic with the face image, the details of which will be described in the following file select process.

(9) File Select Process

Figure 61:
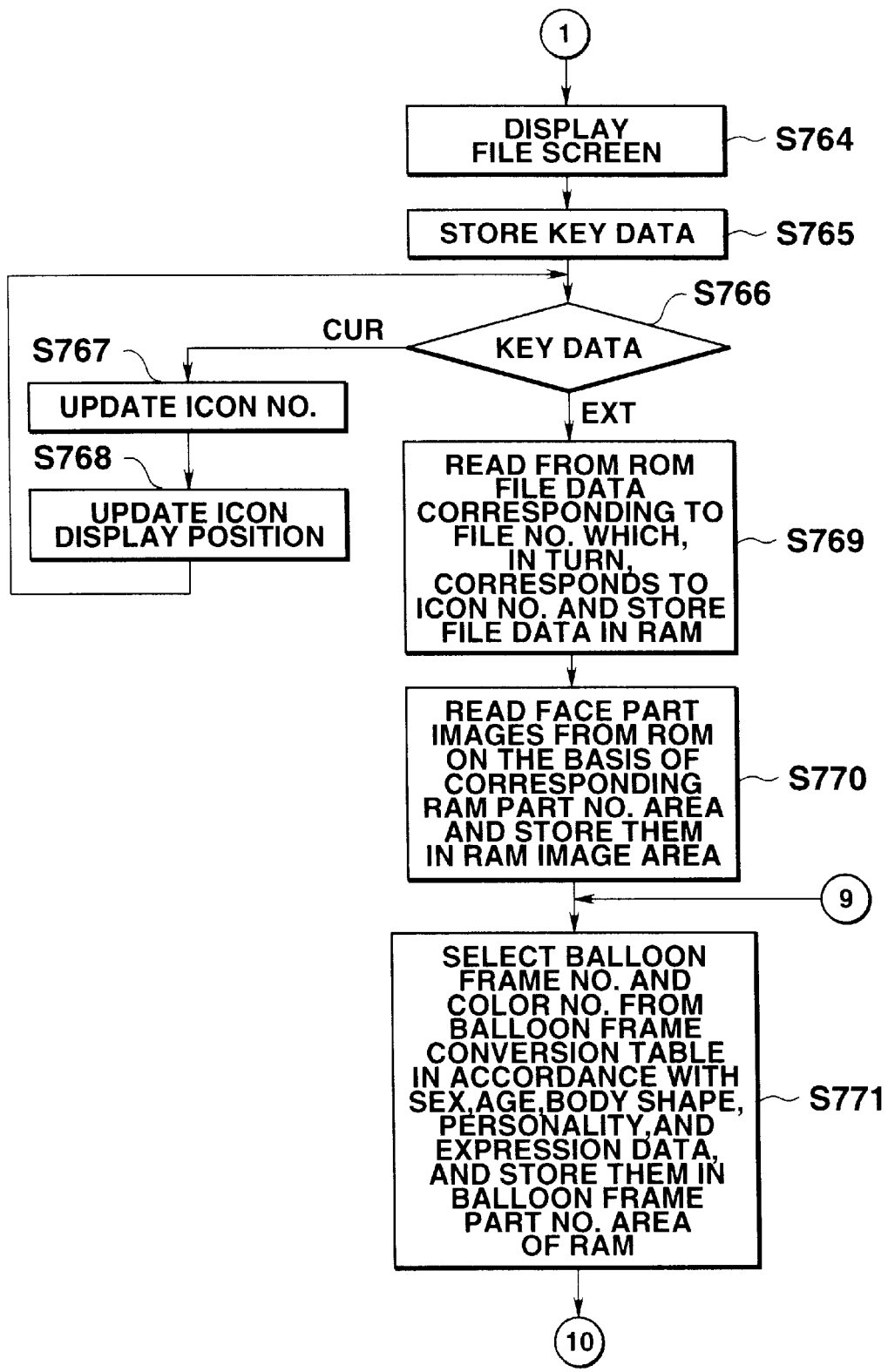
FIG. 61 is a flow chart indicative of the operation of the fourth embodiment.
Figure 62:
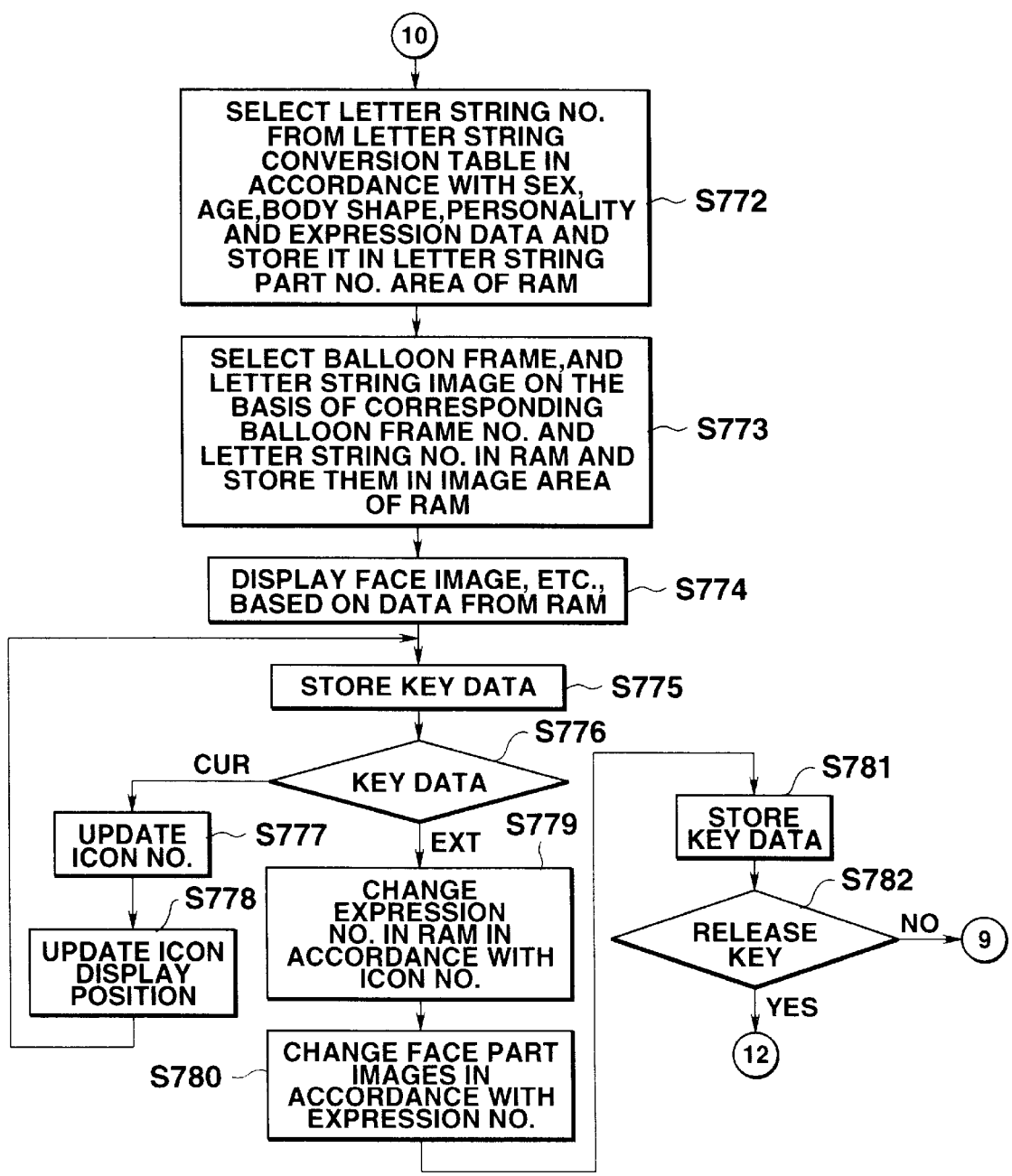
FIG. 62 is a flow chart indicative of the operation of the fourth embodiment.

When icon $IC_{MSD}1$ is selected and decision key ENT is operated in the mode select display screen MSD (FIG. 51A), CPU 311 passes through the determination at step S707 to the processing at step S764 of FIG. 61, where the CPU 311 displays file select display screen FSD (FIG. 51B).

Next, at step S765, CPU 311 stores key data into the key buffer and determines at step S766 whether the stored key data is due to the depression of cursor key CUR or due to the depression of decision key ENT.

When the CPU determines that the stored data is due to the depression of the cursor key CUR, the CPU passes to the processing at step S767, where it updates the icon number in accordance with that operation of the cursor key CUR. Next, at step S768, the CPU updates the icon display position in correspondence to the updated icon number and returns its process to step S766.

When decision key ENT is operated to read the contents of file A corresponding to icon $IC_{FSD}1$, CPU 311 passes through determination at step S766 to the processing at step S769, where CPU 311 reads from ROM 312 image designation data and attribute data stored in file A from ROM 312 and stores those data in the respective storage areas of work RAM 313.

Thereafter, CPU 311 passes to the processing at step S770, where the CPU reads part image data KP1–KP5 sequentially from ROM 312 on the basis of part numbers PN1–PN5 set in image designation data area IMD of work RAM 313 and transfers the read data sequentially into image data area GD of work RAM 313.

(10) Balloon Conversion Process

When various image data to be displayed is determined either in the questionnaire display screen processing or in the file selection, CPU 311 passes to the processing at step S771, where CPU 311 reads balloon frame number and color number from balloon frame conversion table MET contained in ROM 312 in accordance with attribute data (sex, age, body shape, personality and default expression) stored in work RAM 313 and stores those data as balloon frame number WN and color number CN in image designation data area IND of work RAM 313.

Then, at step S772 (FIG. 62), CPU 311 reads data on a balloon letter string from balloon letter string conversion table MECT contained in ROM 312 in accordance with attribute data (sex, age, body shape, personality and default expression) stored in work RAM 313 and stores it in balloon letter string ME2N of image designation data area IMD of work RAM 313, and the CPU then passes to the processing at S773.

At step S773, the CPU reads from ROM 312 balloon letter string image data ME2, and balloon frame image data ME1 on the basis of the balloon letter string ME2N and balloon frame number WN stored in image designation data area IMD of work RAM 313 and sequentially transfers them to image data area GD of work RAM 313.

(11) Display Control Process

At step S774, CPU 311 commands DMA to transfer the respective image data set in image data area GD of work RAM 313 into a predetermined area of VRAM 315 and commands VDP 314 to display on the screen the face image and the corresponding balloon frame and letter string in accordance with the respective image data sequentially transferred to VRAM 315.

Figure 63:
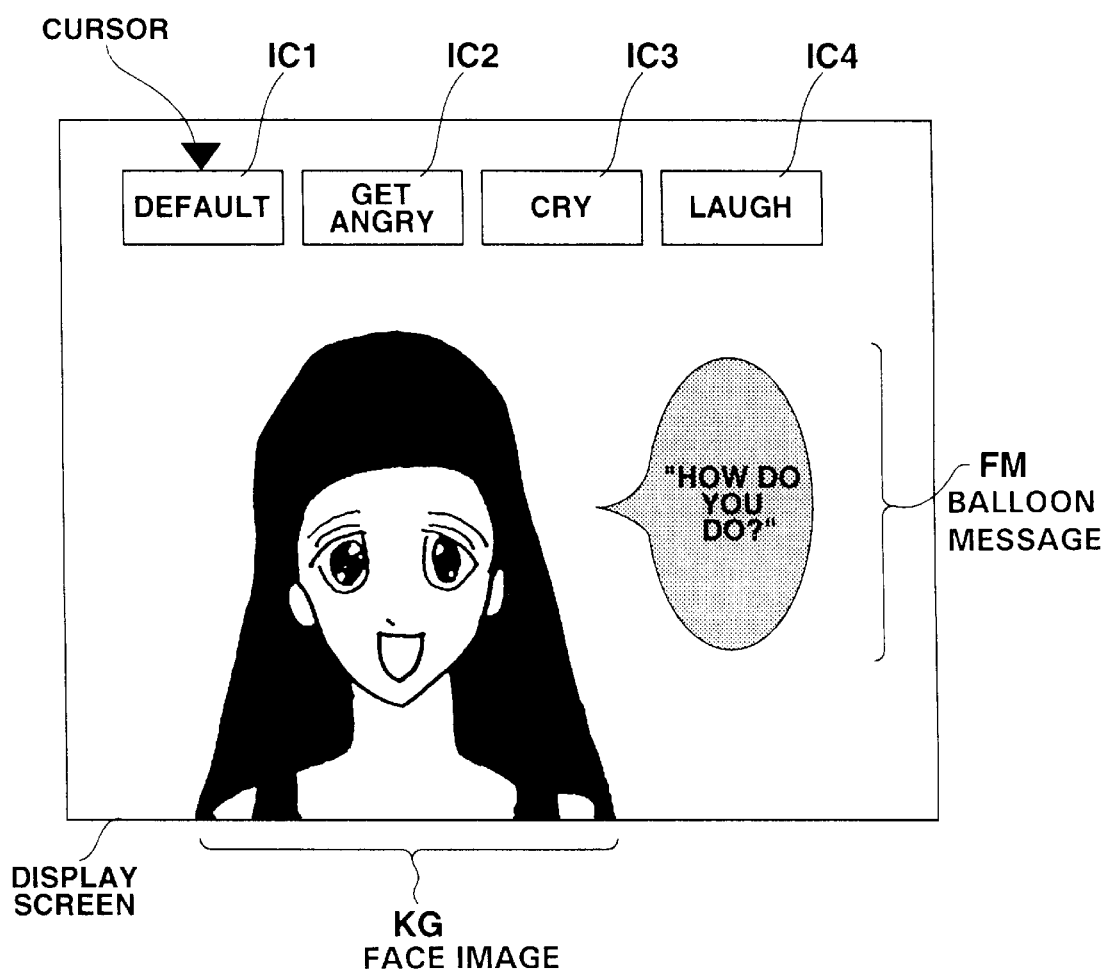
FIG. 63 shows an example of a display screen which explains the operation of the fourth embodiment.

Thus, for example, as shown in FIG. 63, face image KG having a default expression and balloon message FM are displayed on the screen. At this time, icons IC 1–IC 4 which change expression data to "DEFAULT", "GET ANGRY", "CRY" and "LAUGH" are displayed in an upper portion of the display screen.

Then, passing to the processing at step S775, CPU 311 stores key data into the key buffer and at step S776 determines whether the stored key data is due to the depression of cursor key CUR or due to the depression of decision key ENT.

When cursor key CUR is operated to select any one of icons IC1–IC4 to thereby update the contents of the displayed data, the CPU passes to the processing at step S777, where the CPU updates the icon number in accordance with the operation of cursor key CUR. Then, at step S778, the CPU emphatically displays that of icons IC1–IC4 corresponding to the updated icon number and returns its process again to step S775.

When, for example, the decision key ENT is operated in a state where icon IC2 has been selected by the operation of cursor key CUR, CPU 311 passes through determination at step S776 to the processing at step S779, where the CPU changes expression data ATT5 stored in attribute data area ATT of work RAM 313 in accordance with the determined icon number. At step S780, the CPU refers to face part conversion table KPT contained in ROM 312 and changes face part image data KP1–KP5 in accordance with the changed expression data ATT5.

Thereafter, CPU 311 passes to the processing at step S781, where the CPU stores key data into the key buffer. Then, at step S782, the CPU determines whether the stored key data is due to the depression of release key ESC. If so, in order to interrupt the face image creation and balloon image creation, CPU 311 returns its process to step S701, where the CPU initializes the system.

When it is determined that no release key ESC has been depressed, the CPU returns its process to step S772 and displays a face image having a newly set expression and "BALLOON FRAME" and "BALLOON LETTER STRING" having forms harmonic with the face image through steps S772–S774.

Figure 64:
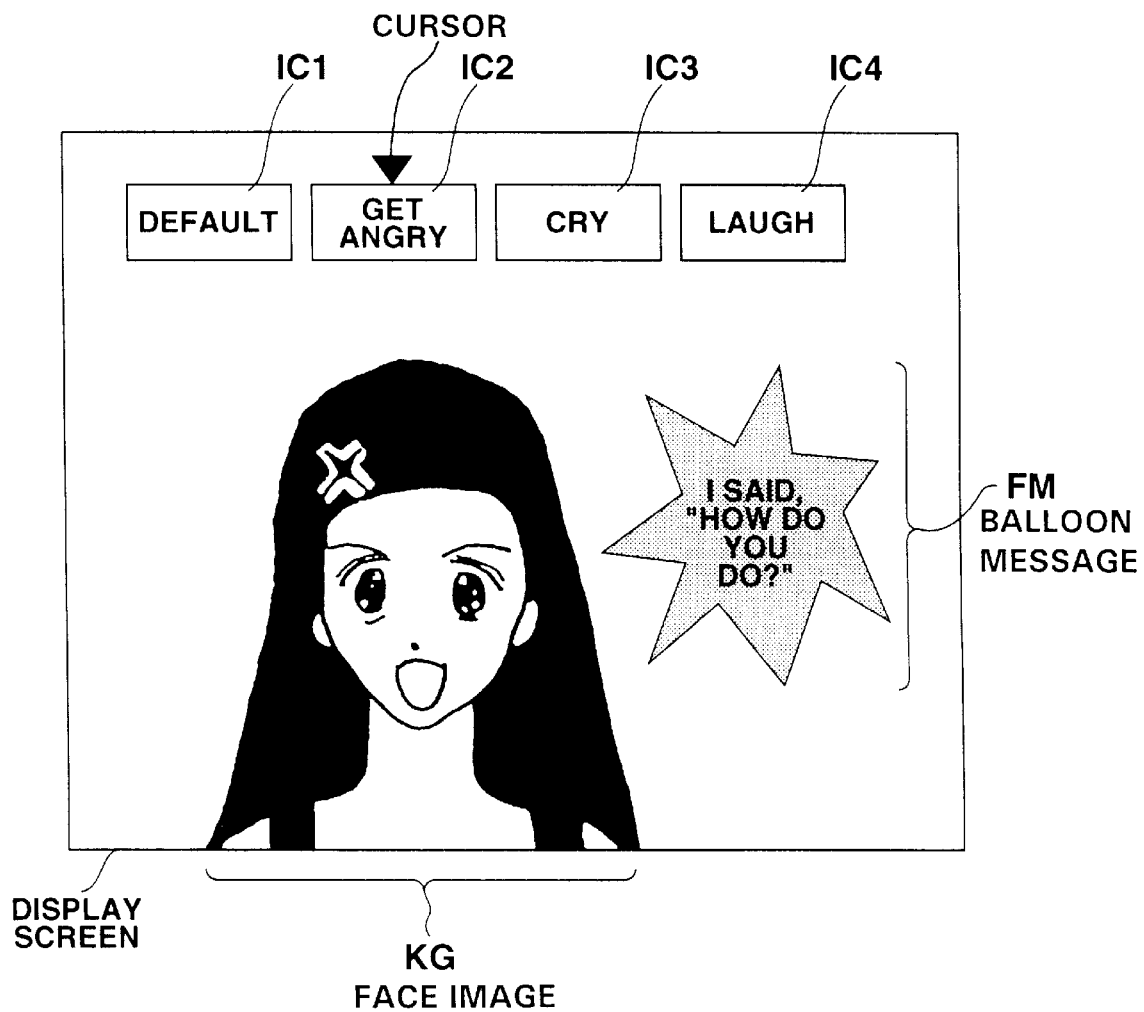
FIG. 64 shows an example of a display screen which explains the operation of the fourth embodiment.
Figure 65:
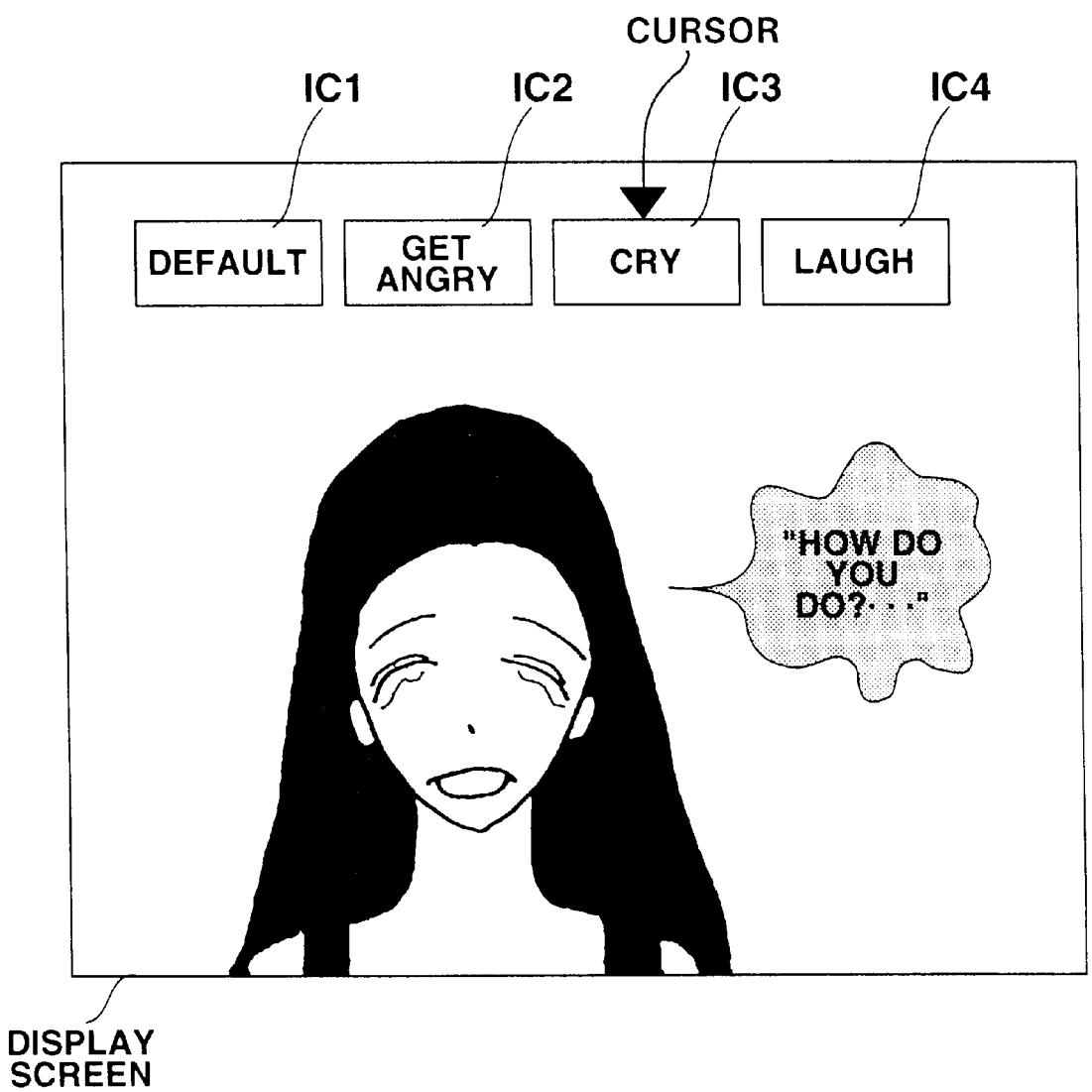
FIG. 65 shows an example of a display screen which explains the operation of the fourth embodiment.
Figure 66:
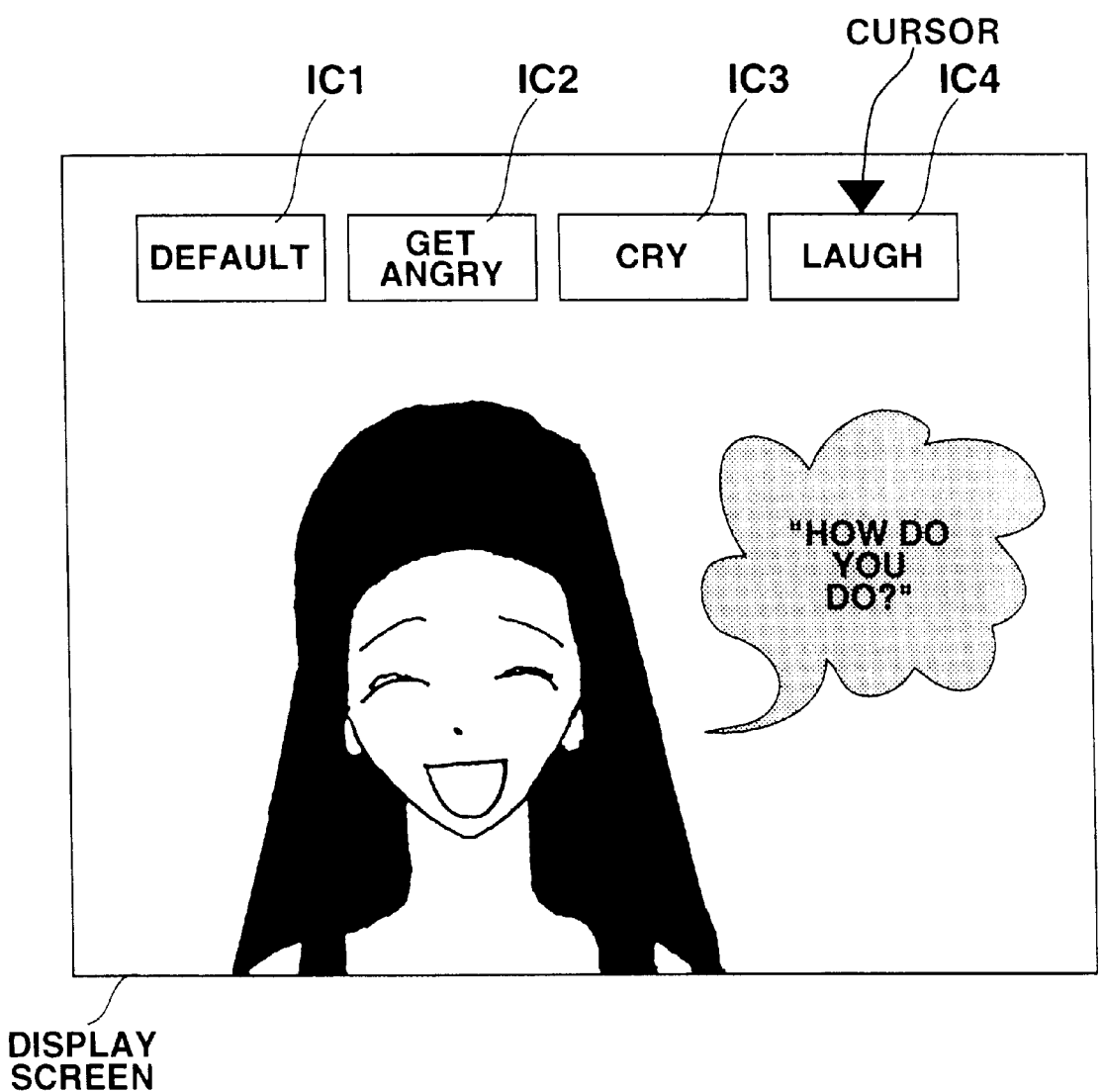
FIG. 66 shows an example of a display screen which explains the operation of the fourth embodiment.

For example, as shown in FIG. 64, when icon IC 2 is selected to set "ANGER", mark MK indicating an angry expression is displayed in the "HAIR" part of the face image KG by the image change (step S780) or "EYES", "EYEBROWS", and "MOUTH" are each changed so as to have an angry expression. Further, balloon message FM is displayed which produces an "ANGRY" atmosphere in harmony with the display form of the face image. When icon IC3 is selected and "CRY" is set, the face image is changed as shown in FIG. 65 and a balloon harmonic with the changed face image is displayed. In addition, when icon IC4 is selected to set "LAUGH", the face image is changed, for example, as shown in FIG. 66, and a balloon harmonic with that face image is displayed.

C. Balloon Frame Changing Process

At step S771 the shape of the balloon frame is changed by referring to the balloon frame conversion table MET contained in ROM 312, in accordance with attribute data (sex, age, body shape, personality and default expression). This changing process will be described specifically with reference to FIGS. 67 and 68.

Figure 67:
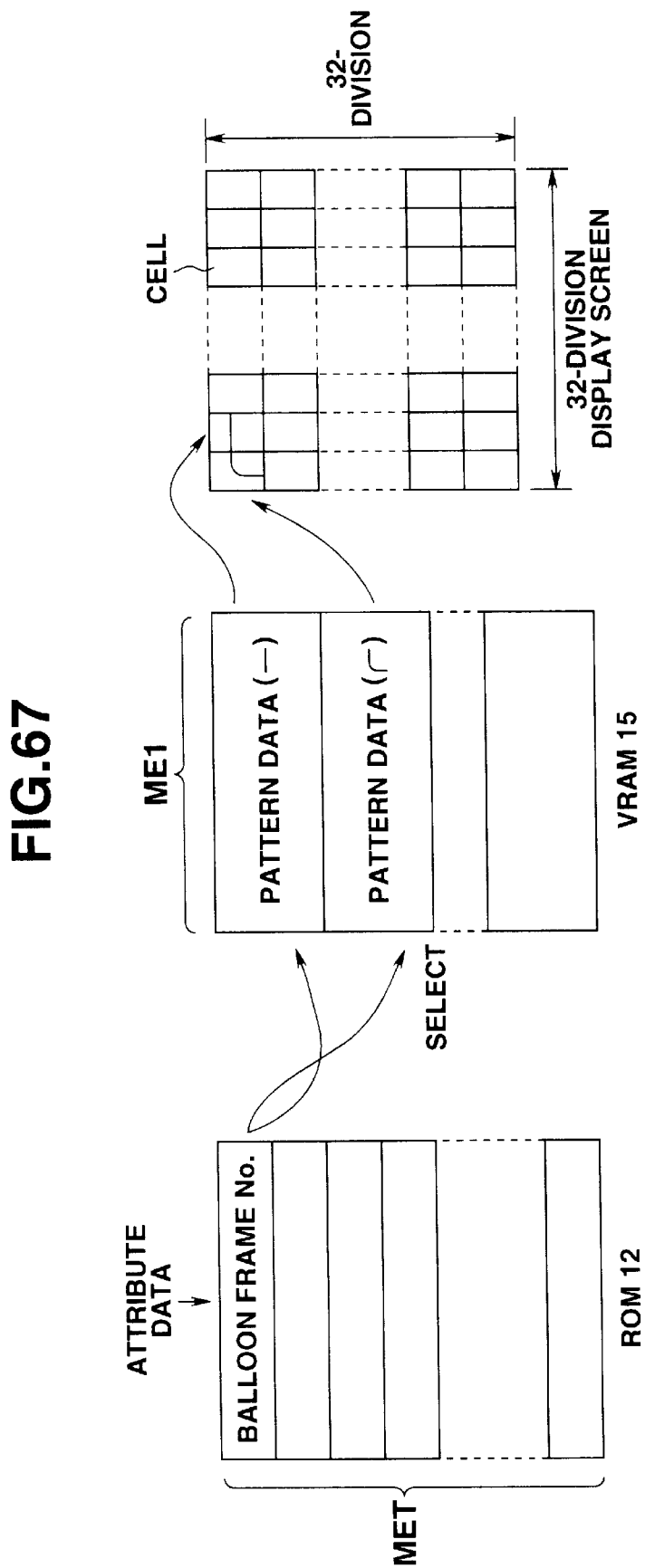
FIG. 67 illustrates a balloon frame changing process in the fourth embodiment.

FIG. 67 illustrates the concept of the balloon frame changing process. As shown in FIG. 67, balloon frame image data is stored in VRAM 315. The balloon frame image data is composed of kinds of pattern data. Each pattern data relates to a respective one of line segment elements which forms a respective one of balloon frames having different forms and displays one of the 32×32 cell areas which constitute the display screen.

ROM 312 contains balloon frame conversion table MET in which balloon frame numbers each designating a combination of pattern data are recorded as table data. That is, table MET contains data on a plurality of combinations of patterns, one making up a balloon frame to be displayed for each balloon frame number.

By reading balloon frame numbers from the table MET, using the attribute data as reading parameters, pattern data is sequentially read out from VRAM 315 in accordance with data on a combination of patterns designated by each of the balloon frame numbers and displayed. As a result, formed and displayed on the display screen is a balloon frame having a shape corresponding to the balloon frame number with its shape being changed in accordance with the appropriate attribute data.

FIGS. 68A and 68B each illustrate one example of a changed shape of a balloon frame. FIG. 68 shows a balloon frame composed of patterns W1–W14 while FIG. 68B shows a balloon frame composed of patterns W1–W7, W10A, W10B, and W11–W14.

According to this technique, there is no need for preparing data on a plurality of different balloon frame images and balloon frames having different shapes are produced with a small amount of data.

As described above, according to the fourth embodiment, ROM 312 contains face part conversion table KPT which changes face part images in accordance with attribute data which expresses the features of a face to be displayed, balloon frame conversion table MET which changes the shape of a balloon frame in accordance with attribute data, balloon letter string conversion table MECT which changes the contents of a balloon letter string in accordance with attribute data. When the attribute data is updated, the initial face image is changed by referring to the table KPT and "BALLOON FRAME" and "BALLOON LETTER STRING" are changed by referring to tables MET and MECT. Thus, a balloon display harmonic with the face image is obtained to thereby increase the force of feeling expression.

While in the fourth embodiment the face image is changed depending on a change in its expression, the present invention is not limited to this particular case, but the image may be changed in accordance with other attributes (personality, body shape, sex and age). In this case, an icon which selects an attribute is displayed on the display screen such that when any attribute is selected, the image may be changed within the category of the selected attribute.

There is no need to fix the change of the image to one attribute alone, but the image may be changed in accordance with a plurality of attribute changes. In this case, a face image having more complicated features may be created. In this case, a new delight can be created such as simulates a "ten-years-later fat face" from the face image created in accordance with the current attributes (personality, body shape, sex and age) in the fields of utilization.

What is claimed is:

1. An image processor comprising:

first display signal outputting means for outputting a first display signal to display a face image;

second display outputting means for outputting, based on the first display signal, a second display signal to display a message image which indicates message information accompanying the face image; and third display outputting means for outputting, based on the second display signal, a third display signal to display a surrounding figure image which surrounds a display area of the message image;

wherein said third display signal outputting means comprises surrounding figure control means for changing attributes of the surrounding figure image; and wherein said surrounding figure control means includes means for changing a color of a background of the surrounding figure image.

2. An image processor comprising:

first display signal outputting means for outputting a first display signal to display a face image;

second display outputting means for outputting, based on the first display signal, a second display signal to display a message image which indicates message information accompanying the face image; and third display outputting means for outputting, based on the second display signal, a third display signal to display a surrounding figure image which surrounds a display area of the message image;

wherein said third display signal outputting means comprises surrounding figure control means for changing attributes of the surrounding figure image; and wherein said surrounding figure control means includes means for changing a shape of the surrounding figure image.

3. An image processor comprising:

first display signal outputting means for outputting a first display signal to display a face image;

second display outputting means for outputting, based on the first display signal, a second display signal to display a message image which indicates message information accompanying the face image; and third display outputting means for outputting, based on the second display signal, a third display signal to display a surrounding figure image which surrounds a display area of the message image;

wherein said third display signal outputting means comprises surrounding figure control means for changing attributes of the surrounding figure image; and wherein said surrounding figure control means includes means for determining a situation of use of a particular symbol in the message information, and means for changing a shape of the surrounding figure image in accordance with a result of the determination.

4. An image processor comprising:

first display signal outputting means for outputting a first display signal to display a face image;

second display outputting means for outputting, based on the first display signal, a second display signal to display a message image which indicates message information accompanying the face image; and third display outputting means for outputting, based on the second display signal, a third display signal to display a surrounding figure image which surrounds a display area of the message image; and surrounding figure moving means for moving as a unit the surrounding figure image and at least one of a symbol and a letter indicated within the surrounding figure image.

5. An image processor comprising:

first display signal outputting means for outputting a first display signal to display a face image;

second display outputting means for outputting, based on the first display signal, a second display signal to display a message image which indicates message information accompanying the face image; and third display outputting means for outputting, based on the second display signal, a third display signal to display a surrounding figure image which surrounds a display area of the message image; and symbol arrangement control means for changing an arrangement including at least one of a letter and a symbol of the message image in accordance with at least one of a size and shape of the surrounding figure image.

6. An image processor comprising:

first display signal outputting means for outputting a first display signal to display a face image;

second display outputting means for outputting, based on the first display signal, a second display signal to display a message image which indicates message information accompanying the face image;

third display outputting means for outputting, based on the second display signal, a third display signal to display a surrounding figure image which surrounds a display area of the message image; and image control means for changing at least one of the message image and the surrounding figure image in response to attribute data indicative of a feature of the face image to be displayed;

wherein said first display signal means further comprises storage means for storing data in respective ones of a plurality of storage areas, and outputs as the first display signal a plurality of signals to display a plurality of marks which respectively correspond to each of the plurality of storage areas;

wherein said second display signal outputting means comprises selecting means for selecting any one of the displayed plurality of marks, and outputs as the second display signal a signal derived from the storage area corresponding to the selected mark;

wherein said third display signal outputting means outputs as the third display output signal a signal for displaying the surrounding figure image to emphasize the image information represented by the second display signal; and wherein said image control means includes means for changing at least one of a color and shape of the surrounding figure image in response to an update of the attribute data.

7. An image processor comprising:

personal information providing means for providing personal information relating to a character;

part determining means for determining a plurality of part images of a face of said character based on said provided personal information;

face composing means for composing said determined plurality of part images into a face image display signal representing a face image of said character, and for outputting said face image display signal to display the face image;

message display signal outputting means for outputting a message display signal to display a message image which indicates message information accompanying the face image; and balloon display signal outputting means for outputting a balloon display signal to display a balloon which surrounds a display area of said message image.

8. An image processor according to claim 7, wherein said personal information comprises at least one of a sex, age, body shape, personality and state of feeling of said character.

9. An image processor according to claim 7, further comprising message determining means for determining said message display signal based on said provided personal information.

10. An image processor according to claim 7, further comprising balloon determining means for determining said balloon display signal based on said provided personal information.

11. An image processor comprising:

face image display signal outputting means for outputting a face image signal to display a face image of a character;

message display signal outputting means for outputting a message display signal to display a message image which indicates message information accompanying the face image;

balloon display signal outputting means for outputting a balloon display signal to display a balloon which surrounds a display area of said message;

feeling display signal outputting means for outputting a feeling display signal indicative of a plurality of different states of feeling of the character;

state-of-feeling selecting means for selecting one of said plurality of states of feeling; and face image transforming means for transforming said face image based on said selected state of feeling.

12. An image processor according to claim 11, further comprising message changing means for changing said message image based on said selected state of feeling.

13. An image processor according to claim 11, further comprising balloon changing means for changing said balloon based on said selected state of feeling.

\* \* \* \* \*